United States Patent [19]

Hanai

[11] Patent Number: 5,621,480
[45] Date of Patent: Apr. 15, 1997

[54] IMAGE QUALITY CORRECTION CIRCUIT AND METHOD BASED ON COLOR DENSITY

[75] Inventor: Masaaki Hanai, Nagaokakyo, Japan

[73] Assignee: Mitsubishi Denki Kabushiki Kaisha, Tokyo, Japan

[21] Appl. No.: 226,510

[22] Filed: Apr. 12, 1994

[30] Foreign Application Priority Data

Apr. 19, 1993 [JP] Japan .................................. 5-091427
Dec. 24, 1993 [JP] Japan .................................. 5-327770
Apr. 11, 1994 [JP] Japan .................................. 6-072319

[51] Int. Cl.⁶ ........................................................ H04N 5/52
[52] U.S. Cl. ........................... 348/679; 348/630; 348/690
[58] Field of Search ..................................... 348/679, 662, 348/627, 630, 675, 712, 713, 690; H04N 5/52, 5/14, 9/69, 9/64, 9/77, 5/21

[56] References Cited

U.S. PATENT DOCUMENTS

| | | | |
|---|---|---|---|
| 4,316,215 | 2/1982 | Yasumoto et al. | 348/630 |
| 4,337,479 | 6/1982 | Tomimoto et al. | 348/630 |
| 5,032,909 | 7/1991 | Sato et al. | 348/627 |

FOREIGN PATENT DOCUMENTS

| | | |
|---|---|---|
| 55-114089 | 9/1980 | Japan . |
| 55-145492 | 11/1980 | Japan . |
| 56-23086 | 3/1981 | Japan . |
| 64-32588 | 2/1989 | Japan . |
| 3074970 | 3/1991 | Japan . |
| 5076034 | 3/1993 | Japan . |

*Primary Examiner*—John K. Peng
*Assistant Examiner*—Nina N. West

[57] ABSTRACT

An image quality correction circuit having a variable gain amplifier for amplifying an extracted high-frequency component of a luminance signal in such a manner that the gain thereof is increased when detected color density is high, and is reduced when the detected color density is low, and a slice circuit for slicing the outputted amplitude of the variable gain amplifier at a prescribed value, wherein a corrected luminance signal is obtained by combining an image quality correction signal outputted from the slice circuit with the luminance signal to be corrected.

9 Claims, 46 Drawing Sheets

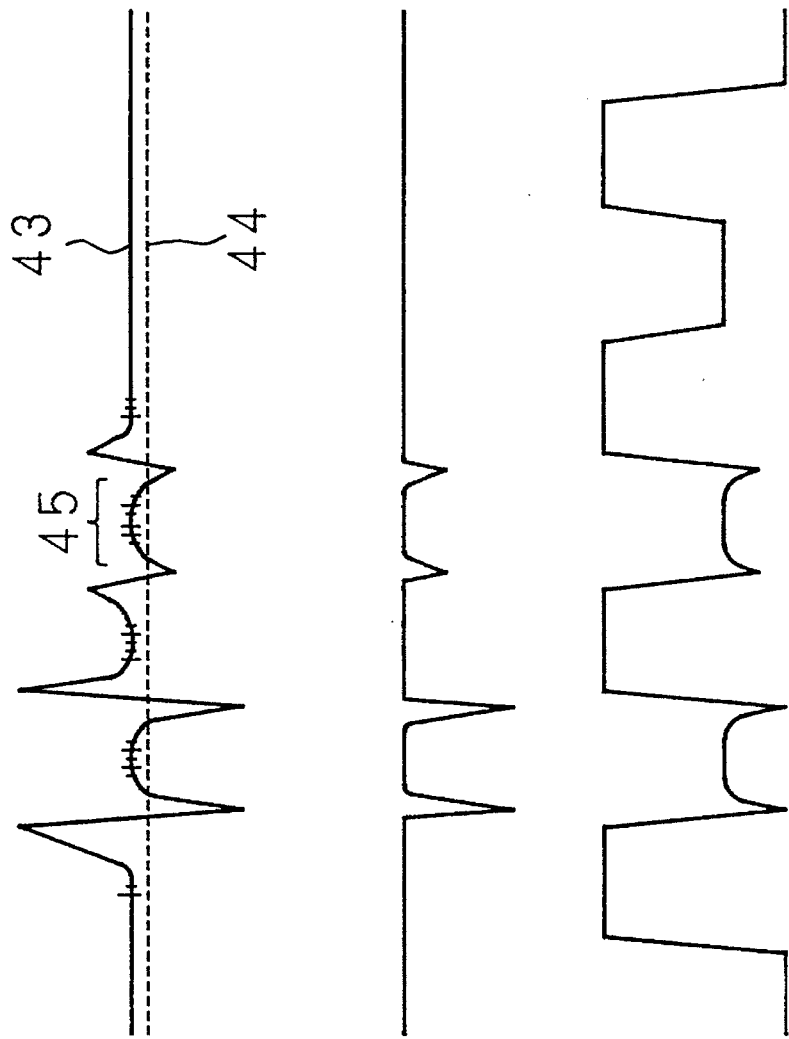

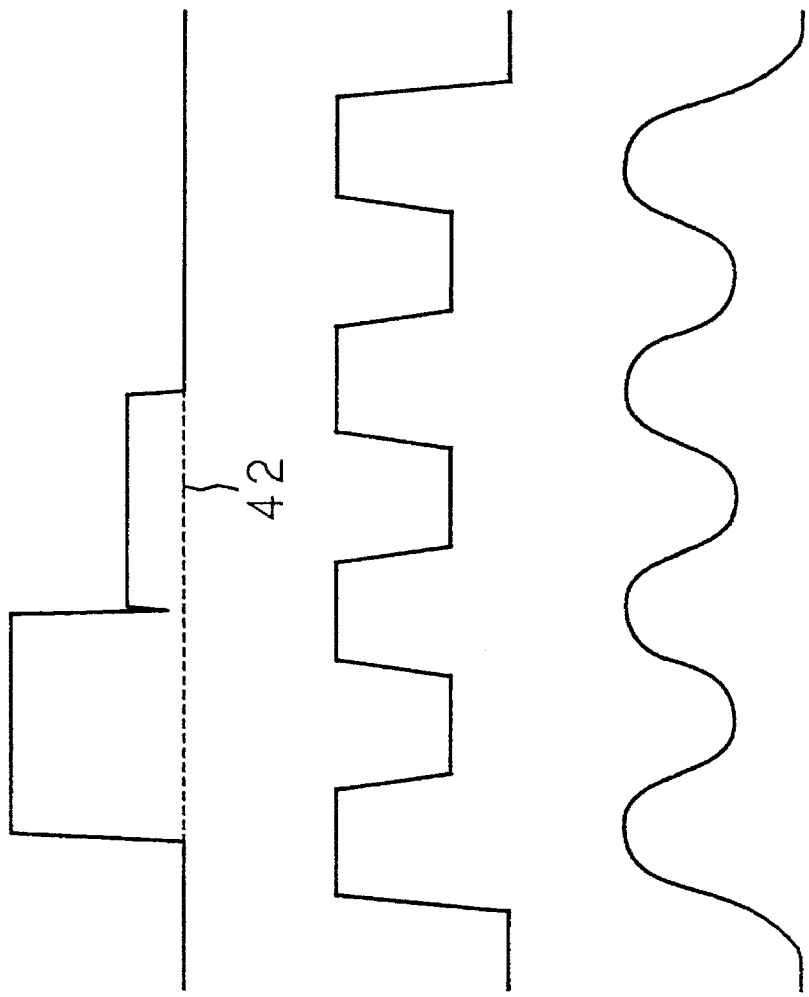
Fig. 5D COLOR DENSITY DETECTION SIGNAL 26
Fig. 5E LUMINANCE SIGNAL INCLUDING HIGH-FREQUENCY COMPONENT 15 (VY)
Fig. 5F LUMINANCE SIGNAL NOT INCLUDING HIGH-FREQUENCY COMPONENT 16 (VYL)

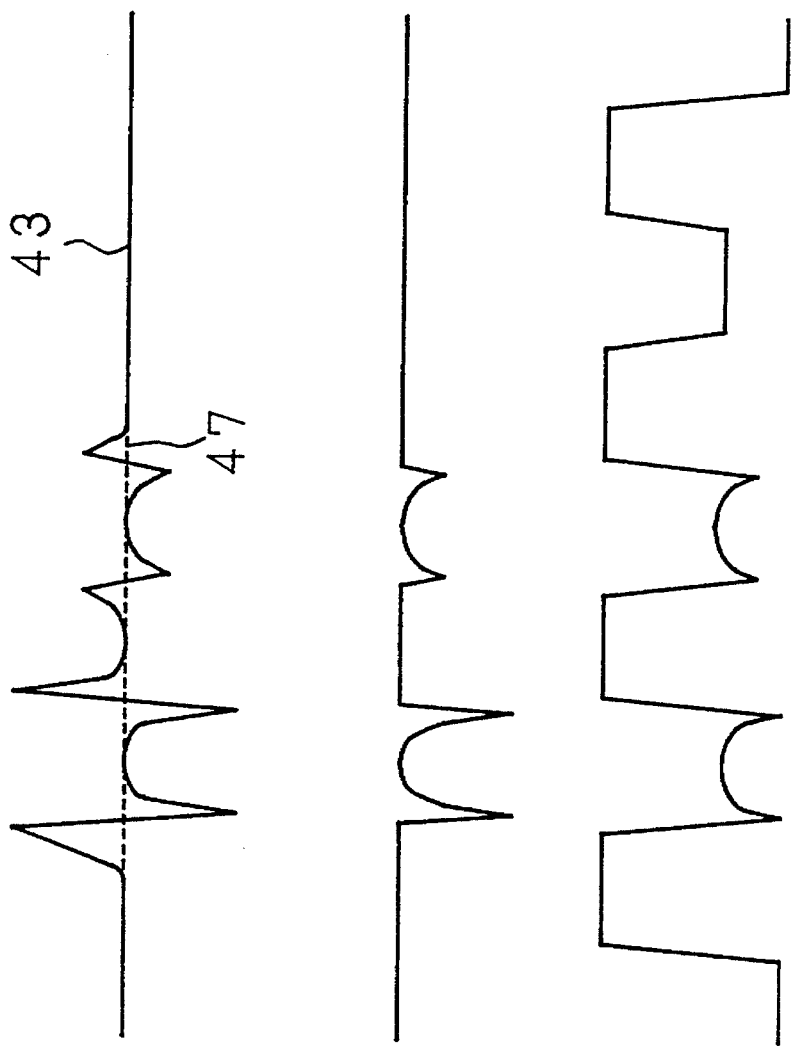

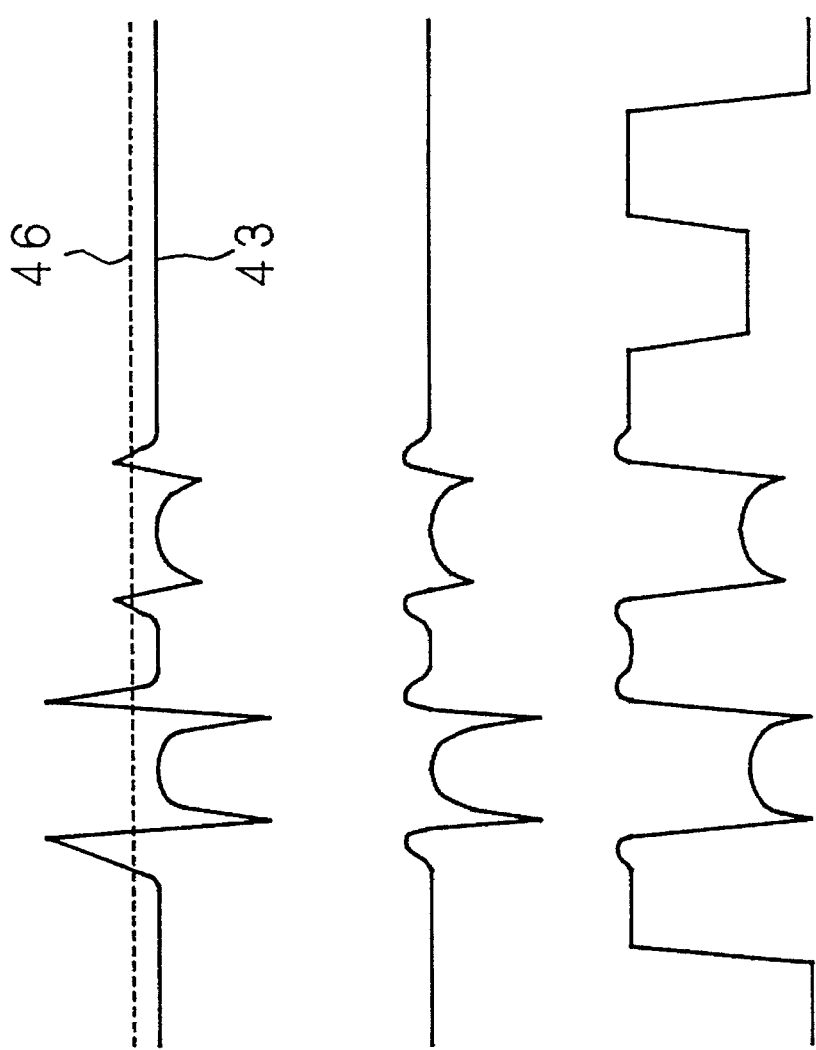

Fig. 14A OUTPUT OF INVERSION CIRCUIT 11 (INVERTED LUMINANCE SIGNAL)
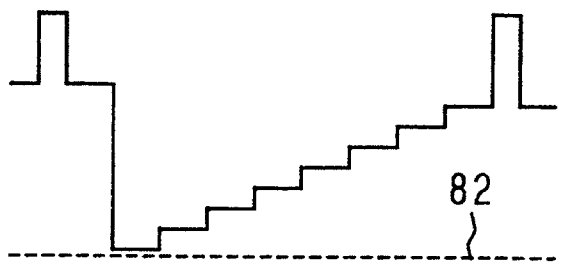
Fig. 14B CHROMINANCE COLOR SIGNAL I
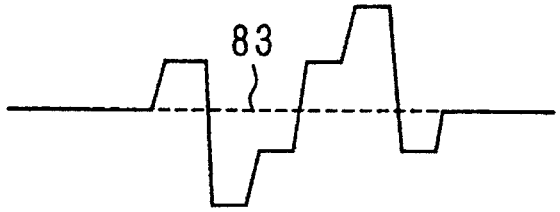
Fig. 14C CHROMINANCE COLOR SIGNAL Q
Fig. 14D OUTPUT OF RECTIFIER 10
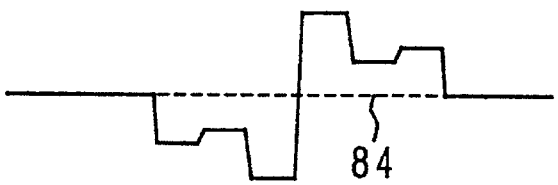
Fig. 14E OUTPUT OF RECTIFIER 12
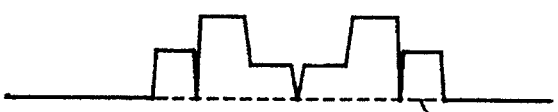
Fig. 14F OUTPUT OF ADDER 13
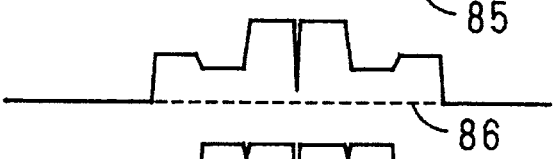
Fig. 14G OUTPUT OF MULTIPLIER 9
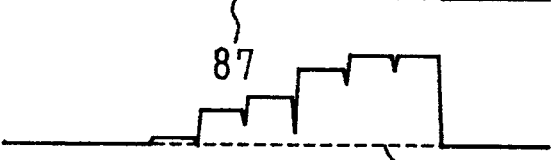
Fig. 14H COLOR DENSITY DETECTION SIGNAL 26
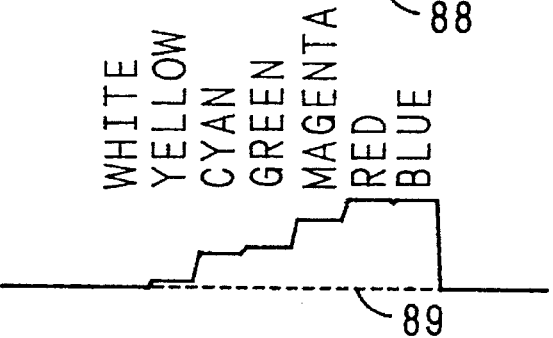

1.5(R-Y)(B-Y)

COLOR DENSITY
DETECTION SIGNAL 26
Max.|A,B,C|

R-Y

B-Y

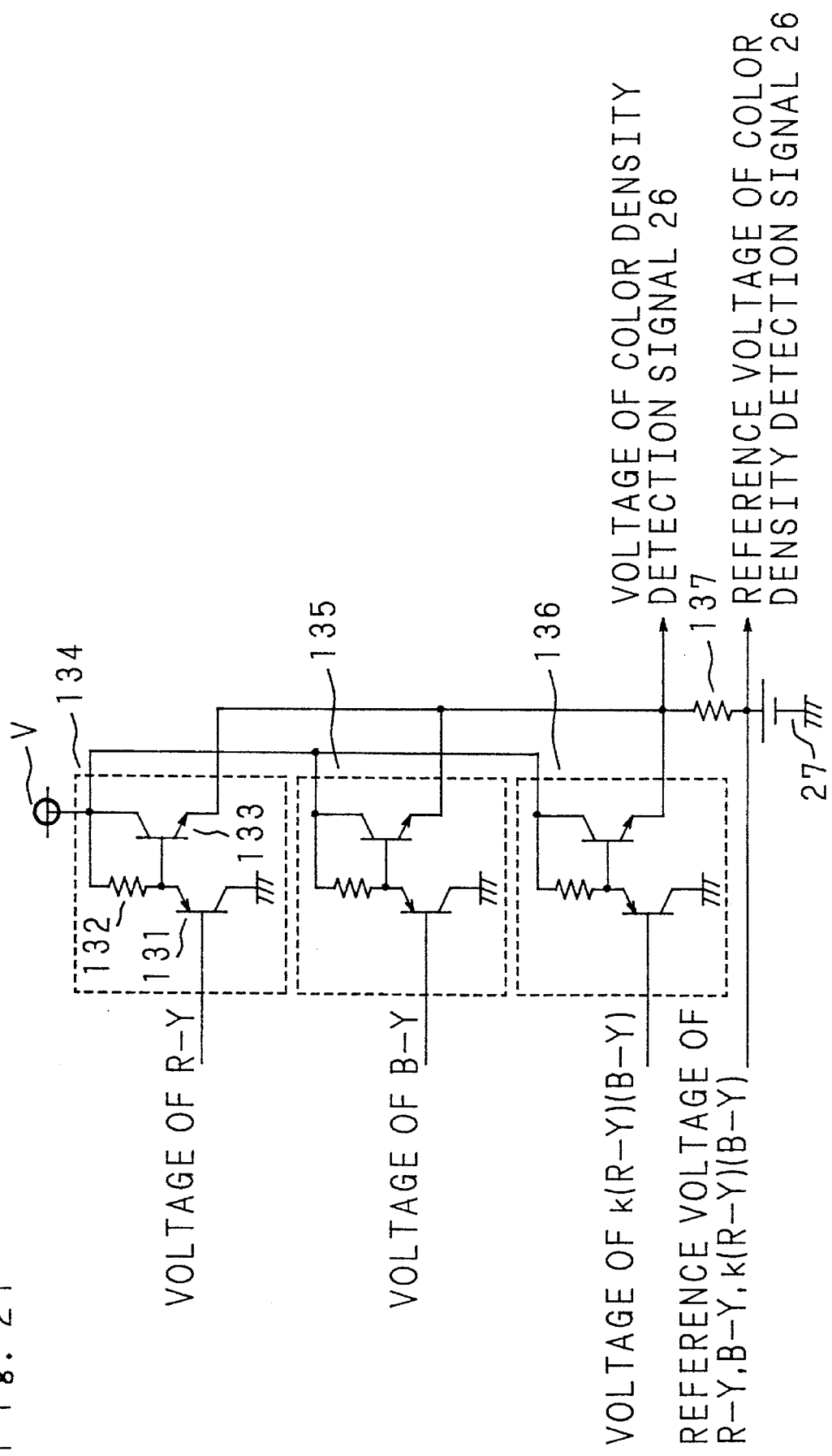

I

Q 1.0(Q−I)

−0.8Q

COLOR DENSITY
DETECTION SIGNAL 26
Max.(A,B,C,D)

I (−I)+

Q

10(−I)+·Q
(SIGNAL 109)

COLOR DENSITY
DETECTION SIGNAL 26
Max.(A,B,C,D,−Q)

LUMINANCE SIGNAL Y

BINARY LUMINANCE
SIGNAL 112

OUTPUT OF ADDER 13
(SIGNAL
 CORRESPONDING
 TO COLOR DENSITY)

COLOR DENSITY
DETECTION SIGNAL 26
B×C

IMAGE QUALITY CORRECTION CIRCUIT AND METHOD BASED ON COLOR DENSITY

BACKGROUND OF THE INVENTION

1. Field of the Invention

The present invention relates to an image quality correction circuit for correcting the quality of the images produced by video equipment, such as television receivers, video cameras, and the like.

2. Description of Related Art

In the NTSC, PAL, and SECAM television signal transmission systems, wide-band three primary color signals, R, G, and B, are first subjected to gamma correction, which is necessary to compensate for the equipment characteristic at the receiving end, and are then converted into a luminance signal Y and color-difference signals, R-Y and B-Y, or chrominance signals, I and Q, for transmission, the bandwidths being limited to about 0.5 to 1.5 MHz for the color-difference signals or chrominance signals.

The gamma correction and color-difference signal bandwidth limiting performed at tile transmitting end, however, result in the introduction of nonlinearity in the transmitted signal, and in the case of a high color saturation image, high-frequency components contained therein cannot be reproduced satisfactorily which normally should be reproduced completely by the luminance signal alone. In other words, the high-frequency component level of the luminance signal degrades in the high color saturation areas of the image, and fine details of the original scene cannot be displayed sufficiently. It is also known that black level variations axed saturation drops occur in the high-frequency component areas of a high color saturation image.

Image quality correction circuits designed to prevent such image quality degradations include one such as disclosed in Japanese Patent Application Laid-Open No. 64-32588 (1989). FIG. 1 shows a block diagram for the image quality correction circuit disclosed therein. The luminance signal Y is inputted to a high-pass filter 63 and also to a delay circuit 65. The high-frequency component of the luminance signal passed through the high-pass filter 63 is fed to a variable gain amplifier 64 whose output signal is supplied to an adder 66. Also inputted to the adder 66 is the luminance signal Y delayed through the delay circuit 65. The adder 66 adds together the high-frequency component of the luminance signal fed from the variable gain amplifier 64 and the luminance signal Y delayed through the delay circuit 65, and outputs a corrected luminance signal Y'.

On the other hand, the color-difference signal R-Y is inputted to a full-wave rectifier 10, and the full-wave rectified color difference signal R-Y is inputted to an adder 13. Similarly, the color-difference signal B-Y is inputted to a full-wave rectifier 12, and the full-wave rectified color-difference signal B-Y is inputted to the adder 13, where the color-difference signal R-Y and the color-difference signal B-Y are added together. The color density thus detected is outputted as a color density detection signal which is applied to a control terminal of the variable gain amplifier 64.

The operation of the above image quality correction circuit will be described below. The luminance signal Y is inputted to the high-pass filter 63, where the high-frequency component of the luminance signal Y is separated and inputted to the variable gain amplifier 64. The gain of the variable gain amplifier 64 is controlled in accordance with the color density detection signal outputted from the adder 13 by detecting the color density. More specifically, in high color-density areas, the amplitude of the color density detection signal is increased, so that the gain with which to amplify the high-frequency component of the luminance signal is increased; conversely, in low color-density areas, the amplitude of the color density detection signal is reduced, so that the gain with which to amplify the high-frequency component is reduced.

The delay circuit 65 delays the luminance signal Y before inputting to the adder 66, so that the phase of the luminance signal Y to be corrected coincides with the phase of an image quality correction signal, that is, the output of the variable gain amplifier 64, representing the high-frequency component of the luminance signal. The adder 66 adds together the luminance signal fed from the delay circuit 65 and the image quality correction signal fed from the variable gain amplifier 64, and outputs the corrected luminance signal Y'. Thus, the luminance signal, outputted as the luminance signal Y', is so corrected that the gain of the high-frequency component of the luminance signal is increased in the high color-density areas.

The color-difference signal R-Y is full-wave rectified by the full-wave rectifier circuit 10; when we consider a vector of the color-difference signal R-Y, the amplitude of the rectifier output represents the length of the R-Y vector. The color-difference signal B-Y is full-wave rectified by the full-wave rectifier circuit 12, and the amplitude of its output represents the length of the color-difference signal B-Y vector. The full-wave rectified color-difference signal R-Y outputted from the full-wave rectifier circuit 10 and the full-wave rectified color-difference signal B-Y outputted from the full-wave rectifier circuit 12 are added together in the adder 13. Although the output signal of the adder 13 does not become equal to the length of the resultant of the color-difference signal R-Y and B-Y vectors, the output signal can be regarded, for simplicity, as representing the color density; the color-difference signals have a larger amplitude in the high color-density areas and a smaller amplitude in the low color-density areas. The gain of the variable gain amplifier 64 is controlled in accordance with the color density detection signal outputted from the adder 13 by detecting the color density.

As described above, according to the prior art image quality correction circuit, when the amount of correction is increased for the high-frequency component of the luminance signal, the amplitude of the high-frequency component of the luminance signal increases in the high color-density areas, but in areas where the high-frequency component of the luminance signal is large in the positive side, the amplitude of the luminance signal alone increases while the magnitude of the color signals does not increase. This causes color dropout, resulting in image quality degradation. That is, a saturation drop is exacerbated in the high-frequency areas of a high color saturation image. This tendency is particularly pronounced in areas where overshoots and preshoots occur. Furthermore, in the high color-density areas, the signal-to-noise ratio decreases since the noise component of the luminance signal is also amplified.

That is, as the amount of correction is increased in the high color saturation areas, such problems as poor detail reproduction and black level variation can be alleviated correspondingly, but this in turn causes the problem of increased saturation drop and S/N degradation, which places a limit on the amount of correction that can be achieved. Therefore, the image quality improvement that can be perceived by the eye has not been satisfactory.

Furthermore, in the case of the color density detection signal produced in the prior art image quality correction circuit, the amount of correction is not distributed appropriately between various colors. As previously noted, in the NTSC, PAL, and SECAM television signal systems, the high-frequency component of the video signal is transmitted by the luminance signal alone, and since the amplitude ratio of the luminance signal contained in each color is different, the amount of high-frequency component reduction is also different. That is, the amount of high-frequency component reduction is small in areas of a color containing a large amount of luminance component, while the amount of high-frequency component reduction is large in areas of a color containing a small amount of luminance component. In a specific example, for an image of monochromatic blue consisting of 100% B signal, the amplitude of the luminance signal can be calculated as Y=0.11 from the equation Y= 0.30R+0.59G+0.11 B since R=G=0 and B=1. The value is the smallest of all the colors in the color bars. It is proven that, in this case, the gain of the high-frequency component is reduced to 11% of the gain before transmission at the transmitting end, supposing that $\gamma$ characteristic of the television picture tube is 2.0. Accordingly, the gain of the high-frequency component drops down to the amplitude ratio of the luminance signal. If high frequency components are contained in the colors of the color bars, the high-frequency component in each color drops down to the ratio shown in Table 1 below.

TABLE 1

| Red | Green | Blue | Magenta | Cyan | Yellow | White |
| --- | --- | --- | --- | --- | --- | --- |
| 30% | 59% | 11% | 41% | 70% | 89% | 100% |

Each of the values shown in Table 1 coincides with the amplitude ratio of the luminance signal contained in each color. If the high-frequency component is to be corrected for each color, the amplitude ratio, 11%, of the luminance signal for the blue color, for example, requires that the high-frequency component should be corrected to the ratio of 1/0.11. In the prior art example, no consideration is given to the amplitude ratio of the luminance signal contained in each color. If this factor is to be considered, the color density signal obtained in the prior art example needs to be divided by the luminance signal.

There is disclosed another prior art which proposes an example involving division by the luminance signal, but one shortcoming of this example is that the complexity of circuitry increases because of the inclusion of a dividing circuit in the electric circuit.

Another problem is the effect of correction appearing unnatural at the boundaries between colors. FIG. 2 shows how a primary color signal is affected when a color-difference signal is created from the luminance signal and when the high-frequency component of the luminance signal is enhanced, by taking as an example a pattern consisting of successive color bars, i.e., gray, red, white, red, and black arranged in this order from left, to right on the screen. Solid line 170 indicates the luminance signal; dotted lines show the contours of the portions where high-frequency enhancement are made; 171, 175 indicate the black level; 172 is the R-Y color-difference signal; 173 is a no-color level; solid line 174 represents the R primary color signal; and dotted lines show the portions where the high-frequency correction is made to the luminance signal 170, the reference signals A, B, C, and D from left to right indicating the waveforms at the respective color boundaries. As can be seen from FIG. 2, high-frequency correction is effective in achieving uniform image quality only in the case of D, but in the cases of A, B, and C, the high-frequency correction of the luminance signal causes unnatural contours. A, B, and C are where the slope is reversed between the luminance signal 170 and the color-difference signal 172. In A, high-frequency correction results in an unnatural step formed in the rising portion of the primary color signal. In B and C, the boundary contours which initially were not present on the reverse image side are formed because the luminance and color-difference signals are transmitted separately in separate frequency bands. These contours are further emphasized by the high-frequency correction of the luminance signal. As a result, overcorrection tends to occur in the case of the B and C patterns, resulting in overemphasized contours.

There are other problems: in the case of an image whose overall S/N ratio is low, if correction is made meticulously on light color portions, the S/N ratio will further degrade, and furthermore, while the appearance of wrinkles in the human skin, a light color area, should be reduced to obtain a pleasing image, if correction is made to such light color areas, the image will appear more real, making the wrinkles further noticeable.

A further problem is that aperture correction is performed using a separate circuit, requiring the provision of a separate aperture correction circuit and thus increasing the size of the circuitry required to achieve image improvements.

SUMMARY OF THE INVENTION

An object of the present invention is to provide an image quality correction circuit that is capable of minimizing color dropout (saturation drop) and S/N degradation due to the positive high-frequency component of the luminance signal even when the amount of correction is increased for the high-frequency component of the luminance signal.

Another object of the present invention is to provide an image quality correction circuit capable of drastically improving the image quality by correcting such problems as black level variations and poor detail reproduction in high color-density areas.

A further object of the present invention is to provide an image quality correction circuit capable of obtaining a properly corrected image free from excessive correction or insufficient correction depending on colors, by detecting a color density detection signal in which the ratio of the luminance signal contained in each color is considered.

A still further object of the present invention is to provide an image quality correction circuit capable of preventing unnecessary contour enhancement, and the resulting image quality degradation, at the boundary between non-color and color areas or at the boundary between different colors.

A yet further object of the present invention is to provide an image quality correction circuit capable of improving the S/N ratio, and also capable of preventing the image appearance degradation due to emphasized roughness of human skin, by deliberately reducing the effect of correction on low color-density areas.

Yet another object of the present invention is to provide an image quality correction circuit capable of accomplishing aperture correction, by executing a certain degree of image quality improvement in no-color areas.

According to the present invention, there is provided an image quality correction circuit which comprises color density detecting means for detecting color density, high-frequency component extracting means for extracting a high-frequency component of a luminance signal, a variable gain amplifier for amplifying the extracted high-frequency component of the luminance signal in such a manner that the gain thereof is increased when the detected color density is high, and is reduced when the detected color density is low and a slice circuit for slicing out the output amplitude of the variable gain amplifier at a prescribed value. The order of the variable gain amplifier and the slice circuit may be reversed.

When the extracted high-frequency component of the luminance signal is input into the variable gain amplifier, and control is performed so that the gain of the variable gain amplifier is increased when the detected color density is high, and is reduced when it is low, the amplified high-frequency component of the luminance signal will have a greater amplitude as the color density increases. When the amplified high-frequency component of the luminance signal is fed into the slice circuit, the positive portions of the high-frequency component of the luminance signal and the ripple component such as noise are removed. After the removal, the negative portions of the high-frequency component of the luminance signal are combined with the luminance signal to be corrected, thus accomplishing the correction of the luminance signal. In high color-density areas, since the luminance signal is corrected only in the direction in which the color density increases, no color dropout occurs at the boundaries between colors. Furthermore, removal of the ripple component improves the S/N ratio. It will further be noted that since the correction is made using the negative portions of the high-frequency component, the problems of black level variations and detail degradation are alleviated. As described, since the high-frequency component of the luminance signal to be used for correction of the luminance signal is stripped of its positive portions, as well as its ripple component such as noise, by the slice circuit, the amount of correction applied to the luminance signal can be increased without causing S/N degradation. This further prevents color dropout and other defects due to overshoots and preshoots on the positive side of the luminance signal, and thus minimizes image quality degradation.

According to the present invention, there is also provided an image quality correction circuit which, in order to obtain a color density detection signal in which the amplitude ratio of the luminance signal contained in each color is considered, employs one of the following three configurations for the color density detecting means: the first configuration wherein the color density detecting means includes a multiplier for performing a multiplication by an inverted luminance signal, and a low-pass filter; the second configuration wherein the color density detecting means includes a maximum value detection circuit for detecting maximum values for color vectors where the amount of high-frequency component reduction is large; and the third configuration wherein the color density detecting means includes a binary circuit for converting the luminance signal into a binary form. One of the first, second, or third configuration is employed for the color density detecting means so that the color density can be detected by considering the amplitude ratio of the luminance signal contained in each color, i.e., an optimum color density detection signal for image quality correction can be obtained.

In the first configuration of the color density detecting means, by multiplying a signal corresponding to the color density by the inverted signal, the color density detection signal is corrected to a relatively low level for colors having a larger luminance component, and to a relatively high level for colors having a smaller luminance component, thus realizing the production of a color density detection signal for optimum control of the image quality correction.

In the second configuration of the color density detecting means, for a number of vectors where the amount of high-frequency component reduction is large, signal waveforms are synthesized by taking points wile re the colors along the designated vector directions are at their respective maximum values, and then, maximum values among the signal waveforms are detected to obtain the color density signal for optimum control of the image quality correction.

In the third configuration of the color density detecting means, the luminance signal is converted into a binary form with a low voltage for image areas of high luminosity and a high voltage for image areas of low luminosity, and a signal corresponding to the color density, in which the amplitude ratio of the luminance signal has yet to be reflected, is multiplied by the binary luminance signal; as a result, the color density detection signal is corrected to a relatively low level for relatively light colors containing a larger luminance component, and to a relatively high level for relatively dark colors containing a smaller luminance component, thus realizing the production of a color density detection signal for optimum control of the image quality correction.

Another image quality correction circuit, according to the invention, includes a boundary reduction circuit for reducing the amplitude of the color density detection signal at the boundary between colors. The color density detection signal detected by the color density detecting means is supplied to the boundary reduction circuit where the edges of the signal are detected and the amplitude of the signal is reduced in areas near the edges to reduce the effect of correction at the boundary between no-color and color areas or at the boundary between different colors. When the resulting signal is used as a new color density detection signal for image quality correction, the effect of image quality correction can be reduced at the boundary between colors, i.e., at the edge portions of the color density detection signal detected by the color density detecting means. This is effective in alleviating the problem of unnatural contours.

Another image quality correction circuit, according to the invention, includes a small-amplitude removal circuit for removing small-amplitude portions of the color density detection signal to suppress the effect of image correction in low color-density areas. In small-amplitude portions of the color density detection signal, its reference voltage is raised to a level higher than the no-color voltage level, and the signal portions below the reference voltage are removed. By performing conversion with the reference voltage level as the minimum value, the small amplitude portions are removed, which has the effect of preventing the overall S/N perception from substantially dropping in a low S/N image, and also preventing the wrinkles, stains, etc. on the human skin from being emphasized and affecting the image appearance.

Another image quality correction circuit, according to the invention, includes an offset addition means for adding a DC component to the color density detection signal so that a certain degree of high-frequency correction can be made in no-color areas. By deliberately adding the DC offset to the color density detection signal, a certain degree of high-frequency correction effect can be obtained in no-color areas, thus serving the function of an aperture correction circuit.

As described above, since the color density detection signal is created by taking into consideration the ratio of the luminance signal contained in each color, no such phenomena as excessive correction or insufficient correction occur depending on colors, and a properly corrected image can be obtained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5A, 5B, 5C, 5D, 5E and 5F are waveform diagrams of signal voltages;

FIGS. 6A, 6B and 6C are waveform diagrams of signal voltages when circuit constants are changed;

FIGS. 7A, 7B and 7C are waveform diagrams of signal voltages when circuit constants are changed;

FIGS. 14A, 14B, 14C, 14D, 14E, 14F, 14G and 14H are output waveform diagrams for various parts of a color density detector in the sixth embodiment when color bars are inputted;

FIG. 21 is a circuit diagram showing the configuration of a maximum value detection circuit;

DESCRIPTION OF THE PREFERRED EMBODIMENTS

The present invention will be described in detail below with reference to the drawings illustrating the preferred embodiments.

(Embodiment 1)

Figure 3:
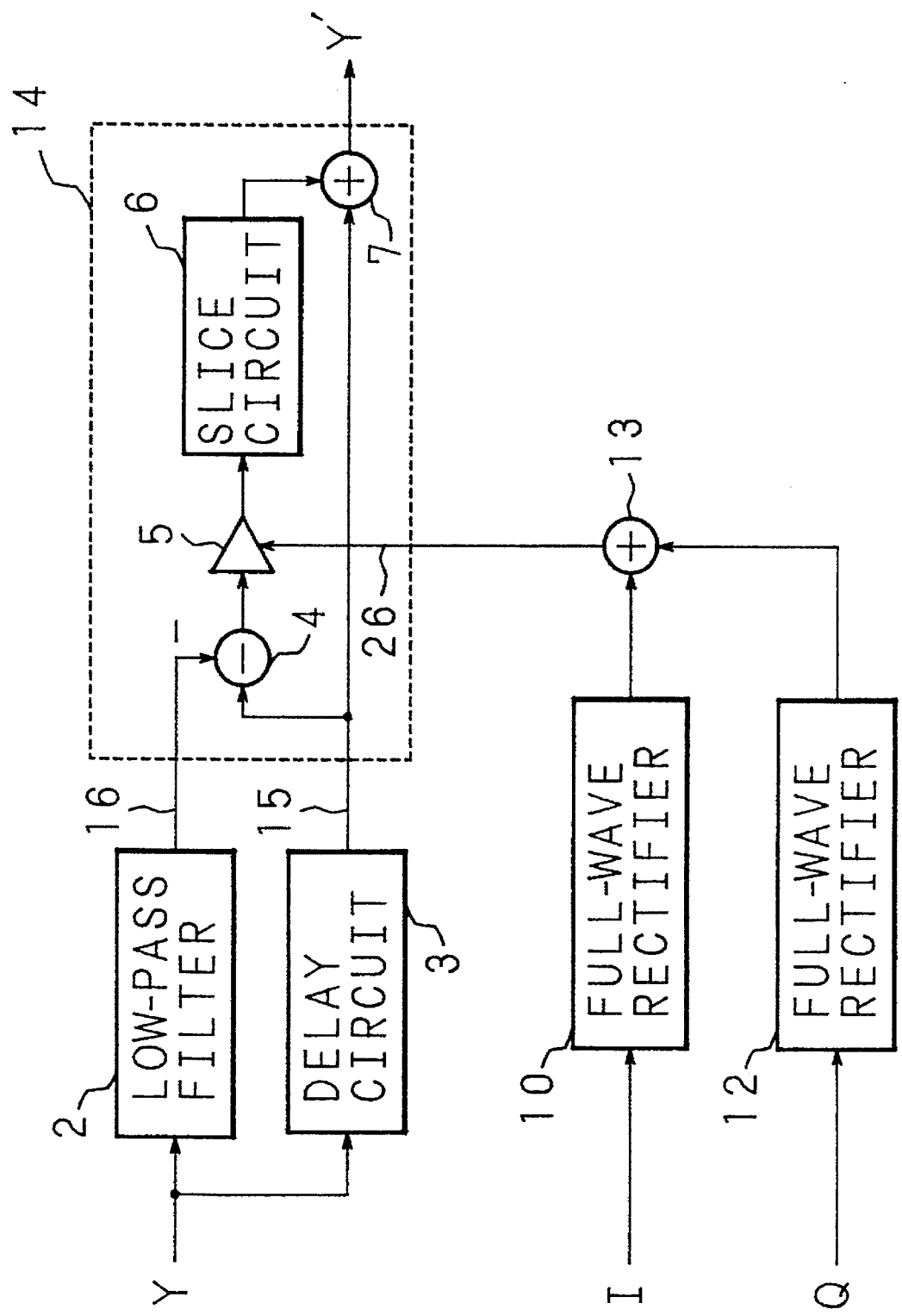
FIG. 3 is a block diagram showing the configuration of an image quality correction circuit (a first embodiment) according to the present invention.

FIG. 3 is a block diagram showing the configuration of an image quality correction circuit according to one embodiment (a first embodiment) of the present invention. A luminance signal Y is applied to a negative terminal—of a subtractor 4 through a low-frequency pass filter 2 (hereinafter called the low-pass filter). The luminance signal Y is also inputted to a delay circuit 3 through which the signal is supplied to an adder 7 as well as to the subtractor 4. An output signal from the subtractor 4 is supplied as an inputted to a variable gain amplifier 5 whose output signal is fed to a slice circuit 6. An output signal from the slice circuit 6 is supplied to the adder 7.

The adder 7 outputs a corrected luminance signal Y'. On the other hand, a chrominance signal I is inputted to an adder 13 through a full-wave rectifier 10, while a chrominance signal Q is inputted to the adder 13 through a full-wave rectifier 12. An output signal from the adder 13 is applied to a control terminal of the variable gain amplifier 5. Here, the chrominance signals, I and Q are inputted after a delay of a predetermined time so that they are in phase with the output signal from the subtractor 4 when fed into the variable gain amplifier 5. The subtractor 4, the variable gain amplifier 5, the slice circuit 6, and the adder 7 together constitute an image quality correction signal generator 14 for generating the corrected luminance signal Y'.

The operation of the above-configured image quality correction circuit will be described below.

When the luminance signal Y is inputted to the low-pass filler 2 and the delay circuit 3, the low-pass filler 2 with a prescribed high frequency cutoff characteristic transmits only a low-frequency component 16 of the luminance signal. The delay circuit 3 outputs a luminance signal 15 with such a delay that its phase coincides with the phase of the low-frequency component of the luminance signal passed through the low-pass filter 2. Then, in the subtractor 4, the low-frequency component 16 of the luminance signal fed from the low-pass filter 2 is subtracted from the luminance signal 15 which is fed from the delay circuit 3 and contains the high-frequency component; as a result, only the high-frequency component of the luminance signal is output from the subtractor 4. The variable gain amplifier 5, as will be described in detail later, amplifies the high-frequency component of the luminance signal in accordance with the amplitude of a color density direction signal 26 outputted from the adder 13. To describe specifically, control is performed for amplification so that the gain is increased in high color-density areas and is reduced in low color-density areas.

The high-frequency component of the luminance signal, with its gain correlated to the color density by the variable gain amplifier 5, is inputted to the slice circuit 6 where those portions of the high-frequency component of the luminance signal which exceed a prescribed value are cut off, thus removing the positive portions, as well as the ripple component such as noise, from the high-frequency component, and the image quality correction signal results. The image quality correction signal outputted from the slice circuit 6 is added in the adder 7 to the luminance signal to be corrected, i.e., the luminance signal containing the high-frequency component and delayed through the delay circuit 3. The adder 7 outputs the result as the corrected luminance signal Y'.

On the other hand, the chrominance signal I is full-wave rectified by the full-wave rectifier 10 and inputted to the adder 13, while the chrominance signal Q is full-wave rectified by the full-wave rectifier 12 and inputted to the adder 13. The full-wave rectified chrominance signals I and Q are added together in the adder 13, which then outputs the color density detection signal 26 corresponding to the color density. This color density detection signal, whose amplitude increases as the color density increases and decreases as the density decreases, is used to control the gain of the variable gain amplifier 5; that is, the amplitude of the high-frequency component of the luminance signal that the variable gain amplifier 5 outputs is increased in high color-density areas and is reduced in low color-density areas. Color-difference signals R-Y and B-Y may be used instead of the chrominance signals I and Q, respectively.

Figure 4:
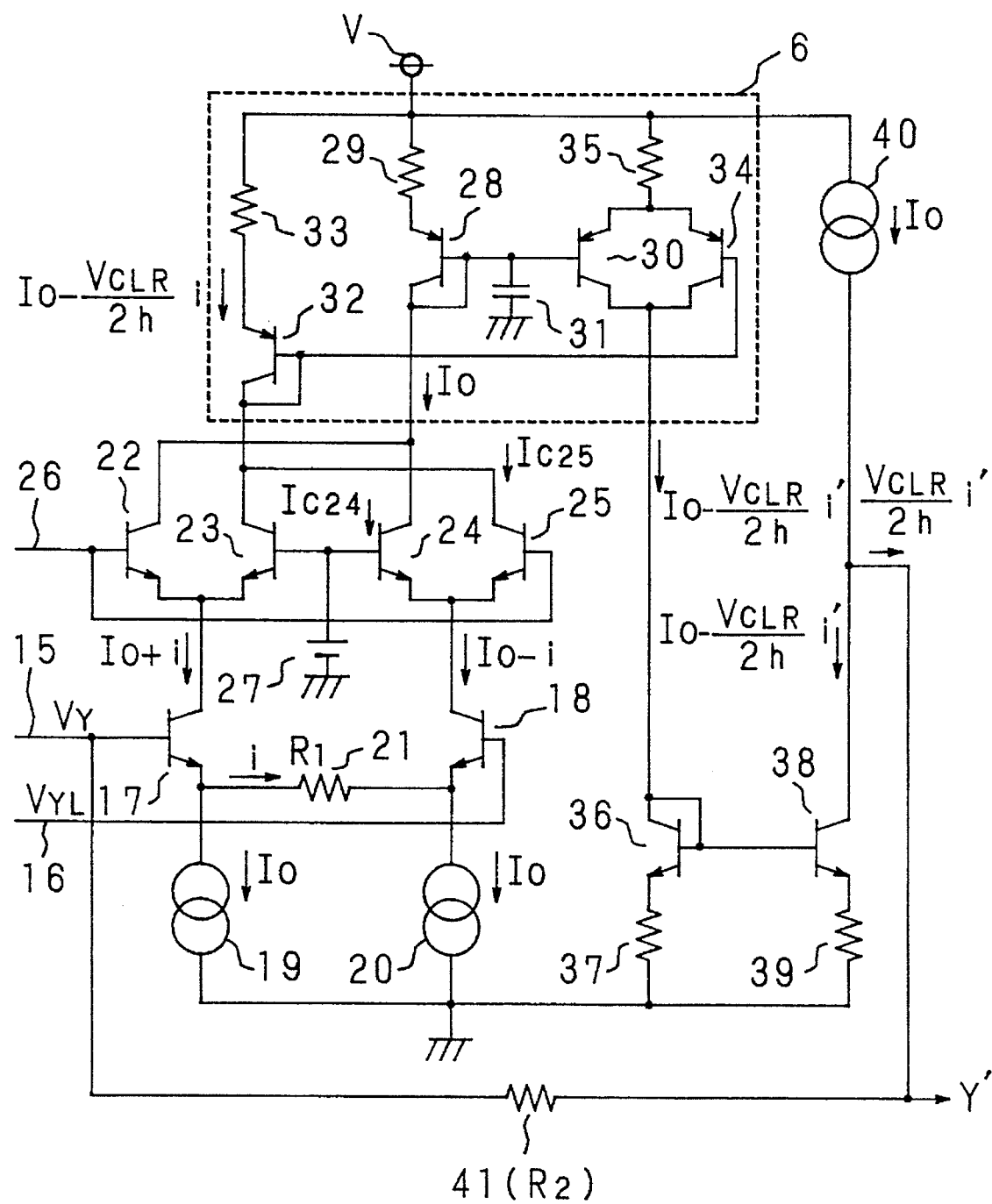
FIG. 4 is a block diagram showing the configuration of an image quality correction signal generator.

FIG. 4 is a circuit diagram showing the configuration of one example of the image quality correction signal generator 14. Power supply V is grounded through a series circuit consisting of a resistor 33, a transistor 32, a transistor 23, a transistor 17, and a constant current source 19, and is also grounded through a series circuit consisting of a resistor 29, a transistor 28, a transistor 24, a transistor 18, and a constant current source 20. The base and collector of the transistor 32 are connected together, and the base and collector of the transistor 28 are also connected together. The collector of the transistor 23 is connected to the collector of the transistor 25, while the emitter of the transistor 25 is connected to the emitter of a transistor 24. Further, the collector of the transistor 24 is connected to the collector of a transistor 22 whose emitter is in turn connected to the emitter of the transistor 23.

The bases of the transistors 23 and 24 are coupled together and connected to the positive terminal of a constant voltage source 27 whose negative terminal is grounded. The base of the transistor 25 is connected to the base of the transistor 22. The emitter of the transistor 17 is connected to the emitter of the transistor 18 via a resistor 18. Thus, the transistors 22 and 23 form a differential amplifier, and the transistors 24 and 25 also form a differential amplifier. Further, the transistors 17 and 18 form a differential amplifier. The power supply V is grounded through a series circuit consisting of a resistor 35, a transistor 30, a transistor 36, and a resistor 37, and is also grounded through a series circuit consisting of a constant current source 40, a transistor 38, and a resistor 39.

A transistor 34 is connected in parallel to the transistor 30 whose base is connected to the base of the transistor 28 and is grounded via a capacitor 31. The base of the transistor 34 is connected to the base of the transistor 32, so that the transistors 32 and 34 form a mirror circuit. Similarly, the base of the transistor 36, which is connected to its collector, is connected to the base of the transistor 38, also forming a mirror circuit. A node between the constant current source 40 and the transistor 38 is connected to the base of the transistor 17 via a resistor 41 which acts as the load for the transistor 38. The color density detection signal 26 outputted from the adder 13 (FIG. 3) is applied to the bases of the transistors 22 and 25. The transistor 17 is supplied a its base with a voltage $V_Y$ that represents the luminance signal 15 containing the high-frequency component outputted from the delay circuit 3 (FIG. 3).

The transistor 18 is supplied at its base with a voltage $V_{YL}$ that represents the luminance signal 16 consisting of the low-frequency component outputted from the low-pass filter 2 (FIG. 3). The image quality correction signal, which is outputted from the node between the constant current source 40 and the transistor 38, and the luminance signal 15 containing the high-frequency component, which is output through the resistor 41, are combined together to produce the corrected luminance signal Y'.

The transistor 28, the resistor 29, the transistor 30, the capacitor 31, the transistor 32, the resistor 33, the transistor 34, and the resistor 35 together constitute the slice circuit 6. The resistors 29 and 35 are chosen to have the same resistance value, and the resistance value of the resistor 33 is chosen to be slightly smaller than the individual resistance value of the resistors 29 and 35. Further, the resistors 39 and 37 are chosen to have the same resistance value. The resistance value of the resistor 41 is denoted by R2.

The operation of the above image quality correction signal generator 14 will be described below.

Let i represent a differential current proportional to a voltage differential, $V_Y - V_{YL}$, such that $i = (V_Y - V_{YL})/R1$, where R1 is the resistance value of the resistor 21, $V_Y$ is the voltage of the luminance signal 15 containing the high-frequency component and being applied to the base of the transistor 17, and $V_{YL}$ is the low-frequency luminance signal 16 stripped of the high-frequency component and being applied to the base of the transistor 18. Now suppose that the differential current i is flowing from the emitter of the transistor 17 toward the emitter of the transistor 18 in the differential amplifier formed from the transistors 17 and 18. In this situation, if we consider that the collector current of the transistor 17 is approximately equal to the emitter current, the collector current can be considered to be equal to Io+i which is the sum of the current Io that the constant current supply 19 flows to ground and the differential current i.

Similarly, if we consider that the collector current of the transistor 18 is approximately equal to the emitter current, the collector current can be considered to be equal to Io−i which is the difference between the current Io that the constant current source 20 flows to ground and the differential current i. Therefore, the differential current i corresponds to the high-frequency component of the luminance signal. Further, in connection with the voltage differential $V_{CLR}$ between the reference voltage that the constant voltage source 27 applies to the bases of the transistors 23 and 24 and the voltage (including the bias) of the color density detection signal 26 corresponding to the color density and applied to the bases of the transistors 22 and 25, a voltage for controlling the gain in accordance with the density of a specific color is applied to the differential amplifier formed from the transistors 22 and 23 and also to the differential amplifier formed from the transistors 24 and 25. First, we will describe the operation of the differential amplifier formed from the transistors 24 and 25.

It is assumed here that the capacitor 31 is not connected in the circuit. When we consider the situation where the differential amplifier formed from the transistors 24 and 25 is in a perfect equilibrium condition, i.e., $V_{CLR} = 0$, it can be considered that the base-emitter voltage $V_{BE24}$ of the transistor 24 is equal to the base-emitter voltage $V_{BE25}$ of the transistor 25.

Let this situation be expressed as $$V_{BE24} = V_{BE25} = V_{BE} \quad (1)$$

Suppose that the emitter current of the transistor 24 is approximately equal to the collector current, and let this current be denoted by $I_{C24}$. Also suppose that the emitter current of the transistor 25 is approximately equal to the collector current, and let this current be denoted by $I_{C25}$. In the equilibrium condition $$I_{C24} = I_{C25} = I_{CA} \approx I_{EA} \quad (2)$$

where $I_{CA}$ and $I_{EA}$ are the collector current and emitter current, respectively, in the equilibrium condition. For differential voltage $V_{CLR}$, if the change is such that $V_{BE24} = V_{BE} - \Delta V_{BE}$ and $V_{BE25} = V_{BE} + \Delta V_{BE}$, the following equation holds.

$$V_{CLR} = V_{BE25} - V_{BE24} = 2\Delta V_{BE} \quad (3)$$

With the voltage differential $V_{CLR}$, the collector currents of the transistors 24 and 25 change as follows $$I_{C24} = I_{CA} - \Delta I_C \quad (4)$$

$$I_{C25} = I_{CA} + \Delta I_C \quad (5)$$

where $\Delta I_C$ is the amount of change of the collector current.

On the other hand, the relationship between $I_{CA}$ and $V_{BE}$ is expressed as $$I_{CA} \approx I_{EA} = I_S \exp[V_{BE}/h] \quad (6)$$

$h = kT/q$ where $I_S$ . . . Saturation current = $1 \times 10^{-11}$ A (Approx.)
q . . . Electron charge = $1.6 \times 10^{-19}$ C (Approx.)
k . . . Boltzmann constant = $1.38 \times 10^{-23}$ J/K (Approx.)
T . . . Absolute temperature If the change due to the voltage differential $V_{CLR}$ is considered, the following equation is given $$I_{C25} = I_{CA} + \Delta I_C = I_S \exp[V_{BE25}/h] = I_S \exp[V_{BE} + \Delta V_{BE}/h] = I_S \exp[V_{BE}/h] \exp[\Delta V_{BE}/h] = I_{CA} \exp[\Delta V_{BE}/h] \quad (7)$$

Considering that $\Delta V_{BE}/h < 1$, if the above is approximated by the Taylor expansion, we have $$I_{C25} = I_{CA} \exp[\Delta V_{BE}/h] \approx I_{CA} [1 + \Delta V_{BE}/h] \quad (8)$$

This can be simplified as $$\Delta I_C \approx I_{CA} [\Delta V_{BE}/h] \quad (9)$$

Similarly $$I_{C24} = I_{CA} \Delta I_C \approx I_{CA} [1 - \Delta V_{BE}/h] \quad (10)$$

In the differential amplifier formed from the transistors 24 and 25, the sum of the emitter current $I_{C24}$ of the transistor 24 and the emitter current $I_{C25}$ of the transistor 25 becomes equal to the collector current of the transistor 18. Hence $$I_{CA} = \frac{1}{2}(Io - i) \quad (11)$$

Rearranging for $I_{C24}$ and $I_{C25}$, we have $$I_{C24} = \frac{1}{2}(Io-i)[1-\Delta V_{BE}/h] \quad (12)$$

$$I_{C25} = \frac{1}{2}(Io-i)[1+\Delta V_{BE}/h] \quad (13)$$

The differential amplifier formed from the transistors 22 and 23 is considered in like manner, and rearranging for the collector current $I_{C22}$ of the transistor 22 and the collector current $I_{C23}$ of the transistor 23, we have $$I_{C22} = \frac{1}{2}(Io+i)[1+\Delta V_{BE}/h] \quad (14)$$

$$I_{C23} = \frac{1}{2}(Io+i)[1-\Delta V_{BE}/h] \quad (15)$$

The collector current $I_{C32}$ of the transistor 32 is equal to the sum of $I_{C23}$ and $I_{C25}$, and using Equation (3), is expressed as $$\begin{aligned} I_{C32} &= I_{C23} + I_{C25} \quad (16) \\ &= 1/2(Io+i)[1-\Delta V_{BE}/h] + \\ &\quad 1/2(Io-i)[1+\Delta V_{BE}/h] \\ &= Io - \Delta V_{BE}/h \cdot i = Io - V_{CLR}/2h \cdot i \end{aligned}$$

Likewise, if it is assumed that the capacitor 31 is not connected in the circuit, the collector current $I_{C28}$ of the transistor 28 is equal to the sum of $I_{C22}$ and $I_{C24}$. Hence $$\begin{aligned} I_{C23} &= I_{C22} + I_{C24} \quad (17) \\ &= 1/2(Io+i)[1+\Delta V_{BE}/h] + \\ &\quad 1/2(Io-i)[1-\Delta V_{BE}/h] \\ &= Io + \Delta V_{BE}/h \cdot i = Io + V_{CLR}/2h \cdot i \end{aligned}$$

As it is, since the capacitor 31 is connected in the circuit of FIG. 4, the AC component ($V_{CLR}/2h$). i in Equation (17) is absorbed into the ground potential side via the capacitor 31, and therefore, the collector current of the transistor 28 becomes equal to Io.

The transistors, 28 and 30, and the transistors, 32 and 34, are respectively paired to form a mirror circuit, but since the resistance value of the resistor 33 is slightly lower than that of the resistor 29, the voltage applied to the base of the transistor 30 is lower than the bias applied to the base of the transistor 34. When the voltage applied to the base of the transistor 34 is higher than the voltage applied to the base of the transistor 30, the transistor 34 is off, which means that when the base voltage of the transistor 34 is approximately equal to the bias voltage, the transistor 34 is ill the off state, so that almost all the current flowing through the resistor 35 flows into the emitter of the transistor 30.

The only time that the transistor 34 is turned on is when the voltage applied to the base of the transistor 34 falls below the voltage applied to the base of the transistor 30 because of the AC component. If the current flowing through the resistor 35 is approximately equal to the current flowing from the interconnected collectors of the transistors 30 and 34 into the collector of the transistor 36, the DC component of the current has precedence since, as described above, the voltage applied to the base of the transistor 30 is lower than the bias applied to the base of the transistor 34, and because the resistors 29 and 35 have the same resistance value, the DC component flowing through the resistor 35 is equal to Io, so that the DC component flowing into the collector of the transistor 36 is equal to Io.

The AC component flowing into the collector of the transistor 36 is given as $-(V_{CLR}/2h)i'$, which corresponds to the difference between the DC component Io and the current that flows from the power supply V to the emitter of the transistor 34 via the resistor 35 when the voltage applied to the base of the transistor 34 has fallen equal to or below the voltage applied to the base of the transistor 30 because of the AC component. This AC component $-(V_{CLR}/2h)i'$ is the same as the AC component of the collector current of the transistor 32, $-(V_{CLR}/2h)i$, except that a portion of its amplitude is cut off.

Hence, the collector current of the transistor 36 is given by Io $-(V_{CLR}/2h)i'$. The transistors 36 and 38 form a mirror circuit, and the resistors 37 and 39 have the same resistance value. Therefore, the collector current of the transistor 38 is approximately equal to the collector current of the transistor 36, which is given by Io $-(V_{CLR}/2h)i'$. The collector of the transistor 38 is connected to the constant current source 40 which flows the DC component current Io from the power supply V toward the collector of the transistor 38; therefore, the current flowing from the collector of the transistor 38 toward the resistor 41 is given by $(V_{CLR}/2h)i'$. Since $(V_{CLR}/2h)i'$ is the current portion of the image quality correction signal, the voltage of the corrected luminance signal Y' is obtained by adding the correction voltage $(V_{CLR}/2h)i'R2$, where R2 is the resistance value of the resistor 41, to the luminance signal 15 to be corrected, which contains the high-frequency component. From the expression $(V_{CLR}/2h)i'R2$, it can be seen that the correction voltage is obtained by slicing the voltage differential between the voltage $V_Y$ of the luminance signal and the voltage $V_{YL}$ of the low-frequency component of the luminance signal and then multiplying the result by a voltage whose gain is controlled by the voltage differential $V_{CLR}$ relating to the color density.

Referring now to FIG. 5 illustrating waveforms for various signal voltages, we will describe the operation of the correction signal generator 14 where the color density detection signal, the high-frequency component of the luminance signal, and the luminance signal containing the high-frequency component are inputted. In FIGS. 5A–F the time is plotted along the abscissa and the voltage along the ordinate. FIG. 5D shows the voltage variation of the color density detection signal 26 in the direction of decreasing density, with the numeral 42 indicating the level of the reference voltage of the constant voltage source 27. FIG. 5E shows the voltage variation of the luminance signal 15 containing the high-frequency component, while FIG. 5F shows the voltage variation of the low-frequency component 16 of the luminance signal stripped of its high-frequency component. Further, FIG. 5A shows signal voltage variations at the bases of the transistors 30 and 34, the numeral 43 indicating the base voltage variation for the transistor 34 and 44 for the transistor 30.

The numeral 45 indicates the ripple component, such as noise, appearing near the bias areas of the high-frequency component of the luminance signal being applied to the base of the transistor 34. FIG. 5B shows a signal voltage variation at the emitter of the transistor 34; this AC waveform is the voltage waveform of the correction signal. FIG. 5C shows the voltage variation of the corrected luminance signal Y' produced by combining the correction signal and the luminance signal containing the high-frequency component. The signal voltage 43 shown in FIG. 5A is produced by subtracting the high-frequency-component-stripped luminance signal of FIG. 5F from the high-frequency-containing luminance signal of FIG. 5E and then controlling and amplifying the gain of the resulting signal in accordance with the color density represented by the color density detection signal 26 of FIG. 5D.

The portions where the voltage level of the signal voltage 43 is higher than the voltage level of the signal voltage 44 shown in FIG. 5A, i.e., the positive portions, are cut off in accordance with the operation of the transistors 30 and 34 illustrated in FIG. 4, as a result of which the image quality correction signal is obtained which consists only of the negative portions of the high-frequency component of the luminance signal, as shown in FIG. 5B. The ripples, such as noise, appearing near the bias portions of the signal voltage 43 are also cut off. The image quality correction signal shown in FIG. 5B is combined with the luminance signal shown in FIG. 5E, to produce the corrected luminance signal Y' shown in FIG. 5C. In the corrected luminance signal Y' shown in FIG. 5C, the positive portions of the high-frequency component of the luminance signal are not amplified, but only the negative portions of the high-frequency component are amplified, with the ripples such as noise removed. Furthermore, the negative portions of the luminance signal are corrected in accordance with the detected color density.

In this embodiment, the slice circuit is so constructed as to cut off the ripples such as noise as well as the positive portions of the high-frequency component of the luminance signal, but it will be noted that by changing the resistance ratio of the resistors 33, 29, and 35, it is possible to change the voltage value over which the high-frequency component of the luminance signal is cut off. Also, if it is desired to cut off only the positive portions of the high-frequency component of the luminance signal and correct for the ripples such as noise, the resistors 33, 29, and 35, for example, should only be chosen to have the same resistance value. In that case, the variations of the signal voltages will be as shown in FIG. 6.

FIGS. 6A, B and C show the signal voltage variations corresponding to those shown in FIGS. 5A, B and C, and the other signal voltage variations are not shown since they are the same as those shown in FIGS. 5D, E and F, respectively. In FIG. 6A, a signal voltage 47 is the base voltage of the transistor 30 shown in FIG. 4; as shown here, the level of this voltage is equal to the bias applied to the base of the transistor 34. The correction signal shown in FIG. 6B is the same as the negative portions extracted from the high-frequency component of the luminance signal shown in FIG. 6A. Furthermore, as can be seen from FIG. 6C, the amount of correction applied to the luminance signal in accordance with the color density can be made larger than that shown in FIG. 5C, also for the ripple components such as noise contained in the high-frequency component of the luminance signal.

FIG. 7 shows the waveforms of the various signal voltages for a case in which the resistors 33 and 35 are chosen to have the same resistance value while the resistance value of the resistor 29 is made slightly smaller than the individual resistance value of the resistors 33 and 35. Similarly to the foregoing example, FIGS. 7A, B and C, correspond to FIGS. 5A, B and C, and FIGS. 6A, B and C, respectively. The signal voltage 46 shown in FIG. 7A indicates the base voltage of the transistor 30, which, as shown, is set at a slightly higher level than the bias of the signal voltage 43 applied to the base of the transistor 34. The result is the waveform shown in FIG. 7B where the positive portions of the high-frequency component of the luminance signal are suppressed. As can be seem from the corrected luminance signal Y' shown in FIG. 7C, the amount of correction applied to the luminance signal can be made larger, in accordance with the color density, for the negative portions of the high-frequency component of the luminance signal and also for those portions of the positive portions thereof nearer to the negative portions.

(Embodiment 2)

Figure 8:
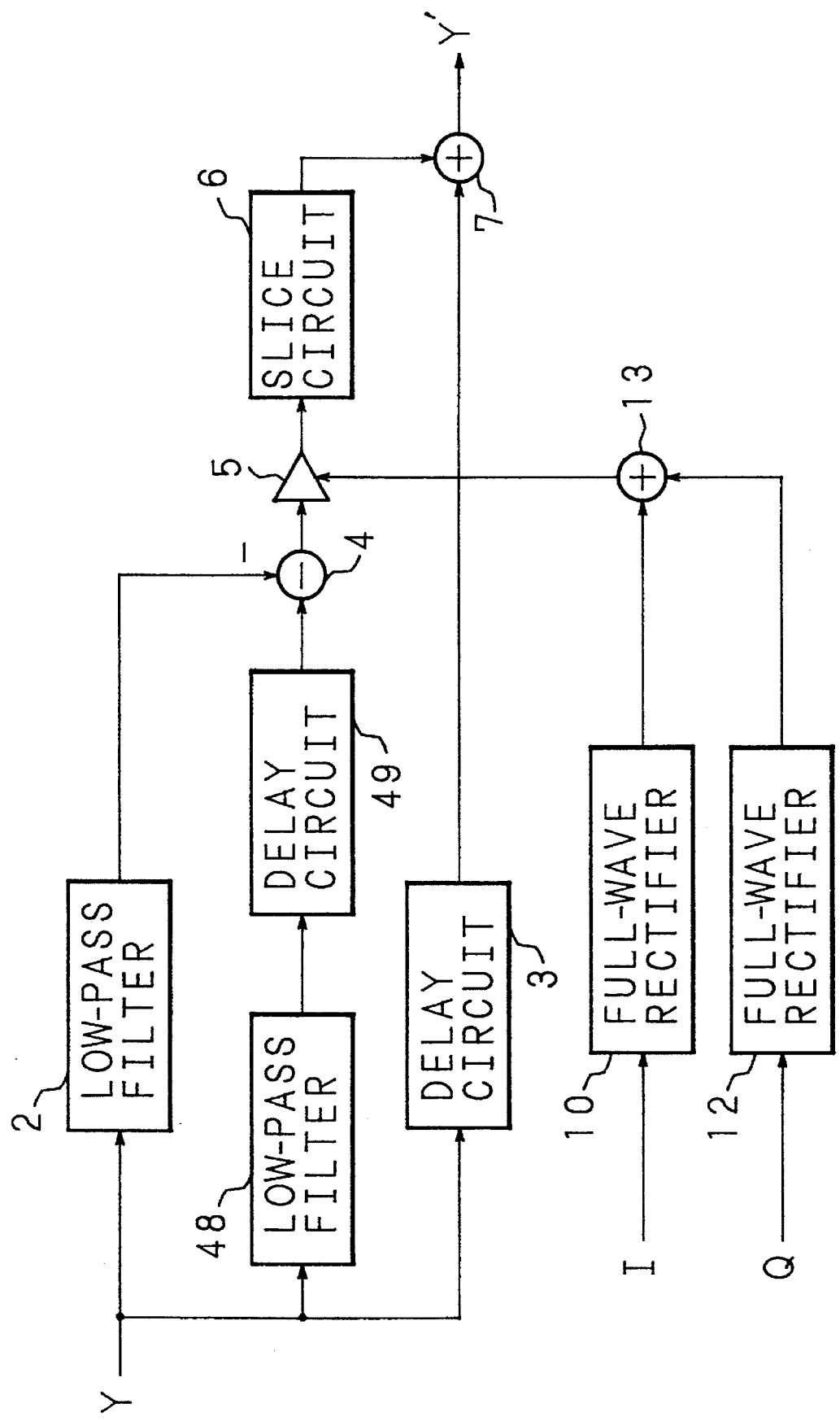
FIG. 8 is a block diagram showing the configuration of an image quality correction circuit (a second embodiment) according to the present invention.

FIG. 8 is a block diagram showing the configuration of an image quality correction circuit according to another embodiment (a second embodiment) of the present invention. The luminance signal Y is inputted to a subtractor 4 through a low-pass filter 2 and also through a series circuit consisting of a low-pass filter 48 and a delay circuit 49. Furthermore, the luminance signal Y is inputted to an adder 7 through a delay circuit 3. The low-pass filter 48 is chosen to have a higher cut-off frequency than that of the low-pass filter 2. The delay circuit 49 delays the luminance signal inputted to it so that the phase of the luminance signal passed through the low-pass filter 48 coincides with the phase of the luminance signal passed through the low-pass filter 2. In other respects, the configuration of this embodiment is the same as that shown in FIG. 3, and the same components are designated by the same reference numerals as those used in FIG. 3.

In the image quality correction circuit of this embodiment, the luminance signal supplied through the low-pass filter 2 is subtracted in the subtractor 4 from the luminance signal that is passed through the low-pass filter 48 having a higher cut-off frequency than the low-pass filter 2 and that is delayed through the delay circuit 49 to achieve phase synchronization to the luminance signal inputted through the low-pass filter 2. A desired high-frequency component of the luminance signal is thus obtained. This makes it possible to amplify a designated band component of the luminance signal in accordance with the color density detection signal.

By limiting the band in the high-frequency area in this manner, when a carrier chrominance signal and the luminance signal are separated from the composite video signal, any chrominance subcarrier frequency components remaining in the luminance signal can be removed before creating the correction signal. Furthermore, without the high-frequency band limiting, the amount of correction applied to the luminance signal would become excessive for portions where the luminance signal changes abruptly, and the resulting image would appear rather unnatural. Limiting the high-frequency band has the effect of appropriately limiting the amount of correction applied to the luminance signal.

(Embodiment 3)

Figure 9:
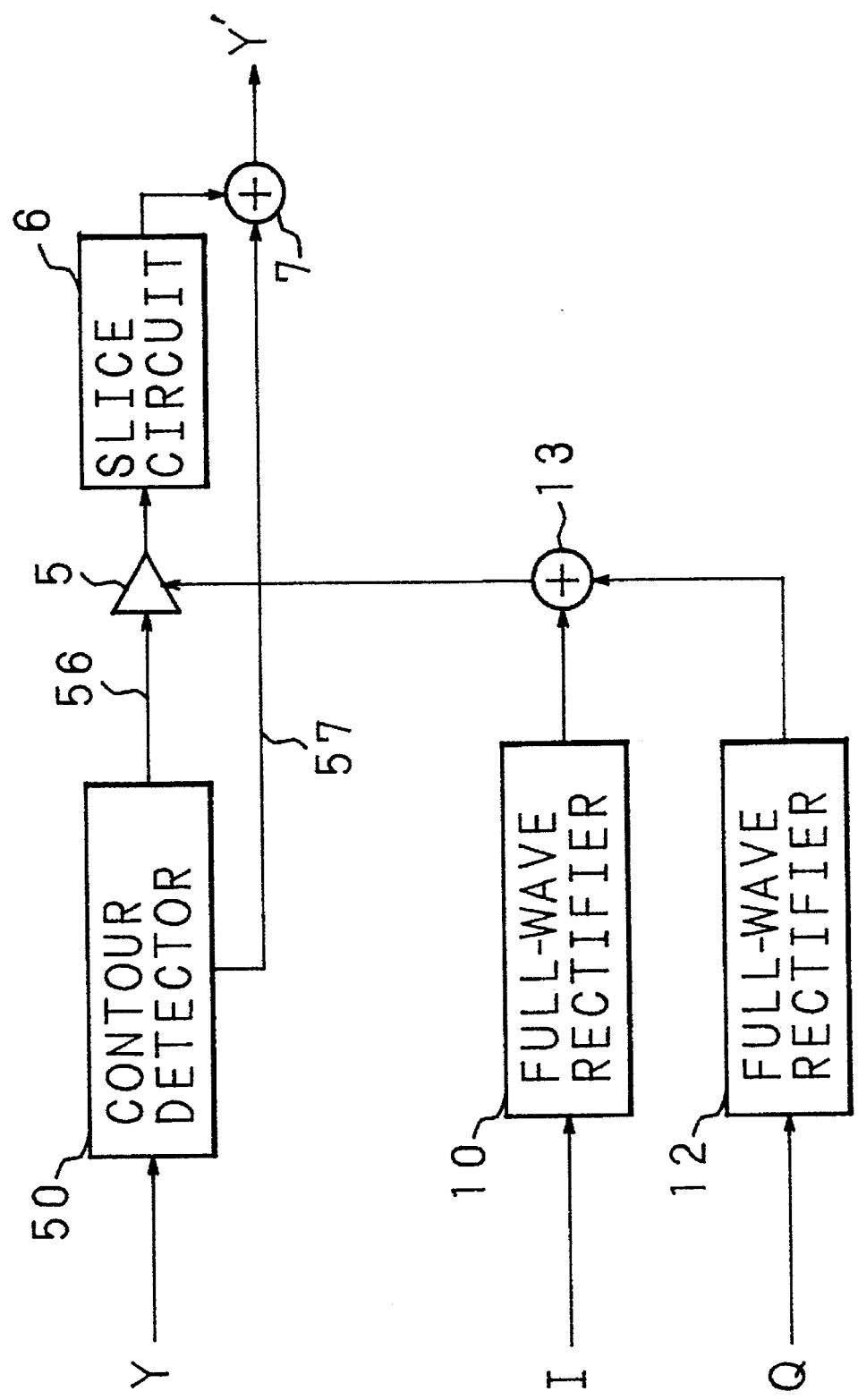
FIG. 9 is a block diagram showing the configuration of an image quality correction circuit (a third embodiment) according to the present invention.

FIG. 9 is a block diagram showing the configuration of an image quality correction circuit according to another embodiment (a third embodiment) of the present invention. The luminance signal Y is inputted to a contour detector 50. A contour signal 56 outputted from the contour detector 50 is supplied to a variable gain amplifier 5. A delayed luminance signal 57, also outputted from the contour detector 50 but delayed to achieve phase synchronization to the contour signal, is inputted to an adder 7. In other respects, the configuration of this embodiment is the same as that shown in FIG. 3, and the same components are designated by the same reference numerals as those used in FIG. 3.

Figure 10:
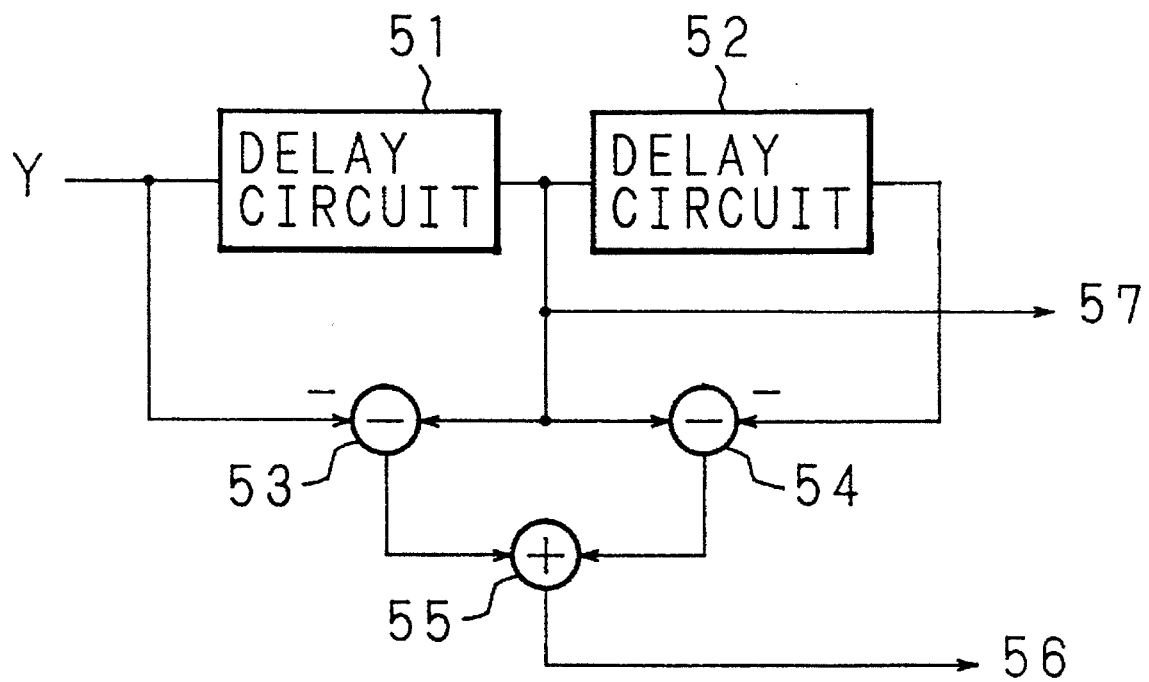
FIG. 10 is a block diagram showing the configuration of a contour detector.

FIG. 10 is a block diagram showing the configuration of the contour detector 50. The luminance signal Y is inputted to a subtractor 53 and also to a delay circuit 51 which introduces a delay of a very small amount of time, for example, of the order of 100 ns. The delayed luminance signal 57 outputted from the delay circuit 51 is outputted from the contour detector, while the same delayed luminance signal is inputted to subtractors 53 and 54 and also to a delay circuit 52 that has a similar delay characteristic to that of the delay circuit 51. The luminance signal delayed through the delay circuit 52 is inputted to the subtractor 54. Output signals from the subtractors 53 and 54 are supplied to an adder 55, from which the contour signal 56 is outputted.

In the contour detect, or 50, the inputted luminance signal Y is passed through the delay circuits 51 and 52, while the subtractor 53 subtracts the luminance signal Y directly inputted to it from the luminance signal passed through the delay circuit 51. The output signal of the subtractor 53 represents preshoots which are outputted as positive at the right edge of an image and as negative at the left edge of the image. On the other hand, in the subtractor 54, the luminance signal passed through the delay circuit 52 is subtracted from the luminance signal fed from the delay circuit 51. The output signal of the subtractor 54 represents overshoots which are outputted as positive at the left edge of an image and as negative at the right edge of the image. In the adder 55, the preshoots outputted from the subtractor 53 and the overshoots outputted from the subtractor 54 are summed, to obtain the contour signal 56. The phase of the contour signal 56 coincides with the phase of the luminance signal 57 outputted from the delay circuit 51. With this image quality correction circuit also, the image quality can be corrected, as with the image quality correction circuits of the foregoing embodiments.

In this embodiment, a contour detection method used in an aperture correction circuit is used to detect the high-frequency component of the luminance signal. Alternatively, a circuit for obtaining the second derivative of the luminance signal and extracting the resulting values may be used as the contour detector shown in FIG. 9. It is also possible to use a circuit in which the high frequencies of the luminance signal are directly extracted using a high-pass filter.

(Embodiment 4)

Figure 11:
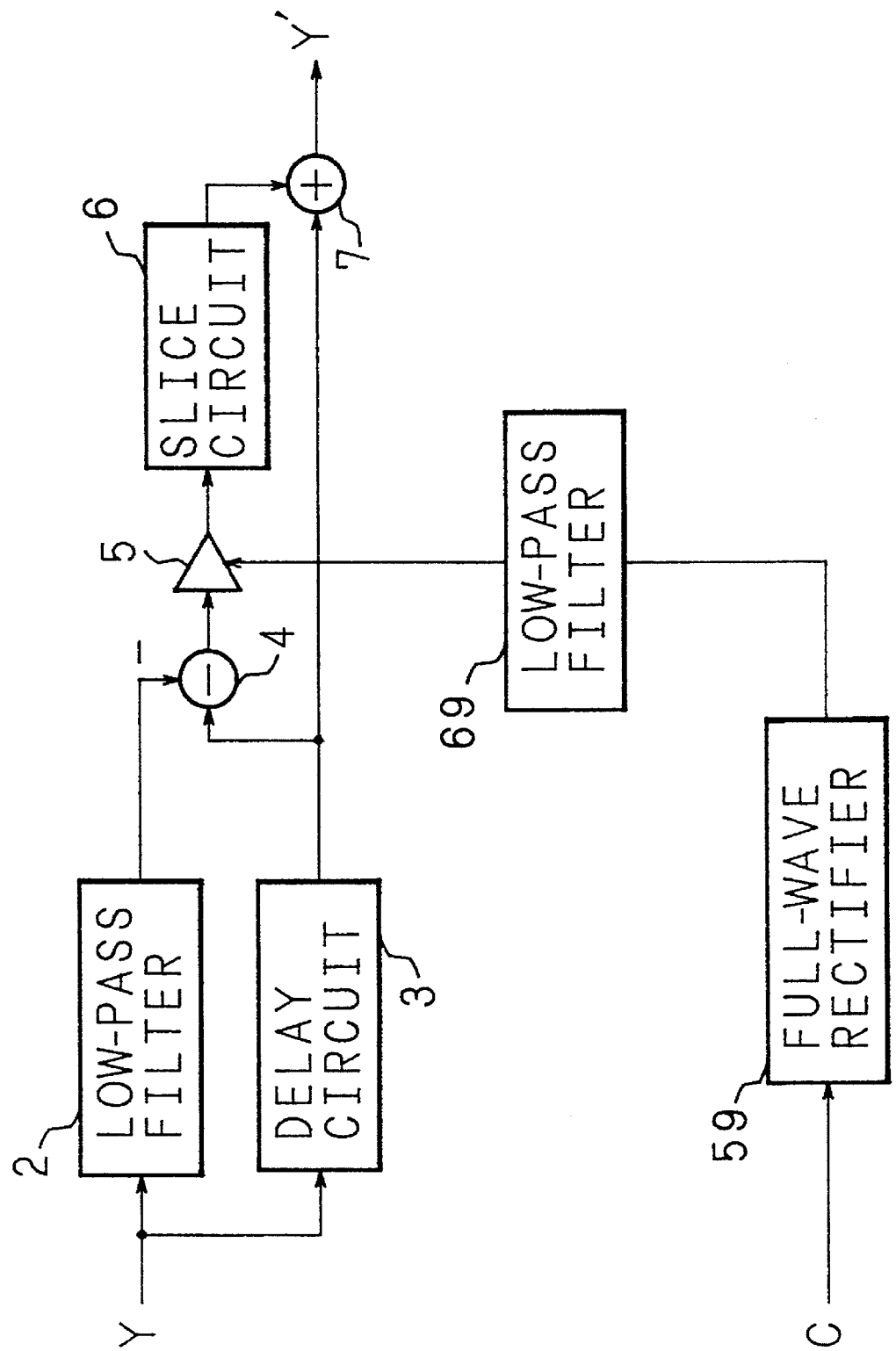
FIG. 11 is a block diagram showing the configuration of an image quality correction circuit (a fourth embodiment) according to the present invention.

FIG. 11 is a block diagram showing the configuration of an image quality correction circuit according to another embodiment (a fourth embodiment) of the present invention. A carrier chrominance signal C, which is delayed so that its phase coincides with the phase of the high-frequency component of the luminance signal outputted from the subtractor 4, is inputted to a full-wave rectifier circuit 59. The carrier chrominance signal C outputted from the full-wave rectifier circuit 59 is passed through a low-pass filter 69 where the chrominance subcarrier frequency components are removed before it is supplied to the variable gain amplifier 5. In other respects, the configuration of this embodiment is the same as that shown in FIG. 3, and the same components are designated by the same reference numerals as those used in FIG. 3.

According to this image quality correction circuit, after full-wave rectification through the full-wave rectifier circuit 59, the carrier chrominance signal C is stripped of the subcarrier wave components by the low-pass filter 69, and a color density detection signal proportional to the color density is obtained. Then, in accordance with the color density detection signal fed from the low-pass filter 69, the variable gain amplifier 5 controls the gain with which to amplify the high-frequency component of the luminance signal. This operation is the same as that of the image quality correction circuit illustrated in FIG. 3. Extraction of the high-frequency component of the luminance signal and correction of the luminance signal are also done in the same manner as previously described. In this embodiment, the means for detecting the color density from the carrier chrominance signal C is used in combination with the means for extracting the high-frequency component of the luminance signal as used in the image quality correction circuit shown in FIG. 3. Alternatively, the means for detecting the color density from the carrier chrominance signal C may be used in combination with the means for extracting the high-frequency component of the luminance signal as used in the image quality correction circuit shown in either FIG. 8 or FIG. 9. Further, a half-wave rectifier circuit may be used instead of the full-wave rectifier circuit 59.

(Embodiment 5)

Figure 12:
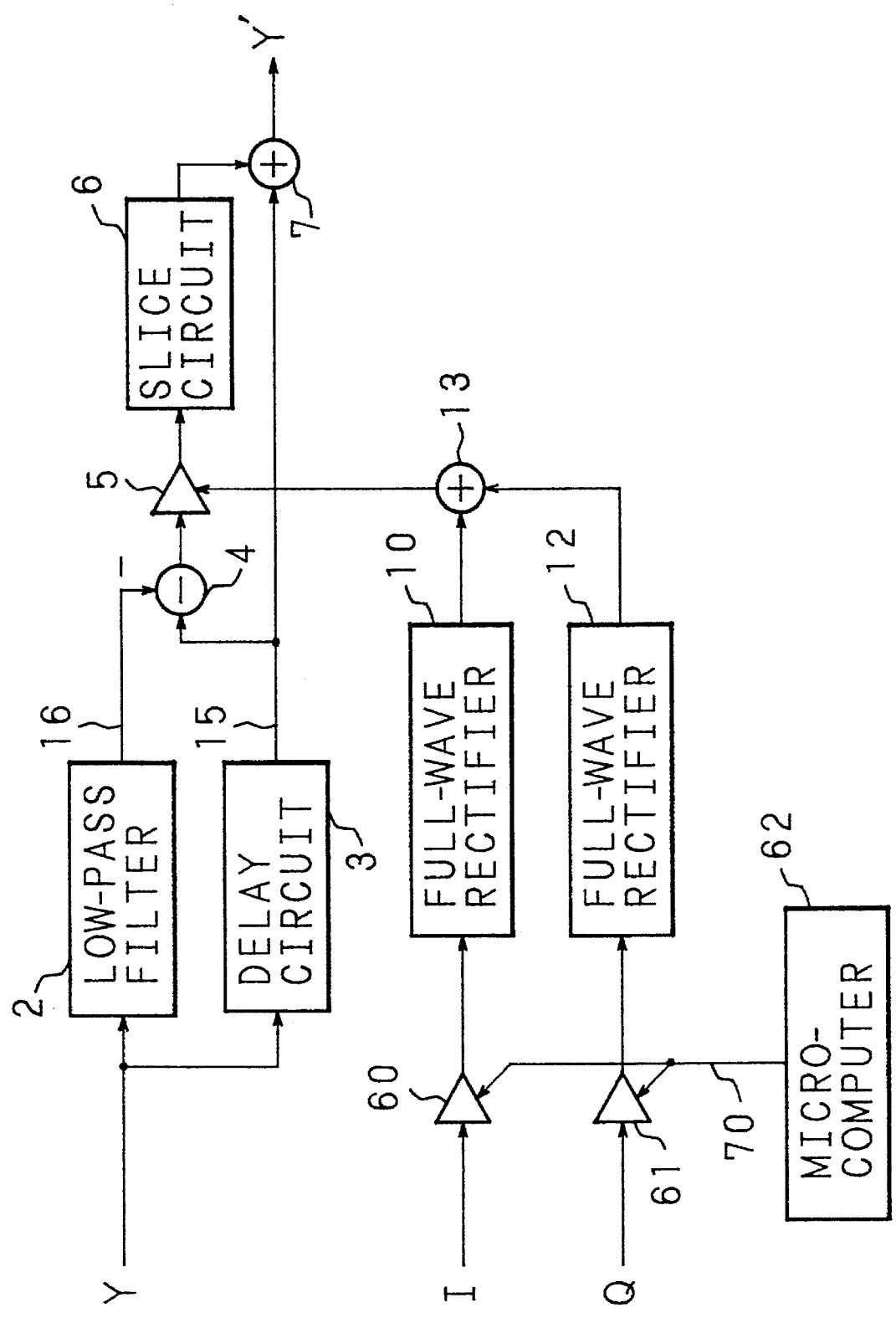
FIG. 12 is a block diagram showing the configuration of an image quality correction circuit (a fifth embodiment) according to the present invention.

FIG. 12 is a block diagram showing the configuration of an image quality correction circuit according to another embodiment (a fifth embodiment) of the present invention. The chrominance signal I is inputted to a variable gain amplifier 60, whose output signal is fed to a full-wave rectifier 10. The chrominance signal Q is inputted to a variable gain amplifier 61, whose output signal is fed to a full-wave rectifier 12. A microcomputer 62 supplies a control signal 70 to control the gain of the variable gain amplifiers 60 and 61. In other respect, the configuration of this embodiment is the same as that shown in FIG. 3, and the same components are designated by the same reference numerals as those used in FIG. 3.

A signal representing the value of an output voltage of a digital/analog converter or a signal representing the value of a voltage created by smoothing a pulse width modulation output is used as the control signal 70 supplied to the variable gain amplifiers 60 and 61. In the image quality correction circuit of this embodiment, the variable gain amplifier 60, whose gain for amplification is controlled in accordance with the voltage value of the control signal 70 supplied from the microcomputer 62, amplifies the chrominance signal I and supplies the amplified signal to the full-wave rectifier 10. The variable gain amplifier 61, whose gain for amplification is controlled in like manner, amplifies the chrominance signal Q and supplies the amplified signal to the full-wave rectifier 12. The full-wave rectifiers 10, 12 and the adder 13 operate in the same manner as in the image quality correction circuit shown in FIG. 3. In this embodiment also, the adder 13 outputs a color density detection signal corresponding to the color density. This color density detection signal corresponds to the sum of the absolute value of the chrominance signal I and the absolute value of the chrominance signal Q; therefore, by controlling the amplitude of the chrominance signals I and Q by the microcomputer 62, the amplitude of the color density detection signal can also be controlled at the same time.

This means that the gain of the high-frequency component of the luminance signal amplified by the variable gain amplifier 5 is controlled by the microcomputer 62, which further means that the amount of correction itself, by which the corrected luminance signal Y' is produced, is controlled by the microcomputer 62.

With this configuration, the amount of correction applied to the luminance signal can be changed using the microcomputer, according to the kind of the picture signal or to the preferences of the viewer. It will also be noted that the circuit section consisting of the variable gain amplifier 60 and full-wave rectifier 10 and the circuit section consisting of the variable gain amplifier 61 and full-wave rectifier 12 can be constructed easily by using a four-quadrant variable gain amplifier.

Further, instead of using the microcomputer 62, the control signal 70 used to control the gain of the variable gain amplifiers 60, 61 may be created using a voltage settable by a variable resistor. In this case also, the amount of correction applied to the luminance signal can be changed according to the preferences of the viewer.

(Embodiment 6)

Figure 13:
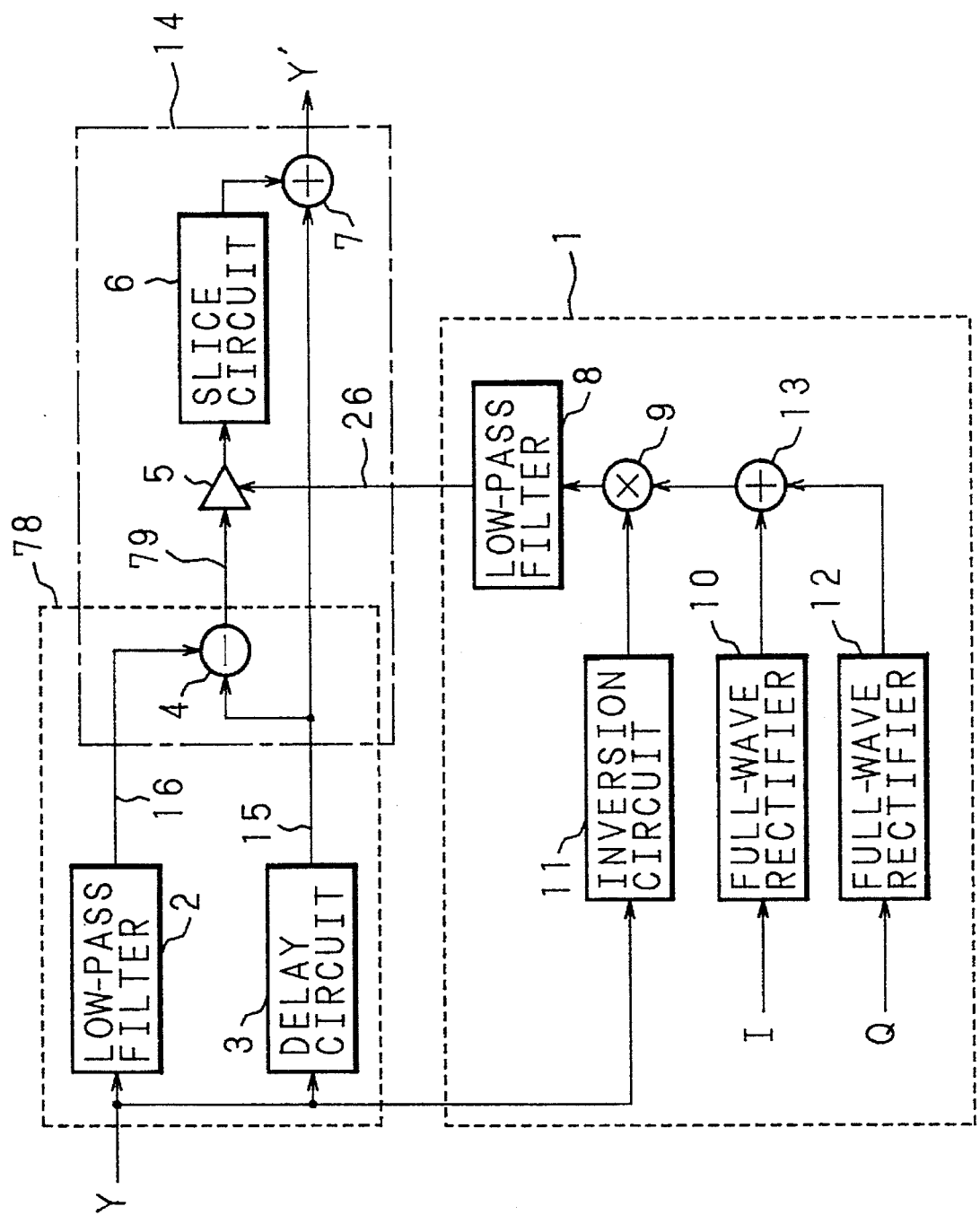
FIG. 13 is a block diagram showing the configuration of an image quality correction circuit (a sixth embodiment) according to the present invention.

FIG. 13 is a block diagram showing the configuration of an image quality correction circuit according to another embodiment (a sixth embodiment) of the present invention. In the figure, the reference numeral 1 designates a color density detector, and 78 indicates a high-frequency component detector for detecting the high-frequency component of the luminance signal. The luminance signal Y is inputted to an inversion circuit 11 as well as to the low-pass filter 2 and the delay circuit 3. The output signal 79 of the subtractor 4 represents the high-frequency component of the luminance signal and is inputted to the variable gain amplifier 5. On the other hand, the output signal of the adder 13 is supplied as an input to a multiplier 9. The output signal of the inversion circuit 11 also is supplied to the multiplier 9, whose output is then fed to a low-pass filter 8. The output signal of the low-pass filter 8 is applied to the control terminal of the variable gain amplifier 5. In other respect, the configuration of this embodiment is the same as that shown in FIG. 3, and the same components are designated by the same reference numerals as those used in FIG. 3.

In this embodiment, a signal corresponding to the color density is outputted from the adder 13, but this output signal of the adder 13 cannot be said to be optimum as the color density detection signal contemplated under the present invention. This is because the amplitude ratio of the luminance component is not reflected in the output signal, as described above. To address this, in the present embodiment the output signal of the adder 13 corresponding to the color density and the inverted luminance signal outputted from the inversion circuit 11 are multiplied together in the multiplier 9. The output of the multiplier 9 is supplied as a color density detection signal 26 to the variable gain amplifier 5 via the low-pass filter 8. The color density detection signal 26 is created by correcting the output signal of the adder 13 corresponding to the color density to a relatively low level for a color of high luminosity and to a relatively high level for a color of low luminosity. The low-pass filter 8 is provided to remove the high-frequency component of the inverted luminance signal contained in the output signal of the multiplier 9, thereby preventing the gain of the high-frequency component from dropping or distortion from being caused as a result of the gain control of the variable gain amplifier 5.

FIG. 14 shows the waveforms of the various signals for explaining the operation of the color density detector 1. In FIG. 14, 14A shows the inverted luminance signal outputted from the inversion circuit 11, wherein 82 indicates a reference voltage for the inverted luminance signal to be inputted to the multiplier 9, i.e., the difference between the inverted luminance signal voltage and the reference voltage 82 is used in the multiplication operation performed by the multiplier 9; 14B shows the chrominance signal I, wherein 83 indicates a reference voltage for the chrominance signal I to be inputted to the full-wave rectifier 10; 14C shows the chrominance signal Q, wherein 84 indicates a reference voltage for the chrominance signal Q to be inputted to the full-wave rectifier 12; 14D shows the waveform of the full-wave rectified chrominance signal I outputted from the full-wave rectifier 10, wherein 85 indicates a reference voltage for the full-wave rectified chrominance signal I to be inputted to the adder 13; 14E shows the waveform of the full-wave rectified chrominance signal Q outputted from the full-wave rectifier 12, wherein 86 indicates a reference voltage for the full-wave rectified chrominance signal Q to be inputted to the adder 13; 14F shows the output signal of the adder 13, i.e., the signal representing the color density given as the sum of the full-wave rectified chrominance signals I and Q wherein 87 indicates a reference voltage for the signal corresponding to the color density to be inputted to the multiplier 9; 14G shows the output signal of the multiplier 9, wherein 88 indicates a reference voltage for the waveform 14G, the reference voltage level indicating the absence of color; and 14H shows the color density detection signal 26 outputted from the low-pass filter 8, wherein 89 indicates a reference voltage for the color density detection signal 26 to be inputted to the variable gain amplifier 5, the reference voltage level indicating the absence of color.

The operation of the color density detector 1 will be described below with reference to FIG. 14. FIG. 14 shows the waveforms obtained when a color bar signal is processed in the color density detector 1 in the image quality correction circuit of the present embodiment. When the chrominance signal I of 14B is full-wave rectified by the full-wave rectifier 10 with reference to the reference voltage 83, the waveform of 14D results. Likewise, when the chrominance signal Q of 14C is full-wave rectified by the full-wave rectifier 12 with reference to the reference voltage 84, the waveform of 14E results. The waveform 14D of the full-wave rectified chrominance signal I and the waveform 14E of the full-wave rectified chrominance signal Q are added together in the adder 13, and the result is the waveform 14F. It is assumed here that the voltage level representing the reference voltage 87 is outputted when the voltage levels of the reference voltages 83 and 84 are inputted to the adder 13. When the inverted luminance signal of 14A as the reference voltage 82 and the signal waveform of 14F multiplied together in the multiplier 9, the waveform 14G results. The reference voltage 82 is the zero level of the inverted luminance signal 14A for multiplication, while the reference voltage 87 is the zero level of the signal 14F for multiplication. The reference voltage 88 is the zero level for the result of the multiplication and represents the voltage level when no color is present. The waveform 14H results when the waveform 14G is stripped of its high-frequency component through the low-pass filter 8. The reference voltage 89 represents the voltage level when no color is present. From the observation of the waveform 14H, in conjunction with the previously given Table 1, it can be seen that the amplitude is increased in the direction of decreasing high-frequency component and is reduced in the direction of increasing high-frequency component.

Figure 15:
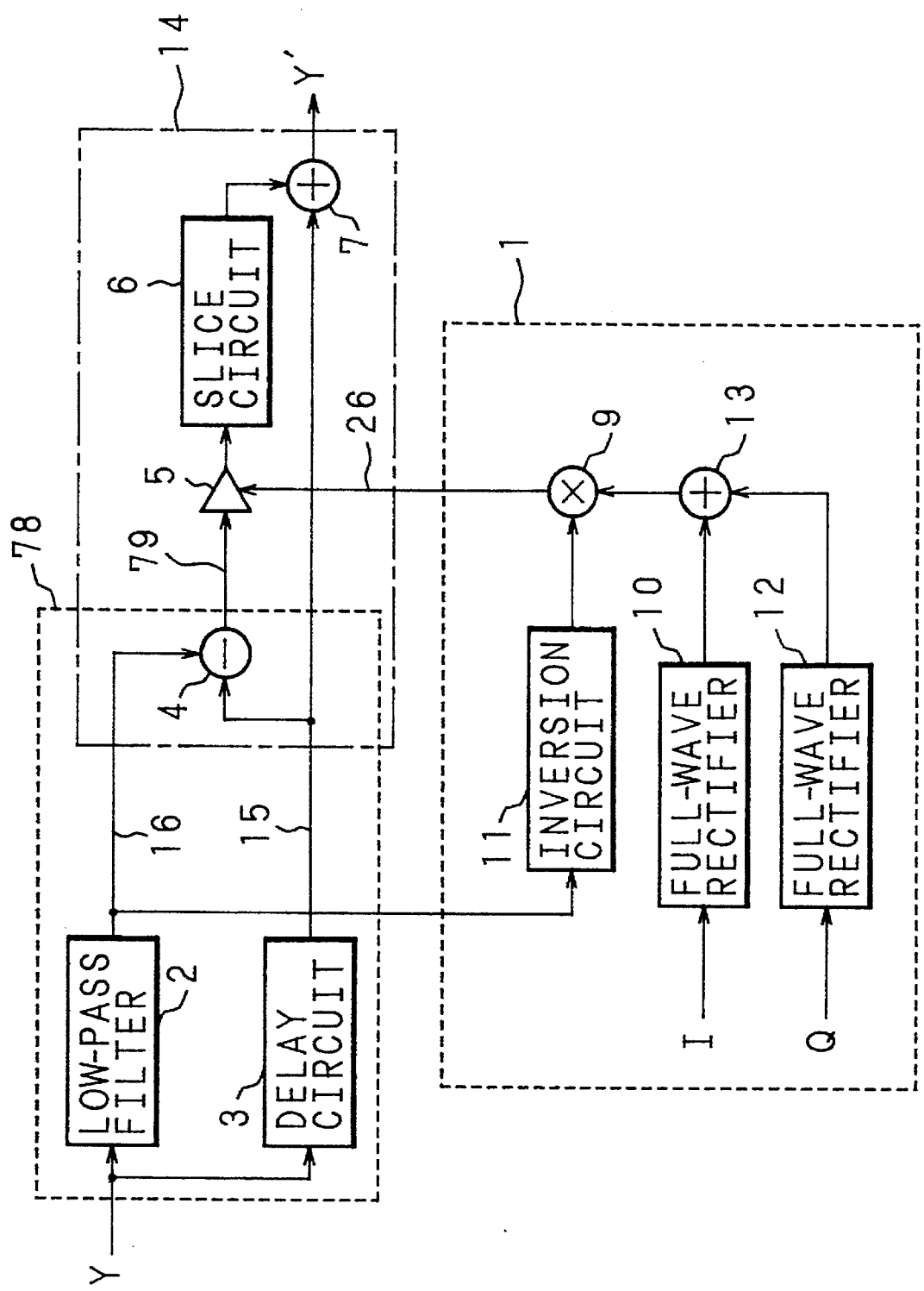
FIG. 15 is a block diagram showing the configuration of a modified example of the sixth embodiment.

FIG. 15 shows a modified example of the sixth embodiment. In FIG. 13, the luminance signal Y is inputted directly to the inversion circuit 11, while in FIG. 15, the low-frequency component 16 of the luminance signal passed through the low-pass filter 2 is input ted to the inversion circuit 11. Furthermore, in FIG. 13, the multiplier 9 and the variable gain amplifier 5 are coupled together via the low-pass filter 8, but in the configuration of FIG. 15, the low-pass filter 8 is eliminated. The configuration of FIG. 15 is effective when the cut-off frequency of the low-pass filter 2 is sufficiently low to ensure that the high-frequency component of the inverted luminance signal that can adversely affect the processing for variable gain amplification, as previously mentioned, does not remain in the color density detection signal 26 outputted from the multiplier 9. The resultant color density detection signal 26 is substantially the same as that shown in FIG. 14H.

In the configurations of FIGS. 13 and 15, the chrominance signals I and Q may be replaced by the color-difference signals R-Y and B-Y; in that case also, substantially the same effect can be obtained.

Figure 16:
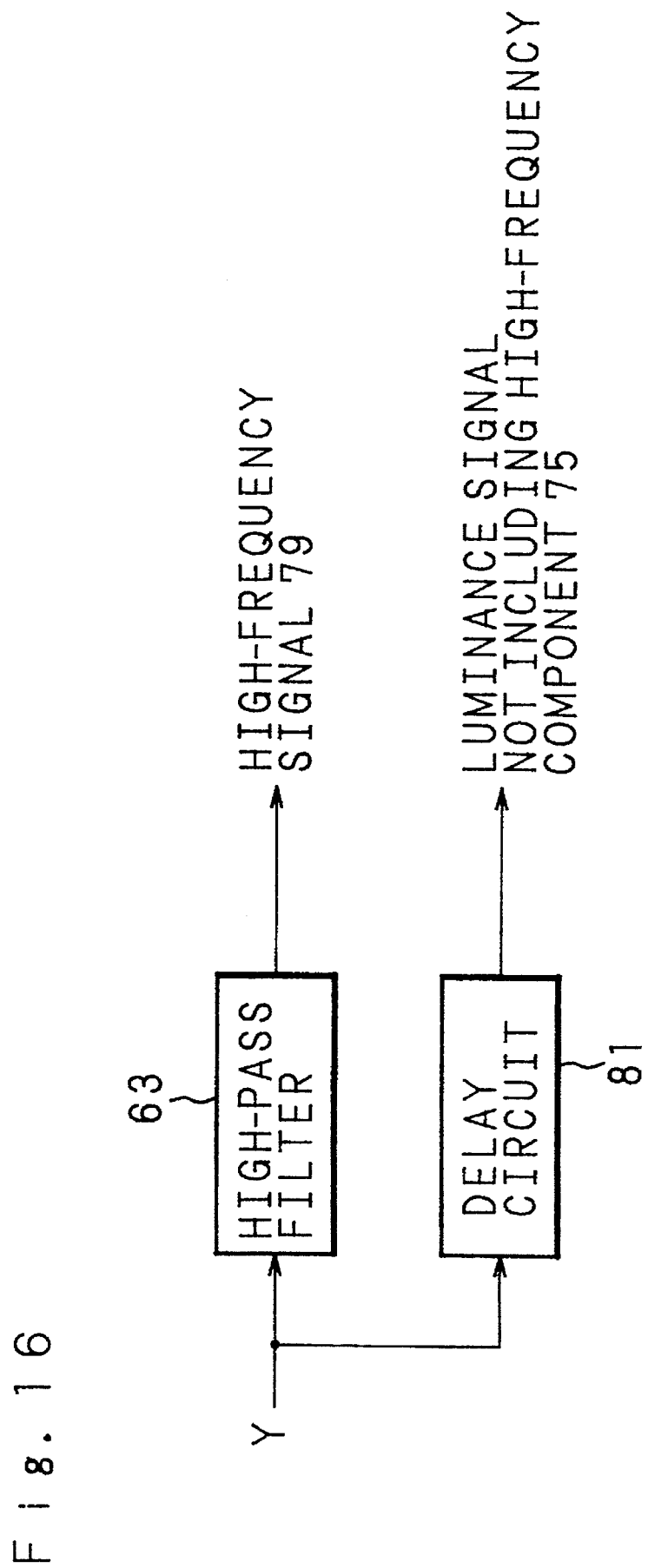
FIG. 16 is a block diagram showing an alternative configuration for a high-frequency component detector in the sixth embodiment.

FIG. 16 shows a modified example of the high-frequency component detector 78 shown in FIG. 13. The luminance signal Y is inputted to a delay circuit 81, and also to a high-pass filter 80 which outputs a high-frequency signal 79. The delay circuit 81 outputs a luminance signal 75 containing the high-frequency component. The high-pass filter 80 extracts only the high-frequency component from the luminance signal Y, and outputs it as the high-frequency signal 79 which is inputted to the variable gain amplifier 5 shown in FIG. 13. On the other hand, the uncorrected luminance signal is delayed through the delay circuit 3 so as to achieve phase synchronization to the high-frequency signal 79 delayed due to the processing through the high-pass filter 80, and is then inputted to the adder 7 of FIG. 13 as the luminance signal 15 containing the high-frequency component.

(Embodiment 7)

Figure 17:
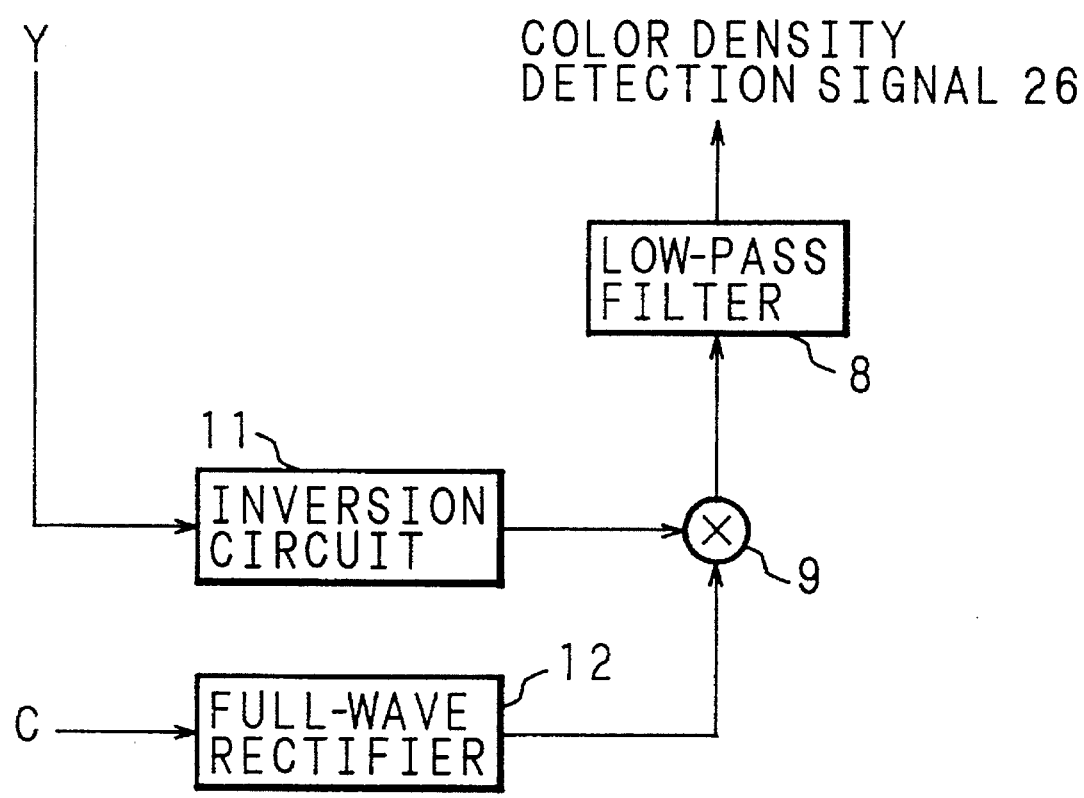
FIG. 17 is a block diagram showing the configuration of a color density detector in an image quality correction circuit (a seventh embodiment) according to the present invention.

FIG. 17 is a block diagram showing the configuration of a color density detector in an image quality correction circuit according to another embodiment (a seventh embodiment) of the present invention. The numeral 90 designates a full-wave rectifier where the inputted carrier chrominance signal C is full-wave rectified to produce a signal corresponding to the color density. This signal is inputted to the multiplier 9. The configuration other than the color density detector is the same as that shown in FIG. 13.

In FIG. 17, the carrier chrominance signal C is inputted to the full-wave rectifier 90 which then outputs a signal corresponding to the color density. This signal corresponds to the output of the adder 13 in the example of FIG. 13; when the color bar signal is inputted, the resulting output signal is essentially the same as the signal of FIG. 14F but contains harmonics of the chrominance carrier frequency. The signal output from the full-wave rectifier 90 is fed to the multiplier 9. Subsequent processing is the same as that illustrated in FIG. 13. It will be noted, however, that not only the high-frequency component of the inverted luminance signal but also the harmonics of the chrominance carrier frequency are removed by the action of the low-pass filter 8, so that the signal outputted from the low-pass filter 8 in FIG. I7 is essentially the same as the color density signal outputted from the color density detector 1 in FIG. 13.

(Embodiment 8)

Figure 18:
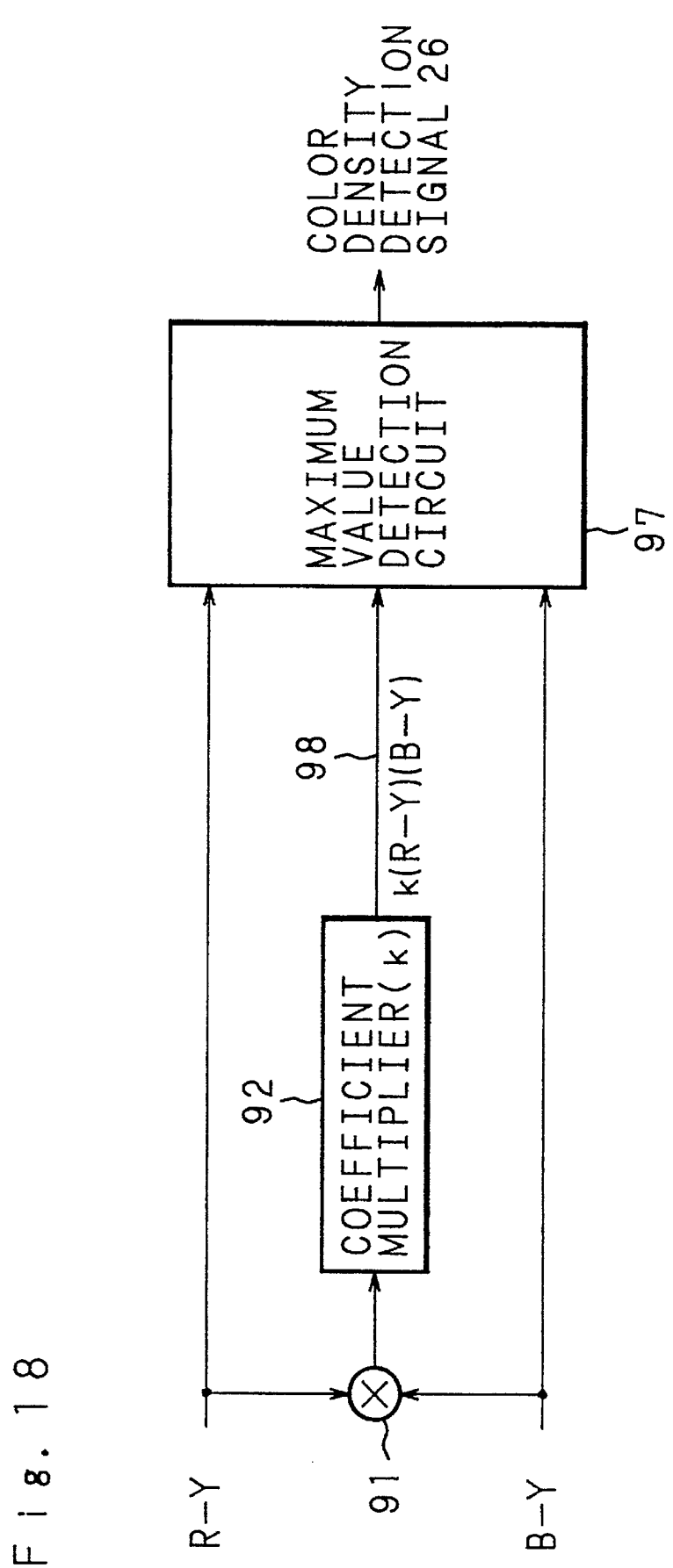
FIG. 18 is a block diagram showing the configuration of a color density detector in an image quality correction circuit (an eighth embodiment) according to the present invention.

FIG. 18 is a diagram showing the configuration of a color density detector in an image quality correction circuit according to another embodiment (an eighth embodiment) of the present invention. In FIG. 18, the color-difference signal R-Y is inputted to a maximum value detection circuit 97 and also to a multiplier 91. The color-difference signal B-Y also is inputted to the maximum value detection circuit 97 and the multiplier 91. The output of the multiplier 91 is fed to a coefficient multiplier 92 acting as an amplifier circuit, where it is multiplied by a coefficient k to produce a signal 98 expressed as k(R-Y)(B-Y). This signal is inputted to the maximum value detection circuit 97. The maximum value detection circuit 97 outputs a color density detection signal 26. The configuration other than the color density detector is the same as that shown in FIG. 13.

In the operation of FIG. 18, the incoming color-difference signals R-Y and B-Y are first multiplied together in the multiplier 91, and then multiplied by the coefficient k in the coefficient multiplier 92. The result is fed to the maximum value detection circuit 97 to which the color-difference signals R-Y and B-Y are also inputted directly. The maximum values among the three are then detected, and the resulting output is the color density detection signal 26.

Figure 19:
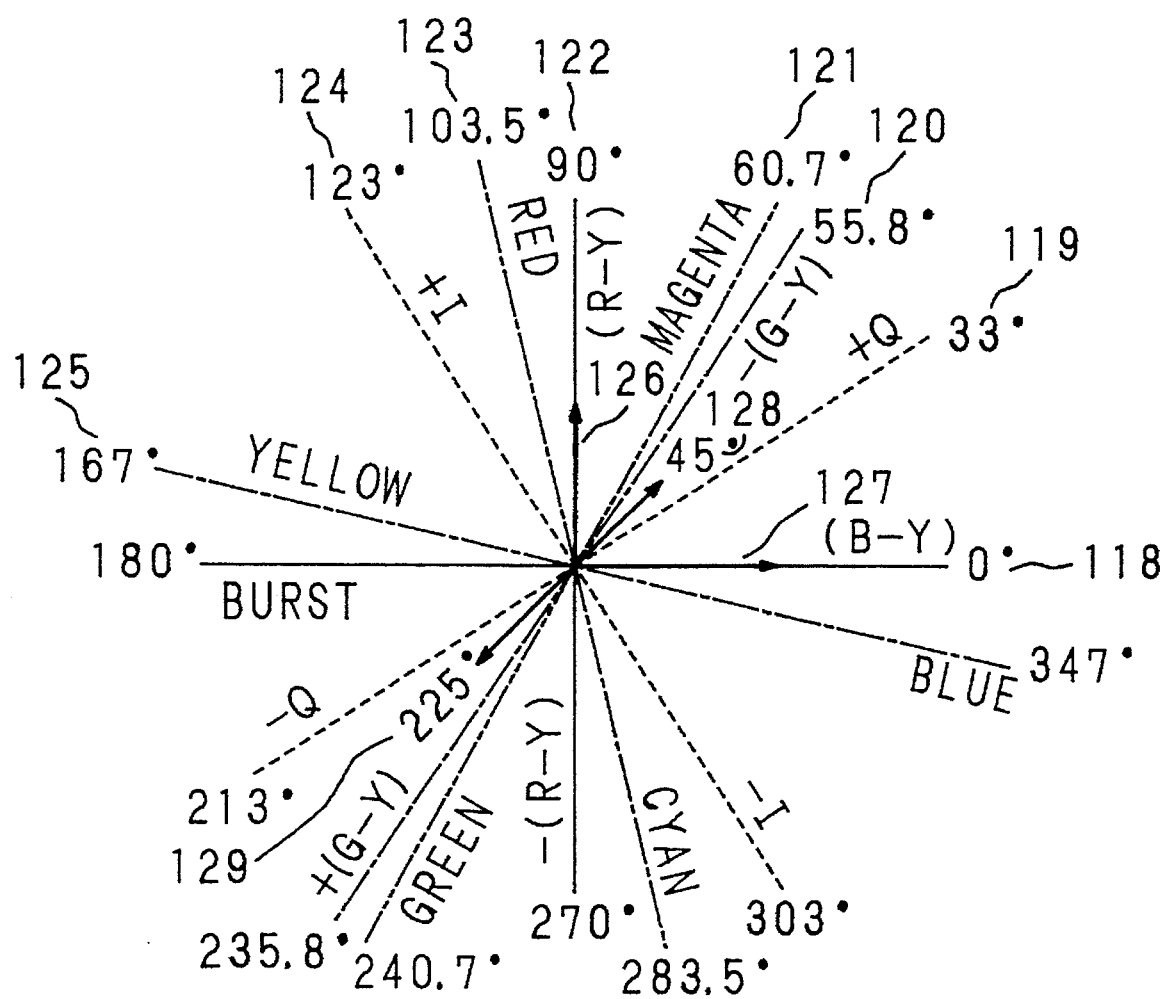
FIG. 19 is a diagram showing vector orientations where component signals in the color density detector of the eighth embodiment are at their maximum values.
Figure 20C:
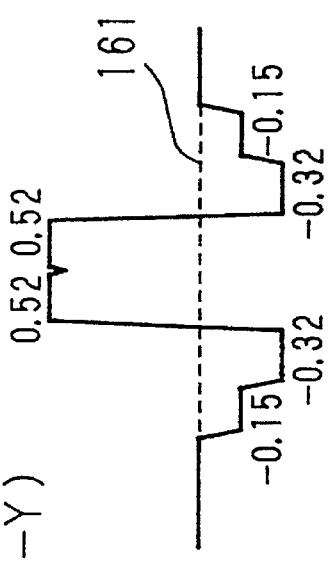
FIGS. 20A, 20B, 20C and 20D are output waveform diagrams for various parts of the color density detector in the eighth embodiment when color bars are inputted.
Figure 20D:
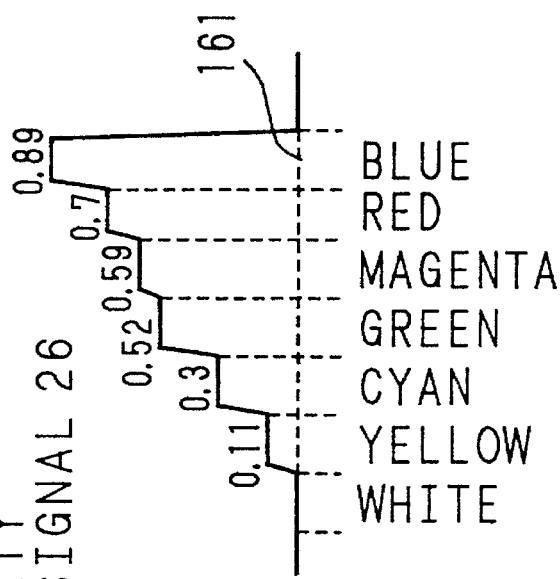
Figure 20A:
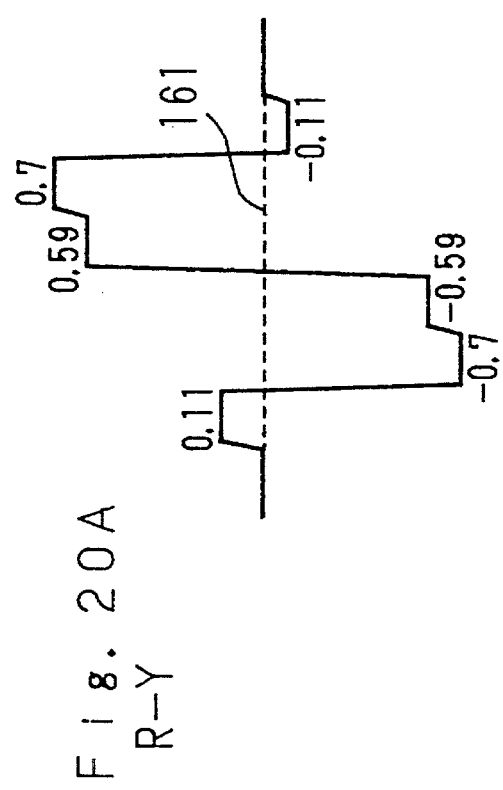
Figure 20B:
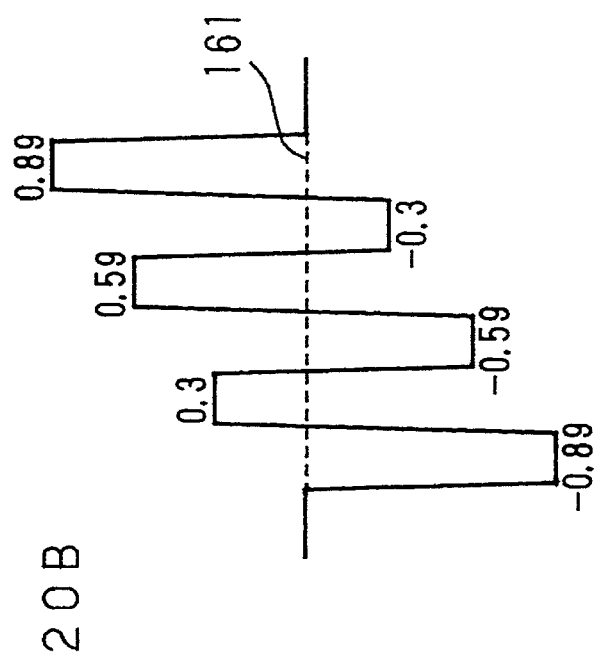

Referring now to FIG. 19, we will describe why the three signals, R-Y, B-Y, and k(R-Y)(B-Y), are needed. FIG. 19 shows color vector coordinates with the phase of the burst signal at 180°. In the figure, the numeral 118 indicates the vector direction of the B-Y axis, 119 indicates the vector direction joining the 33° point of the Q signal to the 213° point of the −Q signal, 120 indicates the vector direction joining the 55.8° point of −(G-Y) to the 235.8° of G-Y, 121 indicates the vector direction joining the 60.8° point of magenta to the 240.7° point of green, 123 indicates the vector direction joining the 103.5° point of red to the 283.5° of cyan, and 124 indicates the vector direction joining the 123° point of the +I signal to the 303° point of the −I signal. Further, the numeral 126 indicates the vector orientation where R-Y in FIG. 18 is at a maximum, which is close to the orientation of the red vector. The numeral 127 indicates the vector orientation where B-Y is at a maximum, which is close to the orientation of the blue vector. The numeral 128 indicates the vector orientation where k(R-Y)(B-Y) in FIG. 18 is at a maximum in the first quadrant, which is close to the orientation of the vector of magenta-hued colors, while 129 indicates the vector orientation where k(R-Y)(B-Y) is at a maximum in the third quadrant, which is close to the orientation of the vector of green-hued colors.

The vector orientations, 126, 127, 128, and 129, in FIG. 19 approximately match the vector directions of the colors having a large drop in the high-frequency areas. These represents the directions in which the three signals, R-Y, B-Y, and k(R-Y)(B-Y), in FIG. 18 are at their respective maximum values. Therefore, when the maximum value of each of these three signals is detected, the detected amount of color density is larger for colors having a larger drop in the high-frequency areas.

FIG. 20 shows the results of color density detection performed on a color bar signal by using the configuration shown in FIG. 18. FIG. 20A shows the waveform of the R-Y signal, 20B the waveform of the B-Y signal, and 20C the waveform of k(R-Y)(B-Y) for k=1.5. The diagram 20D shows the color density detection signal 26 obtained as a result of detecting the maximum values from 20A, 20B and 20C. In this figure, the numbers attached alongside the respective waveforms indicate the amplitude ratios when the 100% amplitude is expressed as 1.0. Numeral 161 indicates a reference voltage for each signal of FIGS. 20A, 20B, 20C and 20D. The respective reference voltages for each signal of FIGS. 20A, 20B, 20C and 20D have the same value. Observation of the waveform of the color density detection signal 26 shown in FIG. 20D reveals that the amplitude of the color density detection signal 26 is relatively small for colors containing a larger luminance component, such as yellow and cyan, while the amplitude is relatively large for darker colors containing a smaller luminance component, such as blue and red. It can therefore be seen that the amplitude ratio of the luminance signal is considered in the detection of the color density. Strictly speaking, the ratio given is not the optimum value because, as previously mentioned, division by the luminance signal would be necessary to give the accurate value. In reality, however, there is not much need to give the accurate ratio.

FIG. 21 shows a specific example of the configuration of the maximum value detection circuit 97. Shown in the blocks 134, 135, and 136 in FIG. 21 are equivalent circuits. First, the internal configuration of the block 134 will be described. The input color-difference signal R-Y is applied to the base of a transistor 131 whose emitter is coupled to power supply V via a resistor 132 as well as to the base of a transistor 133. The collector of the transistor 131 is grounded. The emitter of the transistors 133 is coupled to a constant voltage source 27 via a resistor 137, and is also connected to the emitters of corresponding transistors in the blocks 135 and 136, the result being outputted as the voltage of the color density detection signal 26. The color-difference signal R-Y inputted to the block 134 corresponds to the color-difference signal B-Y in the block 135 and the k(R-Y)(B-Y) signal in the block 136. The constant voltage outputted from the constant voltage source 27 serves as the reference voltage for the color density detection signal 26, and represents the voltage level when no color is present. The constant voltage outputted from the constant voltage source 27 also serves as the reference voltage for each of the R-Y, B-Y, and k(R-Y)(B-Y) signals, so that the voltage level when no color is present is equal to the reference voltage. The reference voltage for the constant voltage source 27 corresponds to the reference voltage 161 in FIG. 20.

In FIG. 21, the color-difference signal R-Y is applied to the base of the transistor 131, but since the transistor 131 forms an emitter follower together with the resistor 132, the AC amplitude of the voltage changes very little, while the DC component is increased by the base-emitter voltage of the transistor 131 and is outputted from the emitter and applied to the base of the transistor 133. The transistor 133 also forms an emitter follower together with the resistor 137, but because the emitters of the output transistors in the blocks 135 and 136 are also connected to the common line, forming an emitter follower with the resistor 137, current flows into the resistor 137 from the transistor whose base voltage is the highest of the three, and the remaining two transistors are put in the off state. As a result, the greatest value among the R-Y, B-Y, and k(R-Y)(B-Y) is outputted from the common emitter as the color density detection signal. 26.

Further, since the transistor 133 forms an emitter follower, the AC amplitude is not amplified, but only the DC component decreases relative to the base by the base-emitter voltage and is outputted from the emitter. Therefore, for no-color portions, the input voltage is equal to the output voltage. That is, since the input voltage for no-color portions becomes equal to the reference voltage which is the voltage of the constant voltage source 27, the output voltage for no-color portions also becomes equal to the voltage of the constant voltage source 27.

In this embodiment, only (R-Y)(B-Y) is assigned a weight, but R-Y and B-Y may also be weighted respectively, after which maximum values among the three signals may be detected.

(Embodiment 9)

Figure 22:
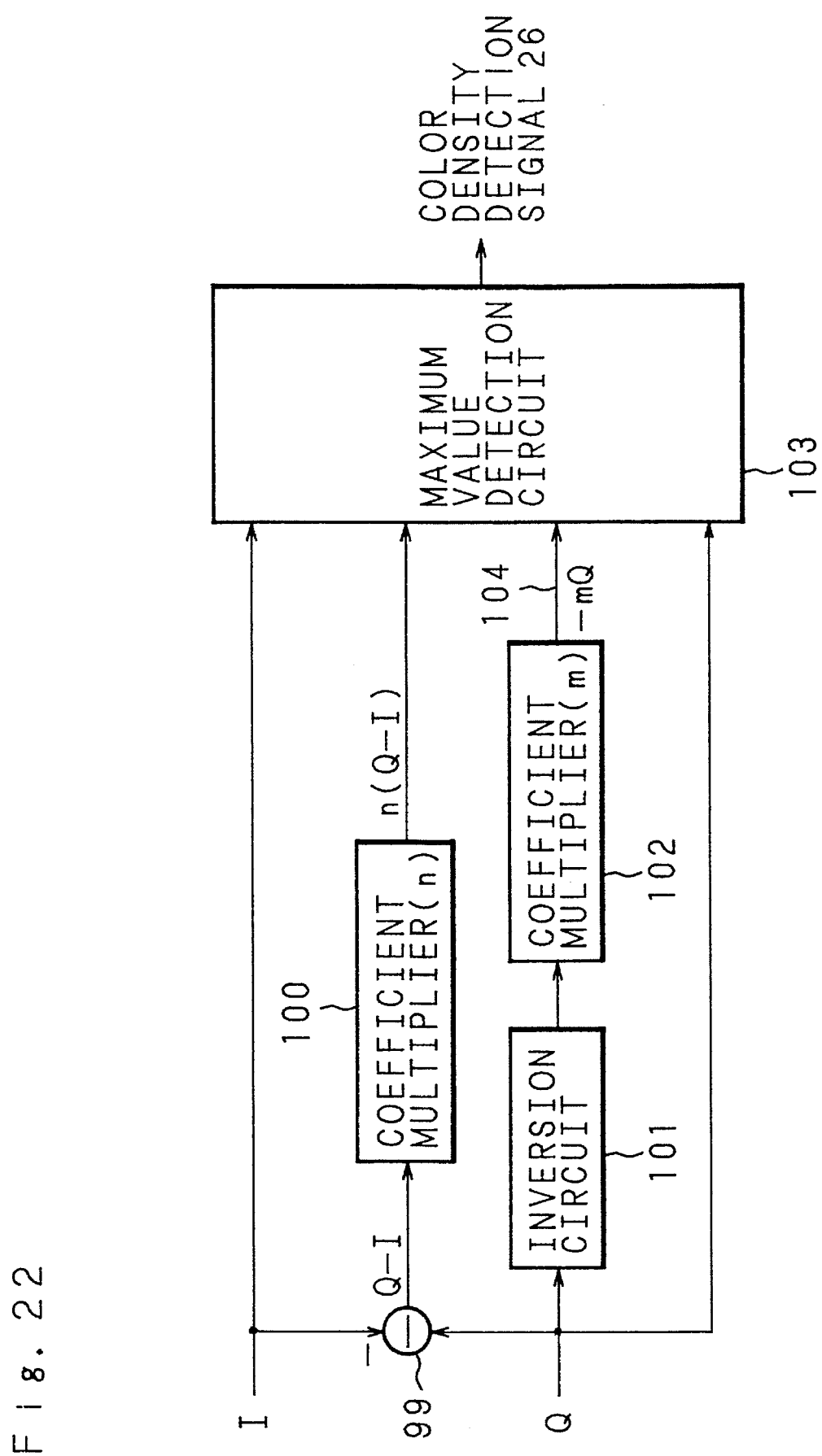
FIG. 22 is a block diagram showing the configuration of a color density detector in an image quality correction circuit (a ninth embodiment) according to the present invention.

FIG. 22 shows the configuration of a color density detector in an image quality correction circuit according to another embodiment (a ninth embodiment) of the present invention. In FIG. 22, the chrominance signal I is inputted to a subtractor 99 and a maximum value detection circuit 103, while the chrominance signal Q is inputted to an inversion circuit 101 as well as to the subtractor 99. The output of the subtractor 99 is multiplied by a coefficient n in a coefficient multiplier 100 acting as an amplifier circuit, and the result is fed into the maximum value detection circuit 103. On the other hand, the output of the inversion circuit 101 is multiplied by a coefficient m in a coefficient multiplier 102 acting as an attenuation circuit, and the result is fed into the maximum value detection circuit 103. The maximum value detection circuit 103 outputs a color density detection signal 26.

The processing in FIG. 22 will now be described. The chrominance signals I and Q inputted to the subtractor 99 are subtracted one from the other to produce the result Q-I, which is multiplied by n in the coefficient multiplier 100 and then fed into the maximum value detection circuit 103 as a first input signal. On the other hand, the chrominance signal Q inverted through the inversion circuit 101 is multiplied by m in the coefficient multiplier 102 and then fed into the maximum value detection circuit 103 as a second input signal. The chrominance signal I is also inputted directly to the maximum value detection circuit 103 as a third input signal. The chrominance signal Q is also inputted directly to the maximum value detection circuit 103 as a fourth input signal. The maximum value detection circuit 103 detects maximum values among the first, second, third and fourth signals, and outputs the result as the color density detection signal 26. A circuit configuration equivalent to that shown in FIG. 21 may be used as a specific example of the maximum value detection circuit 103.

Figure 23:
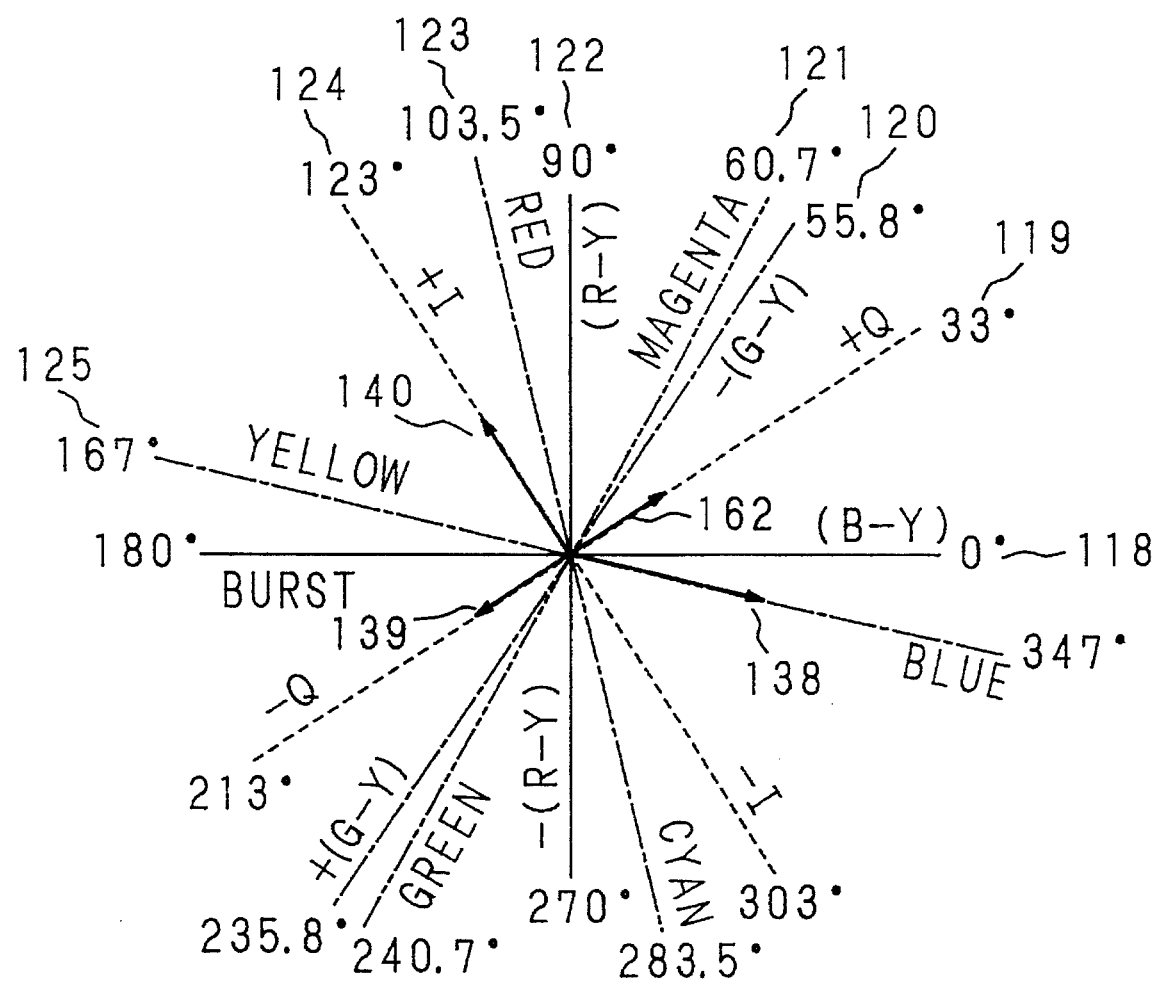
FIG. 23 is a diagram showing vector orientations where component signals in the color density detector of the ninth embodiment are at their maximum values.
Figure 24A:
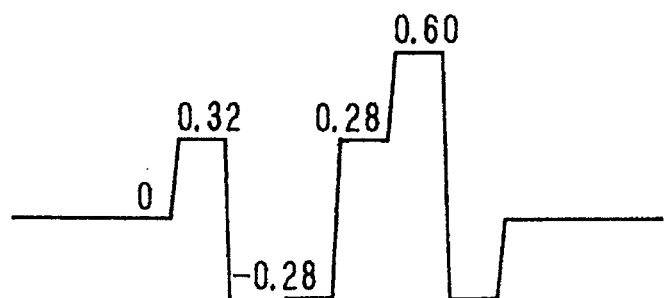
FIGS. 24A, 24B, 24C, 24D and 24E are output waveform diagrams for various parts of the color density detector in the ninth embodiment when color bars are inputted.
Figure 24B:
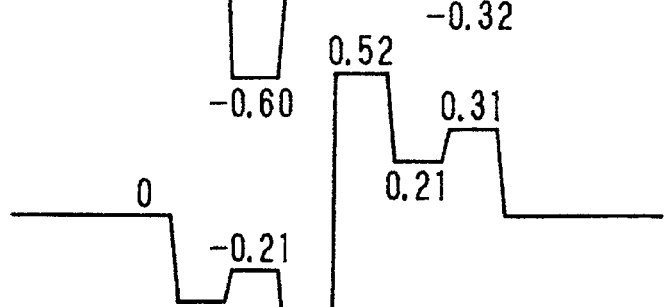
Figure 24C:
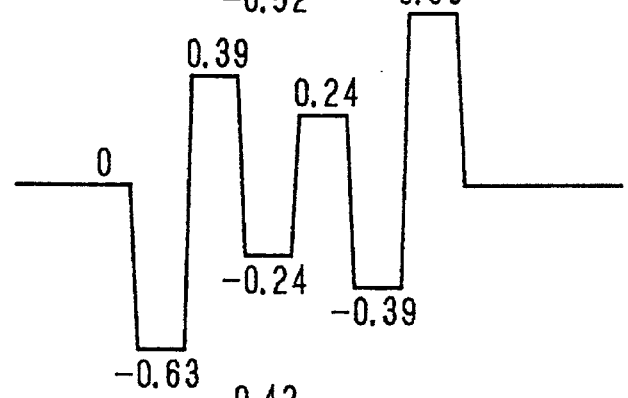
Figure 24D:
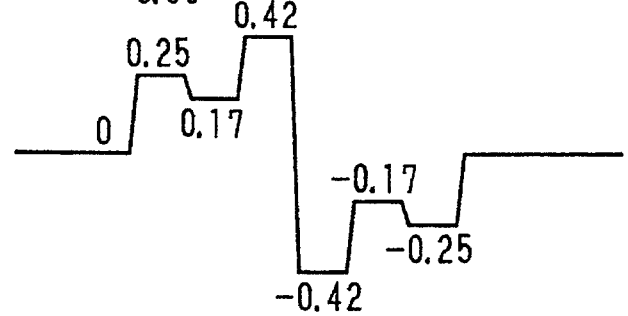
Figure 24E:
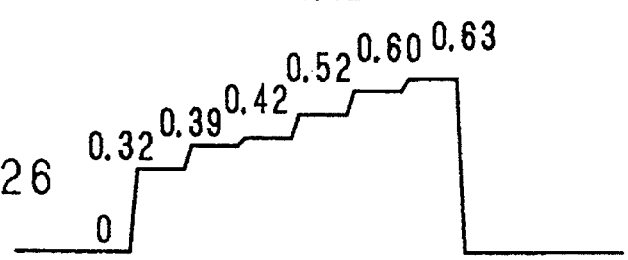

FIG. 23 is a diagram showing the vector orientations indicated by the maximum values of the first, second, third and fourth input signals. In FIG. 23, the numeral 138 indicates the vector orientation when the first input signal is at its maximum value in the maximum value detection circuit 103, whose orientation coincides with the vector orientation of blue. The numeral 139 indicates the vector orientation when the second input signal is at its maximum value, whose orientation is close to the vector orientation of green. The numeral 140 indicates the vector orientation when the chrominance signal I as the third input signal is at its maximum value, whose orientation is close to the vector orientation of red. The numeral 162 indicates the vector orientation when the chrominance signal Q as the fourth input signal is at its maximum value, whose orientation is close to the vector orientation of magenta. Thus, as in the example of FIG. 19, the color density detected is higher for colors containing a smaller high-frequency component.

FIG. 24 shows the results of color density detection performed on a color bar signal by using the configuration of this embodiment. FIG. 24A shows the chrominance signal I, 24B the chrominance signal Q, and 24C the output when the coefficient n in the coefficient multiplier 100 in FIG. 22 is set to 1.0, which produces the result 1.0 (Q-I). FIG. 24D shows the output when the coefficient m in the coefficient multiplier 102 is set to 0.8, which produces the result −0.8Q, while 24E shows the color density detection signal 26, the output of the maximum value detection circuit 103 that has detected the maximum values from 24A, C and D. In this case also, it can be seen that the amplitude ratio of the luminance signal is considered in the creation of the color density detection signal 26.

In this embodiment, only Q-I and −Q are assigned weights, but the signal I and Q may also be weighted, after which maximum value among the four signals may be detected. Also, specified plural signals may be selected from the four kinds of input signals of I, n(Q-I), −mQ and Q, and the maximum value among the selected signals may be detected.

(Embodiment 10)

Figure 25:
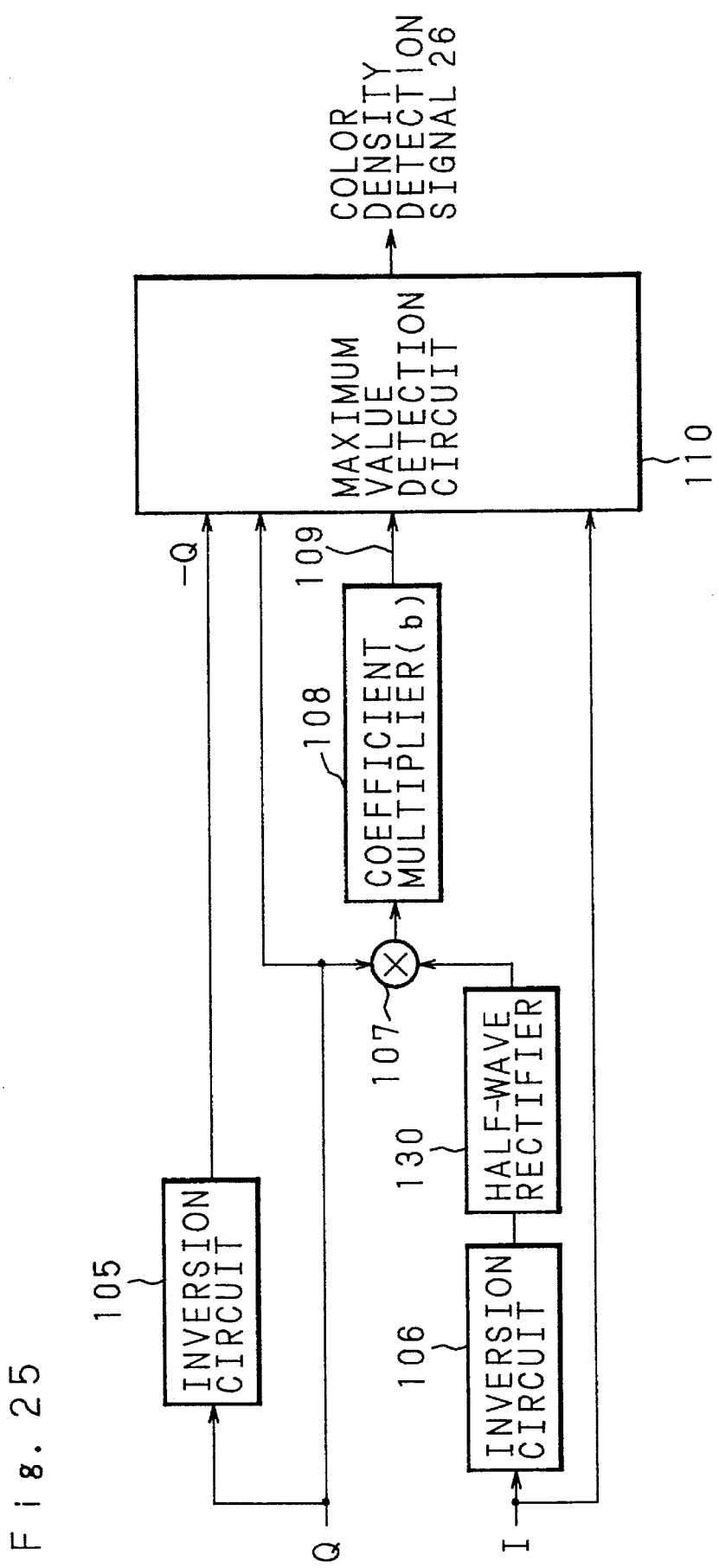
FIG. 25 is a block diagram showing the configuration of a color density detector in an image quality correction circuit (a 10th embodiment) according to the present invention.

FIG. 25 shows the configuration of a color density detector in an image quality correction circuit according to another embodiment (a 10th embodiment) of the present invention. In FIG. 25, four kinds of signals are inputted to a maximum value detection circuit 110. First, the chrominance signal Q inverted through an inversion circuit 105 is inputted (the first input signal). Second, the chrominance signal Q is directly inputted (the second input signal). Third, the chrominance signal I is directly inputted (the third input signal). Fourth, the chrominance signal Q inputted to a multiplier 107 is multiplied by the chrominance signal I passed through an inversion circuit 106 and a half-wave rectifier 130, the result of the multiplication is further multiplied by a coefficient b in a coefficient multiplier 108, and the resulting signal 109 is inputted (the fourth input signal). The maximum value detection circuit 110 detects maximum values among the four kinds of inputted signals, and outputs the result as the color density detection signal 26. A circuit configuration equivalent to that shown in FIG. 21 may be considered as a specific example of the maximum value detection circuit 110.

Figure 26:
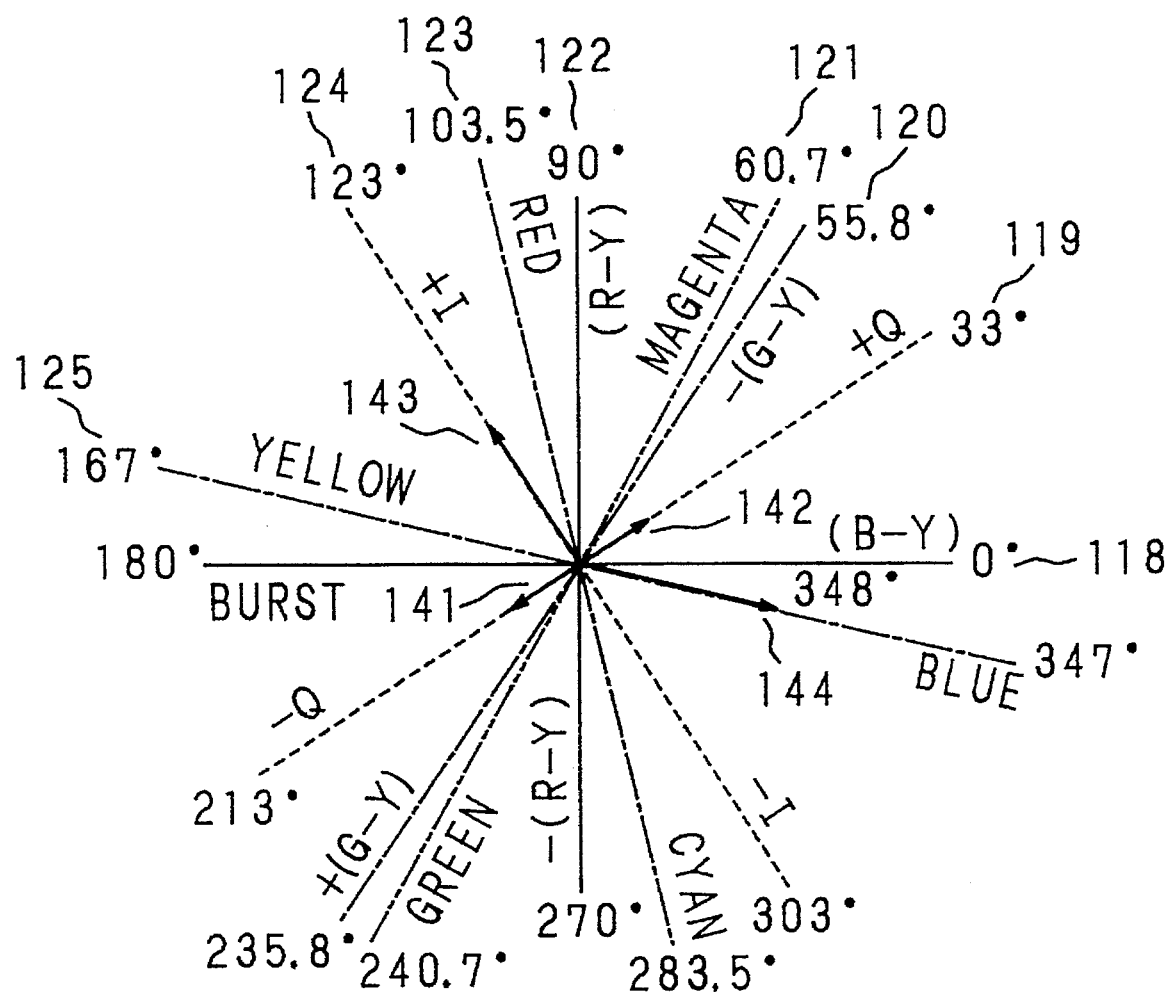
FIG. 26 is a diagram showing vector orientations where component signals in the color density detector of the 10th embodiment are at their maximum values.
Figure 27A:
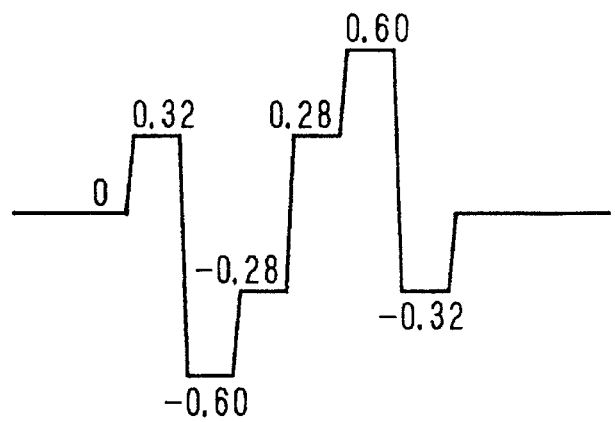
FIGS. 27A, 27B, 27C, 27D and 27E are output waveform diagrams for various parts of the color density detector in the 10th embodiment when color bars are inputted.
Figure 27B:
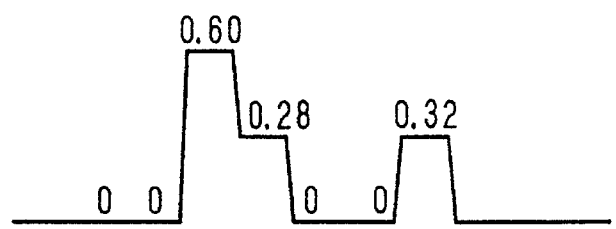
Figure 27C:
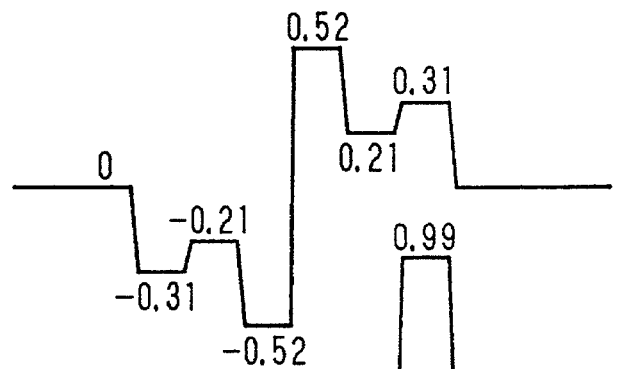
Figure 27D:
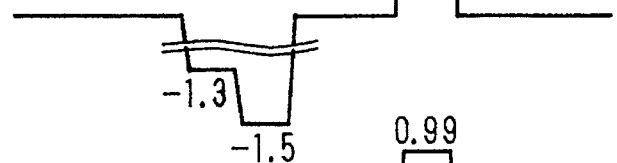
Figure 27E:
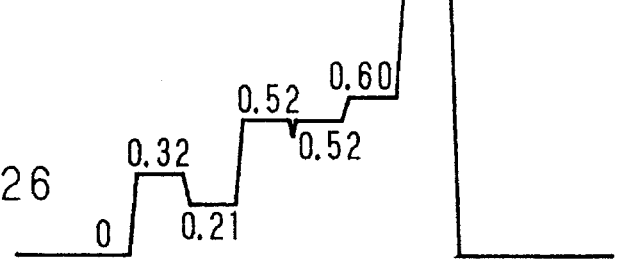

FIG. 26 shows the vector orientations when the first, second, third, and fourth input signals are at their respective maximum values. The numeral 141 indicates the vector orientation when the first input signal −Q is at its maximum value, which is a green-hued color. The numeral 142 indicates the vector orientation when the second input signal Q is at its maximum value, which is a magenta-hued color. The numeral 143 indicates the vector orientation when the third input signal I is at its maximum value, which is a red-hued color. The numeral 144 indicates the vector orientation when the fourth input signal 109 (−I·Q) is at its maximum value, which orientation substantially coincides with the vector orientation of blue. It can be seen that almost all colors having smaller high-frequency components can be covered by the maximum values of the four signals.

FIG. 27 shows the waveforms representing the results of color density detection performed on a color bar signal by using the configuration of this embodiment. FIG. 27A shows the third input signal, i.e., the chrominance signal I, 27B the chrominance signal I, designed by −I, inverted through the inversion circuit 106, 27C the second input signal, i.e., the chrominance signal Q, and 27D the fourth input signal 109 when the coefficient b in the coefficient multiplier 108 is set to 10. The diagram 27E shows the color density detection signal 26 obtained by detecting the maximum values among the four kinds of input signals, i.e., 27A, C, D and the first input signal −Q (the inverted signal of 27C. As can be seen, the amplitude ratio of the luminance signal is reflected, except that the magnitude of the detected amount for cyan and yellow is inverted.

In this embodiment, only −IQ is assigned a weight, but −Q, Q, and I may also be weighted respectively, after which the maximum values may be detected from the four kinds of signals. Furthermore, in this embodiment, the maximum values are detected from the four kinds of signals, but alternatively, the maximum values may be detected from the three kinds of signals (−Q, I, and −IQ), i.e. the first, third, and fourth signals, to obtain the color density detection signal.

(Embodiment 11)

Figure 28:
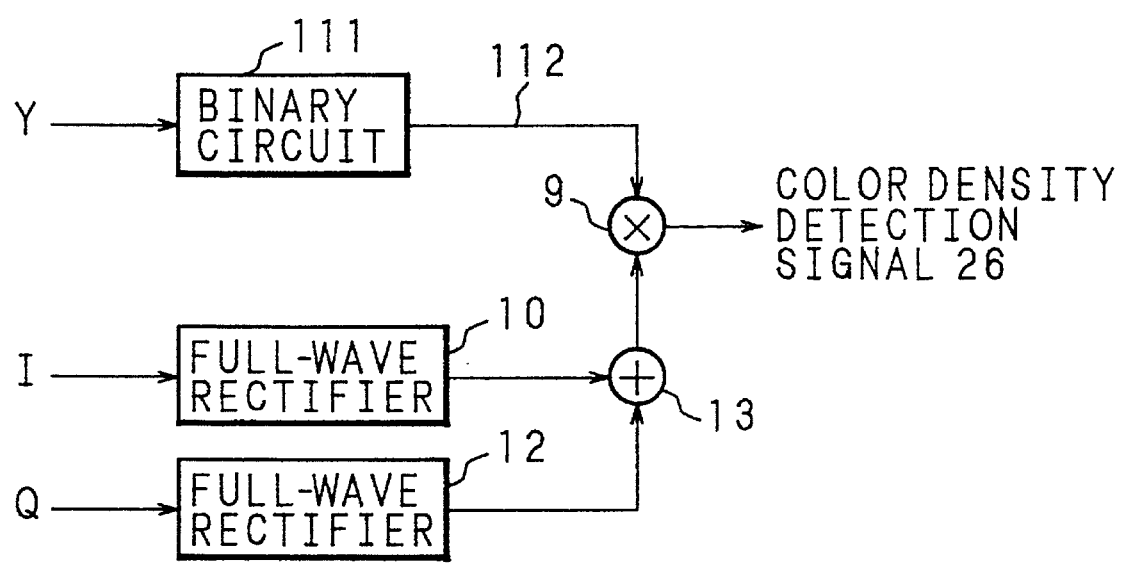
FIG. 28 is a block diagram showing the configuration of a color density detector in an image quality correction circuit (an 11th embodiment) according to the present invention.
Figure 29A:
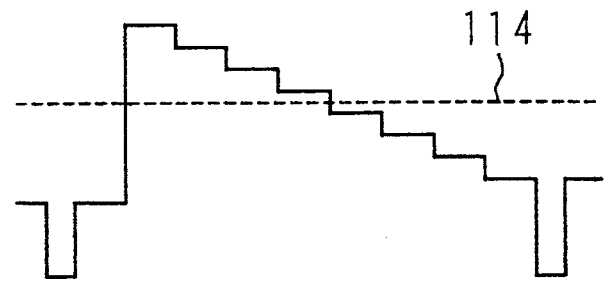
FIGS. 29A, 29B, 29C, and 29D are output waveform diagrams for various parts of the color density detector in the 11th embodiment when color bars are input.
Figure 29B:
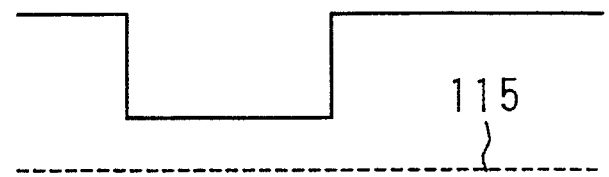
Figure 29C:
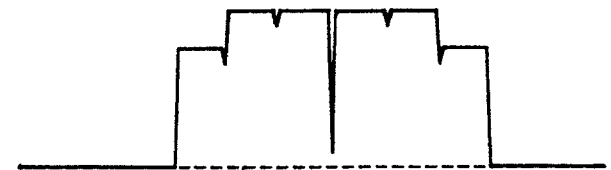
Figure 29D:
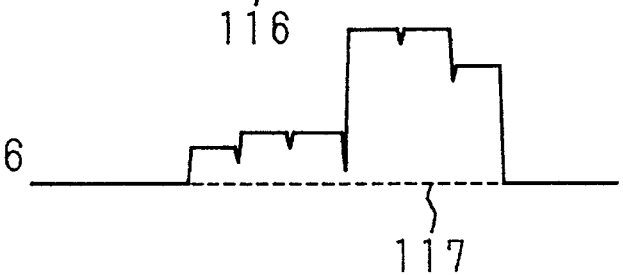

FIG. 28 shows the configuration of a color density detector in an image quality correction circuit according to another embodiment (an 11th embodiment) of the present invention. The only difference from the color density detector 1 of the sixth embodiment (see FIG. 13) is that the inversion circuit 11 is replaced by a binary circuit 111 in the 11th embodiment. The binary circuit 111 outputs a relatively low voltage when the luminance signal Y is higher than a threshold voltage e, and a relatively high voltage when the luminance signal Y is lower than the threshold voltage e, thus converting the luminance signal Y into a binary form to produce a binary luminance signal 112. The binary luminance signal 112 is inputted to the multiplier 9, where it is multiplied by a signal, outputted from the adder 13, corresponding to the color density; thus, the output of the adder 13 is corrected to a relatively low level when the luminance signal is at a relatively high level, and to a relatively high level when the luminance signal is at a relatively low level.

FIG. 29 shows the waveforms representing the results of color density detection performed on a color bar signal by using the configuration of this embodiment. The diagram 29A shows the luminance signal Y, and 29B shows the binary luminance signal 112. In the example shown, the threshold voltage 114 is set at 50 IRE. The numeral 115 indicates a reference voltage for the binary luminance signal 112 to be inputted to the adder 9, and the voltage differential between the binary luminance signal 112 and the reference voltage 115 is subjected to the multiplication operation.

The diagram 29C shows the signal outputted from the adder 13, corresponding to the color density, and the numeral 116 indicates a reference voltage for the signal corresponding to the color density, to be inputted to the variable gain amplifier 5, the voltage level representing the voltage when no color is present. The diagram 29D shows the color density detection signal 26 obtained by multiplying 29B by 29C, and the numeral 117 indicates a reference voltage for it and represents the voltage level when no color is present. The color density detection signal 26 in this case also is corrected to a relatively low level for colors for which the amplitude of the luminance signal contained therein is higher than 50 IRE, and to a relatively high level for colors for which the amplitude of the luminance signal contained therein is lower than 50 IRE. Thus, the amplitude ratio of the luminance signal is roughly reflected in this configuration.

(Embodiment 12)

Figure 30:
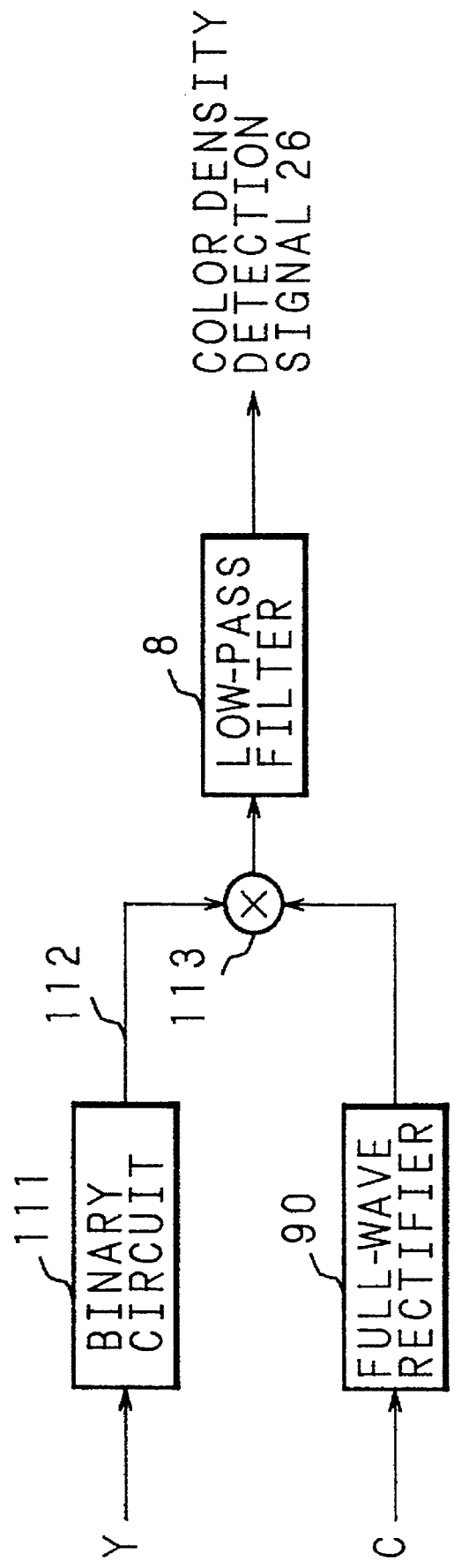
FIG. 30 is a block diagram showing the configuration of a color density detector in an image quality correction circuit (a 12th embodiment) according to the present invention.

FIG. 30 shows the configuration of a color density detector in an image quality correction circuit according to another embodiment (a 12th embodiment) of the present invention. The only difference from the color density detector of the seventh embodiment (see FIG. 17) is that the inversion circuit 11 is replaced by the binary circuit 111. The signal corresponding to the color density, outputted from the full-wave rectifier 90, is almost equivalent to the signal corresponding to the color density, outputted from the adder 13 in FIG. 28. Therefore, the operation of the section including the binary circuit 111 and multiplier 113 is substantially the same as described above, except that the configuration of FIG. 30 requires the provision of a low-pass filter 8 because the output of the multiplier 113 contains harmonics of the chrominance carrier frequency.

Figure 1:
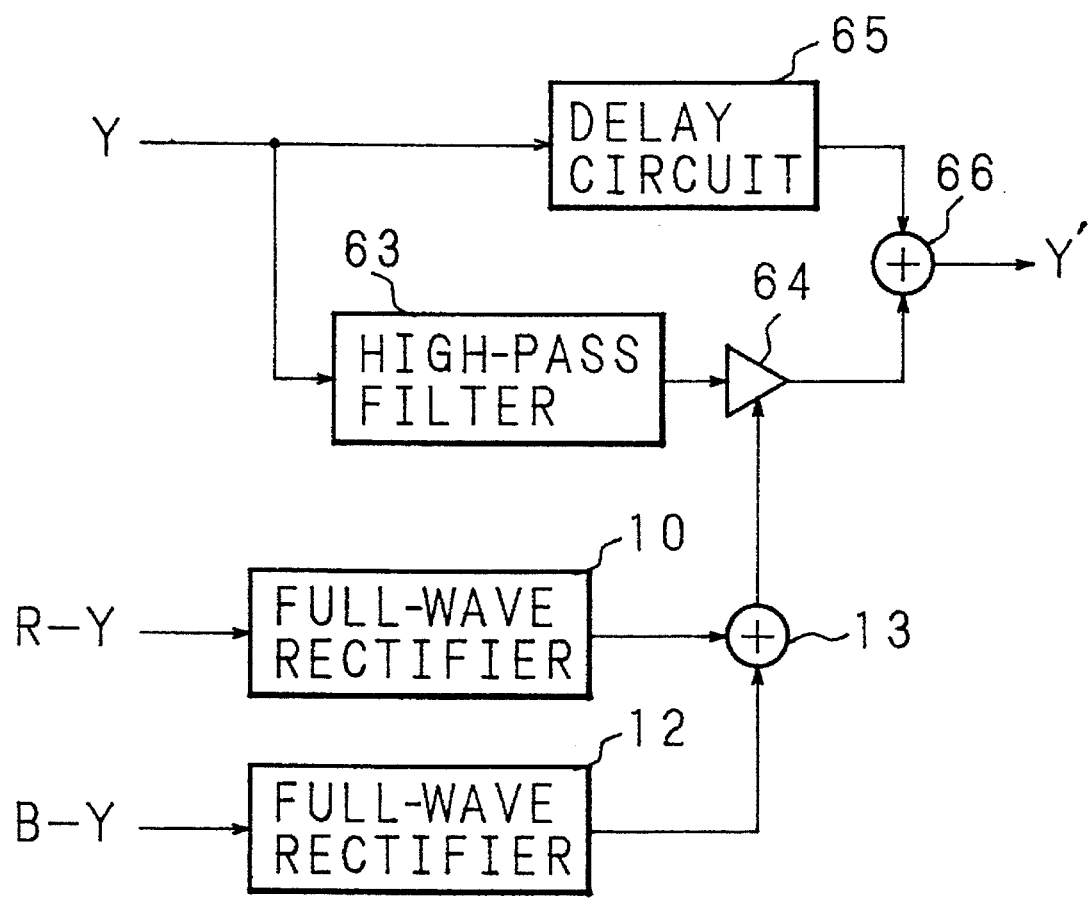
FIG. 1 is a block diagram showing the configuration of a prior art image quality correction circuit.
Figure 2:
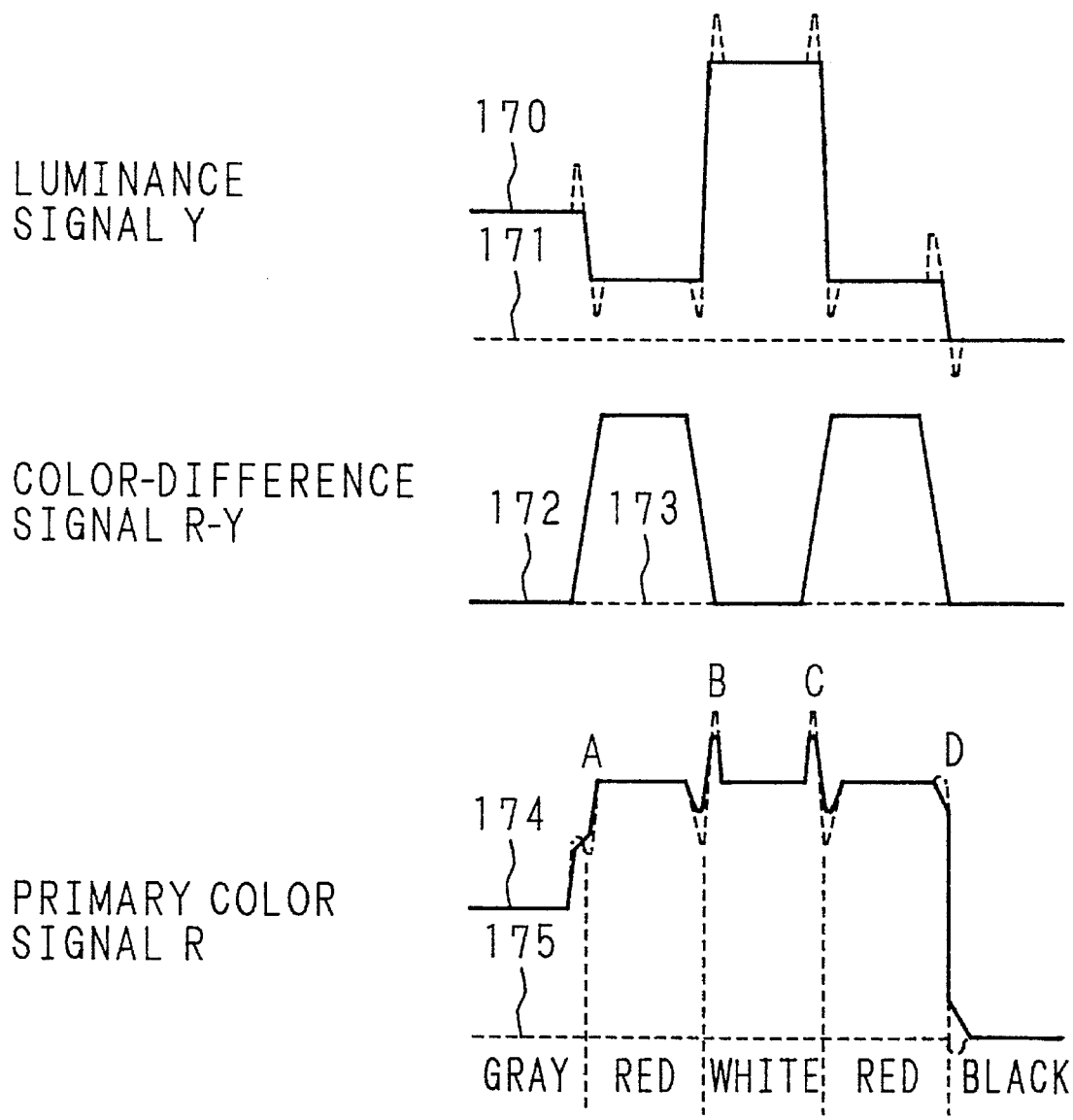
FIG. 2 is a waveform diagram for explaining problems of the prior art.

It will be appreciated that the detection method of the color density detection signal, as described in the 6th to 12th embodiments, can also be applied to the prior art image quality correction circuit (FIG. 1) in which the slice circuit 6 is not provided.

(Embodiment 13)

Figure 31:
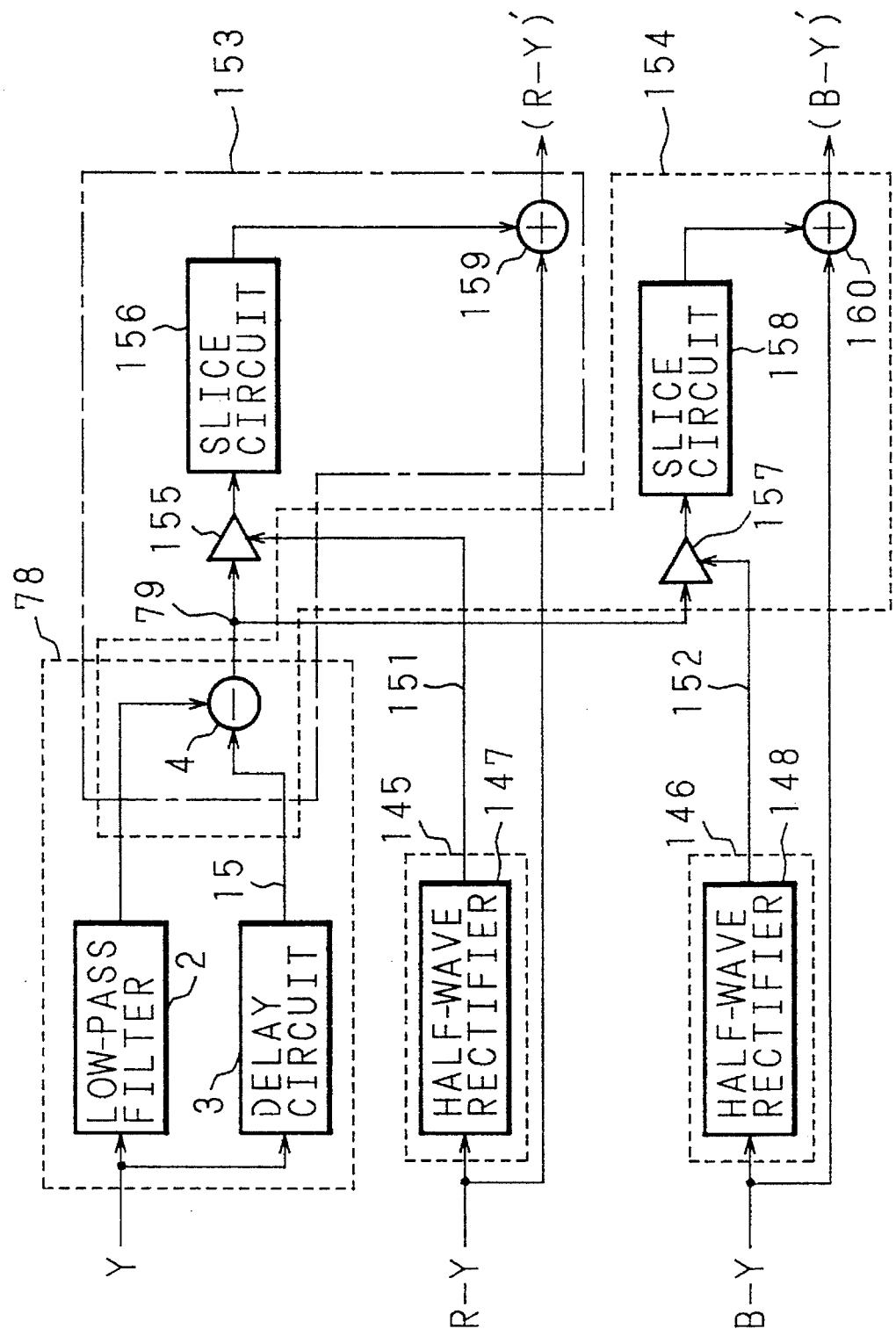
FIG. 31 is a block diagram showing the configuration of an image quality correction circuit (a 13th embodiment) according to the present invention.

FIG. 31 shows the configuration of an image quality correction circuit according to another embodiment (a 13th embodiment) of the present invention. In FIG. 31, the same parts as those shown in FIG. 13 are designated by the same reference numerals. Also, blocks 153 and 154 in FIG. 31 may be constructed with the same circuit configuration of the image quality correction signal generator 14 shown in FIG. 3 or 12. The configuration of FIG. 31 has the following features: only the positive half-cycles of the color-difference signal R-Y are separated by a half-wave rectifier 147 to produce a color density detection signal 151 associated only with the color-difference signal R-Y, and similarly, only the positive half-cycles of the color-difference signal B-Y are separated by a half-wave rectifier 148 to produce a color density detection signal 152 associated only with the color-difference signal B-Y; and the high-frequency signal 79 detected in the luminance signal by the high-frequency component detector 78 and fed into a variable gain amplifier 155 is controlled in accordance with the R-Y color density detection signal 151 so that the gain is increased in higher color-density portions of the R-Y vector and is reduced in lower color-density portions of the R-Y vector, after which only the negative high-frequency components are separated by a slice circuit 156 and fed to an adder 159 for addition to the color-difference signal R-Y, not to the original luminance signal as in the configuration of FIG. 13. The block 153 where the negative high-frequency components of the luminance signal are super-imposed on the color-difference signal R-Y is equivalent in function to the block 154 where the B-Y signal is processed in like manner. The variable gain amplifiers 157, 155, the slice circuits 156, 158, and the adders 159, 160 are also functionally equivalent to each other.

The same effect as achieved by the configuration of FIG. 13 can also be expected from the configuration of FIG. 31. As a variant form of FIG. 31, the half-wave rectifier 148, variable gain amplifier 157, slice circuit 158, and adder 160, which are responsible for the processing of the color-difference signal B-Y, may be eliminated, and processing may be performed only on red that has a particularly significant effect on visual perceptions. In this case, the slice circuit plays an important role, since, without the slice circuit, a change in hue, not a drop in saturation, would occur in portions where the positive high-frequency components are amplified.

Figure 32:
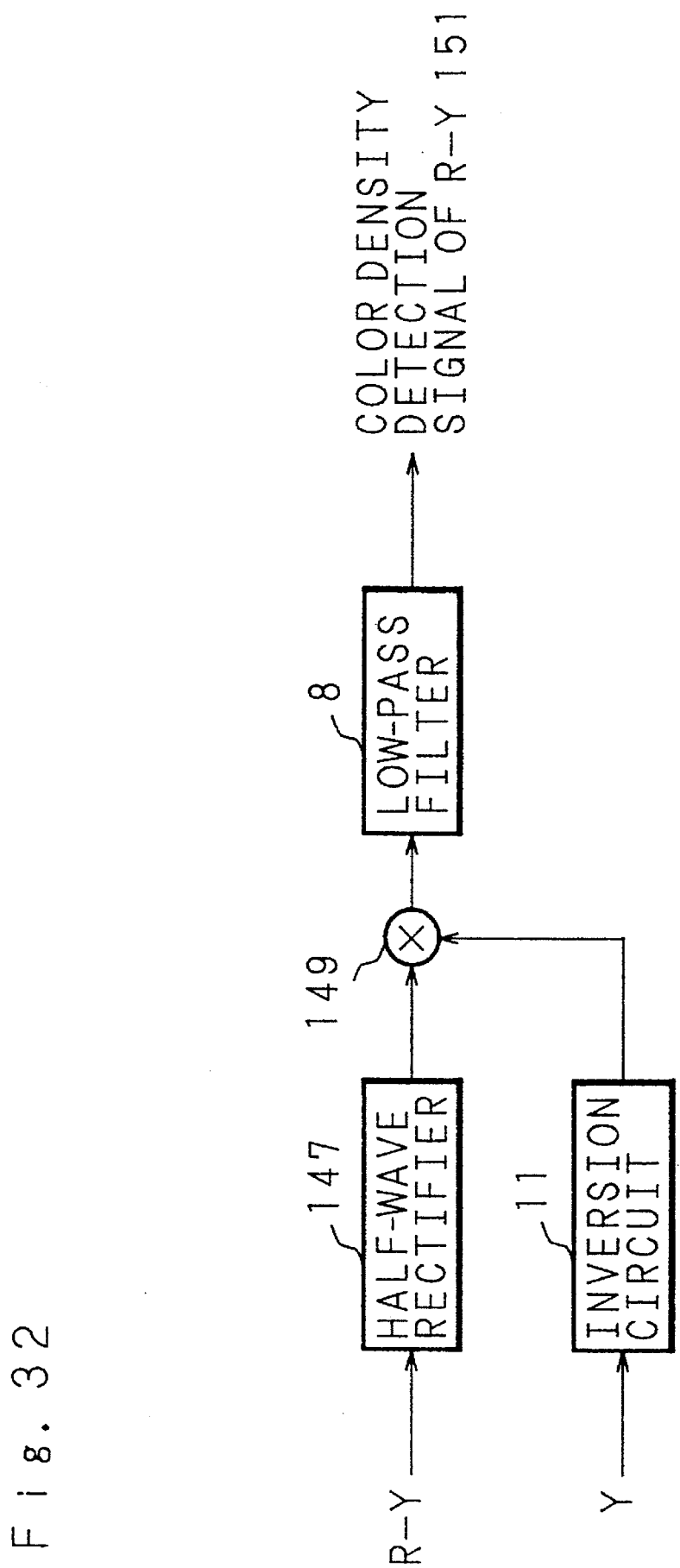
FIG. 32 is a block diagram showing the configuration of a modified example of a color density detector of the 13th embodiment.
Figure 33:
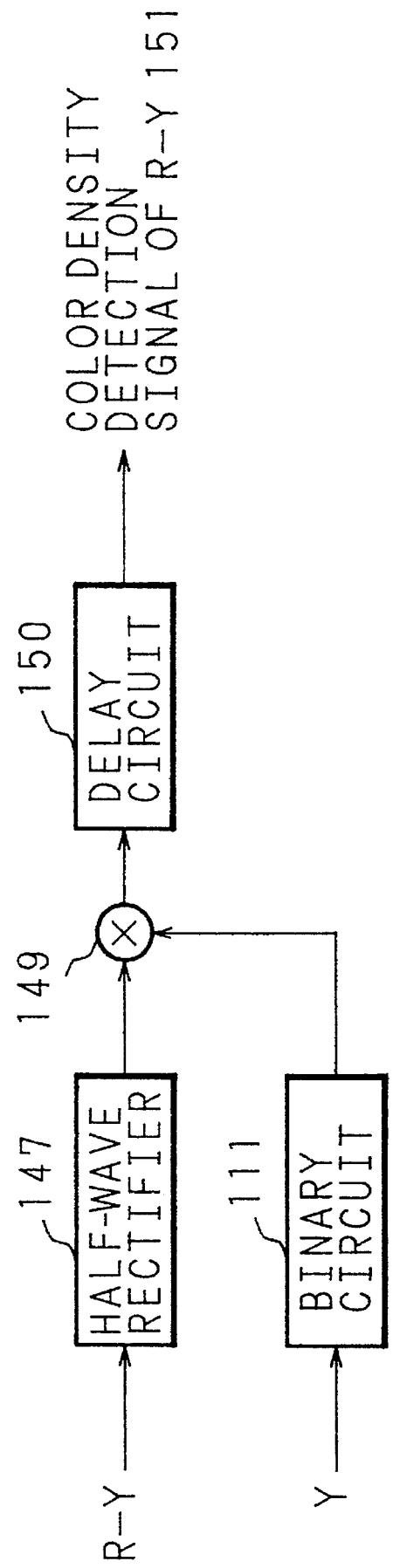
FIG. 33 is a block diagram showing the configuration of another modified example of the color density detector of the 13th embodiment.

Alternative configurations of color density detectors 145, 146 of FIG. 31 are shown in FIGS. 32 and 33. FIG. 32 shows an example where the configuration shown in FIG. 13 is applied. In the half-wave rectifier 147 shown in FIG. 32, as in the half-wave rectifier 147 of FIG. 31, the positive half-cycles of the color-difference signal R-Y are separated. In FIG. 31, the result is directly outputted as the color density detection signal 151. In FIG. 32, on the other hand, in order to reflect the amplitude ratio of the luminance signal contained in the previously mentioned various colors in the color density to be detected, the luminance signal Y is inverted by the inversion circuit 11 and fed to a multiplier 149 where the output of the half-wave rectifier 147 is multiplied by the inverted luminance signal, so that the color density detection signal 151 is corrected to a relatively low level when the luminance is high and to a relatively high level when the luminance is low.

FIG. 33 shows an example in which the inversion circuit 11 in FIG. 32 is replaced by a binary circuit 111. This is an application of the configuration shown in FIG. 28. When the amplitude of the luminance signal Y is large, the binary circuit 111 outputs a low voltage so that the color density detection signal is corrected to a low level by the multiplier 149. Conversely, when the amplitude of the luminance signal Y is small, the binary circuit 111 outputs a high voltage so that the color density detection signal is corrected to a high level by the multiplier 149. After that, the result is passed through a delay circuit 150 to obtain the color density detection circuit 151.

In the above embodiment, the output signal of the subtractor (the high-frequency component of the luminance signal) is first amplified by the variable gain amplifier and then sliced at a prescribed amplitude level by the slice circuit before being fed to the adder, but it will be recognized that the order of the variable gain amplifier and the slice circuit may be reversed. Such a configuration will be described below as modified examples of the first and sixth embodiments.

Figure 34:
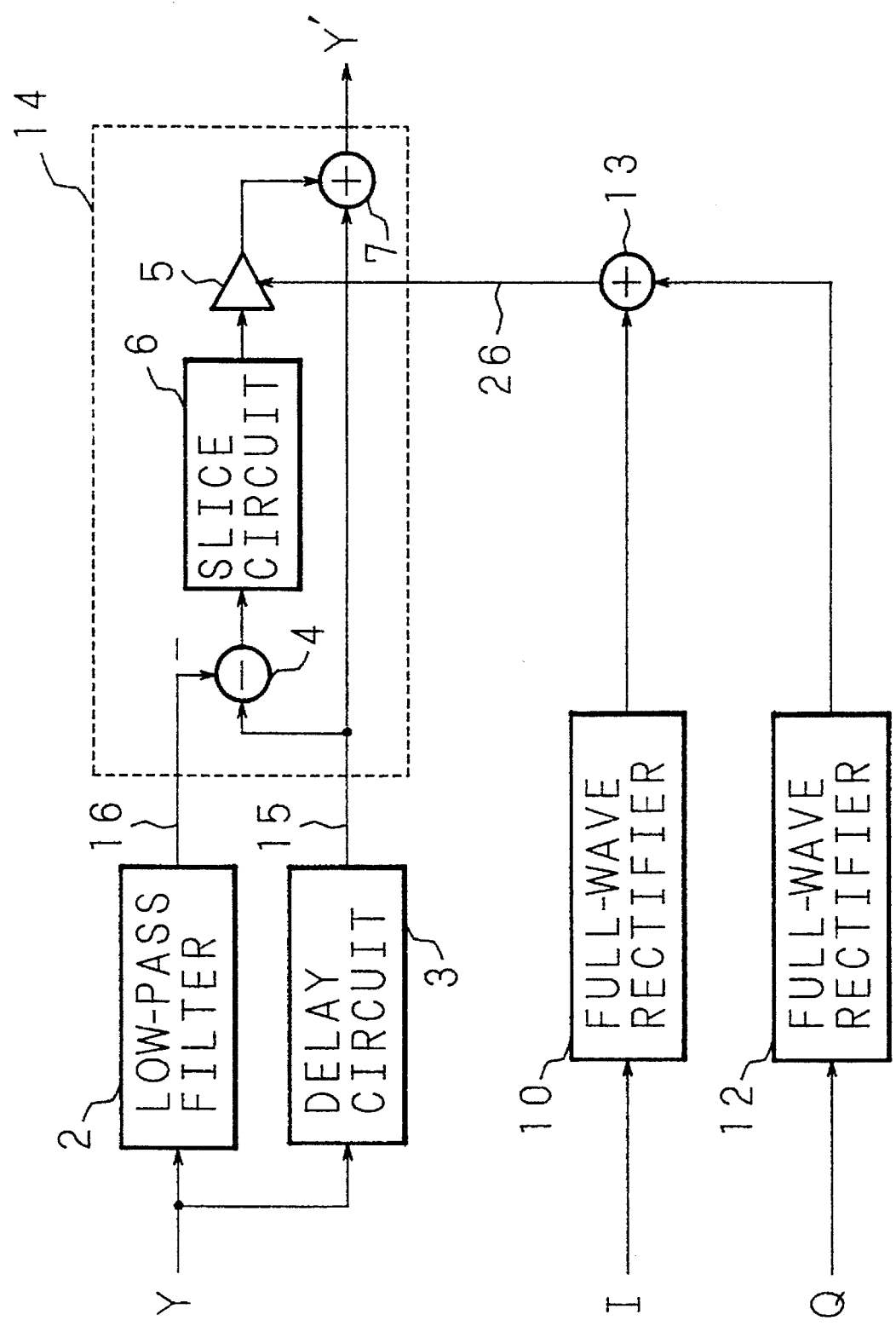
FIG. 34 is a block diagram showing the configuration of a modified example of the first embodiment.
Figure 35:
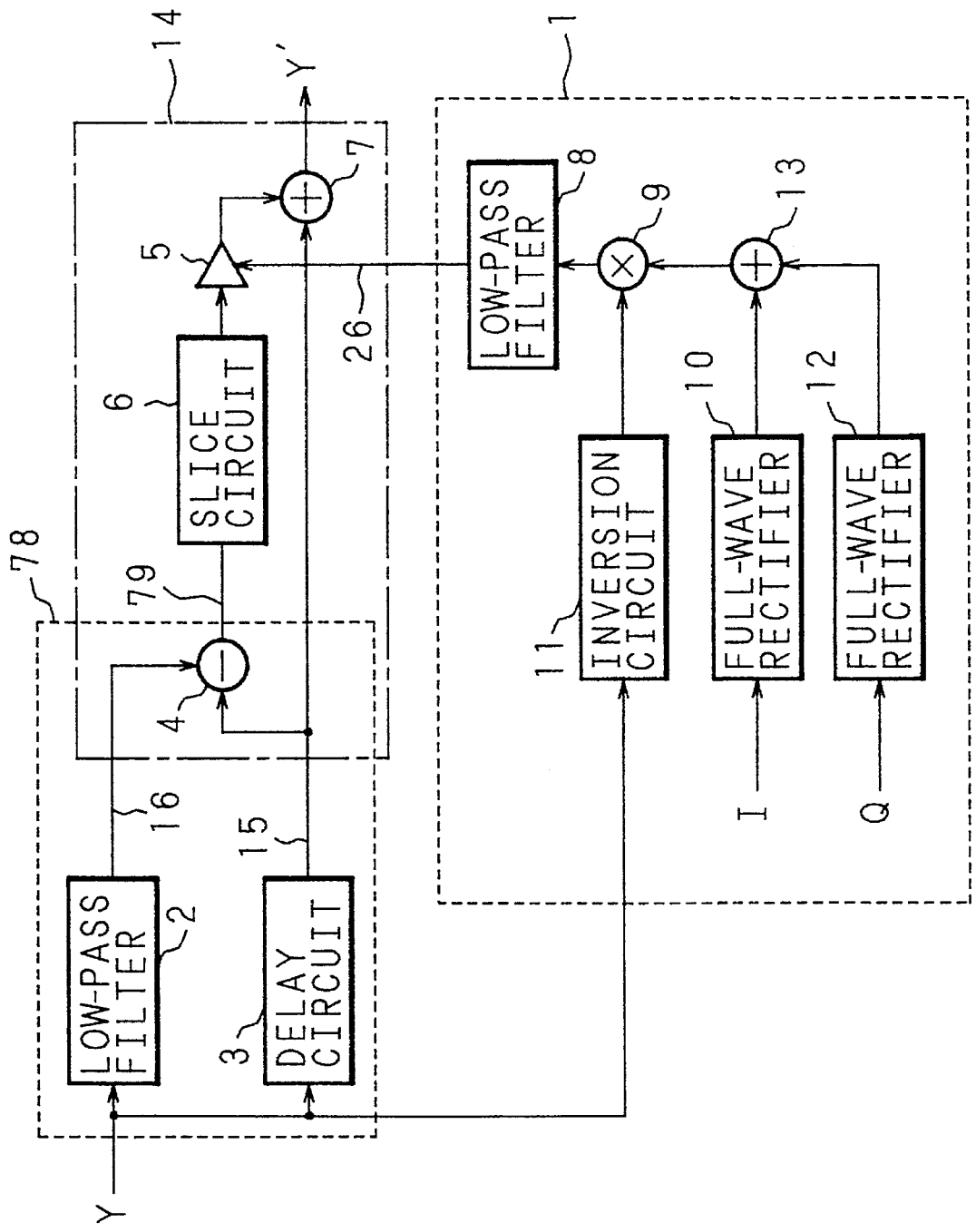
FIG. 35 is a block diagram showing the configuration of a modified example of the sixth embodiment.

FIG. 34 shows a modified example of the configuration of FIG. 3, in which the order of the variable gain amplifier 5 and the slice circuit 6 is reversed. FIG. 35 shows a modified example of the configuration of FIG. 13, in which the order of the variable gain amplifier 5 and the slice circuit 6 is reversed. In FIGS. 34 and 35, the amplitude of the output signal of the subtractor 4 (the high-frequency component of the luminance signal) is first sliced at a prescribed value by the slice circuit 6, and then the output of the slice circuit 6 is amplified under control by the color density detection signal 26 in such a manner that the gain is increased when the detected color density is high, and is decreased when the detected color density is low. The result is fed to the adder 7 as the image quality correction signal. In other respects, the operation is the same as that of the first and sixth embodiments, and therefore, description thereof is not repeated here.

(Embodiment 14)

Figure 36:
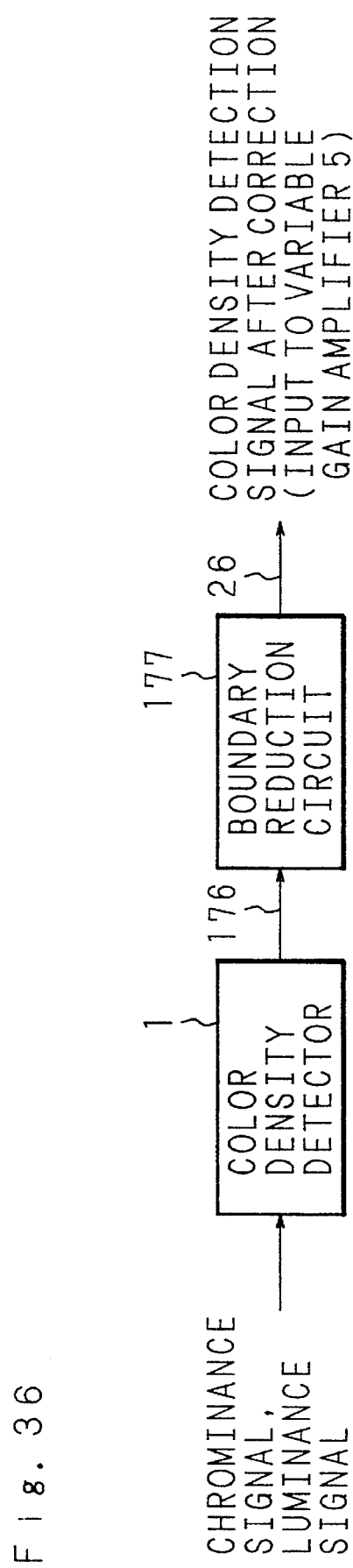
FIG. 36 is a block diagram showing the configuration of an image quality correction circuit (a 14th embodiment) according to the present invention.

FIG. 36 is a block diagram showing the configuration of an image quality correction circuit according to another embodiment (a 14th embodiment) of the present invention. In FIG. 36 the color density detector 1 is supplied with the chrominance signal or with both the chrominance and luminance signals, and outputs a color density detection signal 176. The color density detection signal 176 corresponds to the color density detection signal outputted from the color density detector 1 in Embodiments 1–13. A boundary reduction circuit 177 accepts the color density detection signal 176 and outputs a corrected color density detection signal 26. The corrected color density detection signal 26 is applied to the control terminal of the variable gain amplifier 5 (at which, in Embodiments 1–13, the color density detection signal 26 is applied). This color density detection signal 26 corresponds to the control voltage for the variable gain amplifier 5 in Embodiments 1–13.

The color density detector 1 detects the color density From the inputted chrominance and luminance signals. The boundary reduction circuit 177 produces the color density detection signal 26, with its amplitude reduced at the edge portions, which signal is used to control the high-frequency signal gain of the variable gain amplifier 5. Since the amplitude of the color density detection signal 26 is reduced at the boundaries of colors, i.e., at the edge portions of the color density detection signal 176, the gain of the variable gain amplifier 5 is reduced at the boundaries of colors. The net effect of this is to suppress the enhancement of unnatural contours at the color boundaries.

Figure 37:
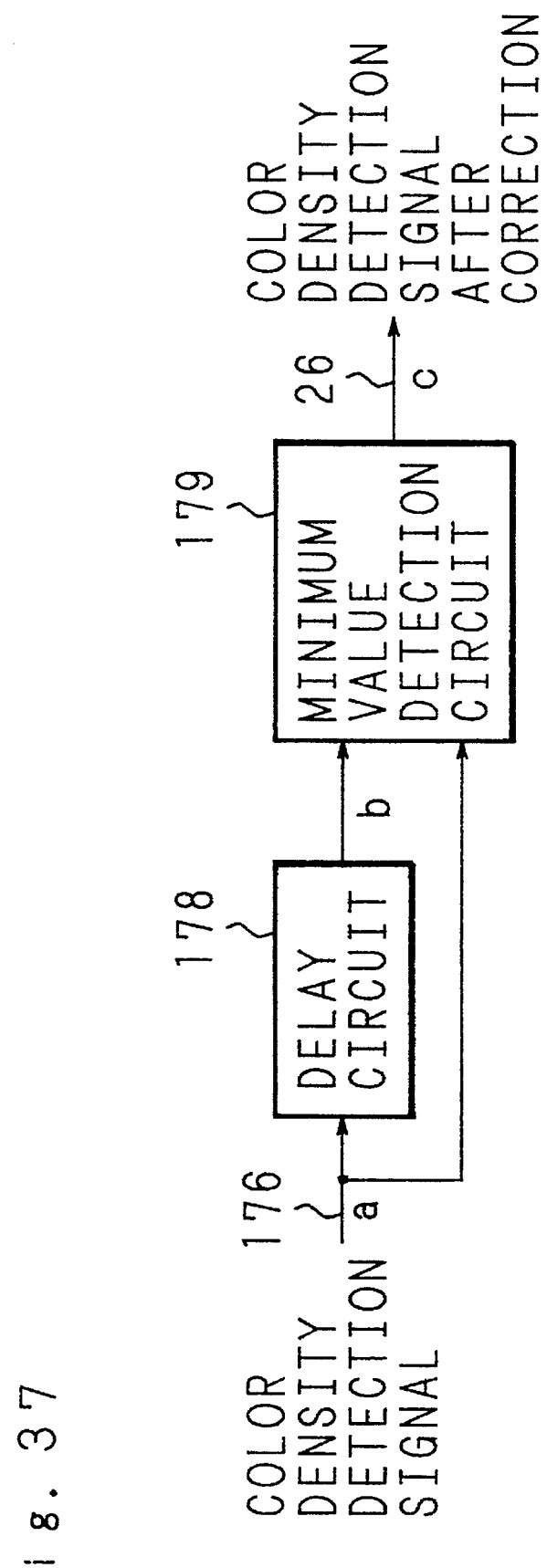
FIG. 37 is a block diagram showing the configuration of a modified example of the 14th embodiment.

FIG. 37 shows the circuit configuration of Embodiment 14 in more detail. In FIG. 37, a delay circuit 178 delays the input color density detection signal 176 by a predetermined time and supplies the output to a minimum value detection circuit 179. The minimum value detection circuit 179 is also supplied with the color density detection signal 176 not passed through the delay circuit 178, and outputs the corrected color density detection signal 26. The configuration of the minimum value detection circuit 179, where minimum values at the same instant of time between the color density detection signal 176 delayed through the delay circuit 178 and the color density detection signal 176 not passed through the delay circuit 178 are obtained to reduce the amplitude of the edge portions, can be readily implemented by applying the maximum value detection circuit configuration shown in FIG. 21.

Figure 38:
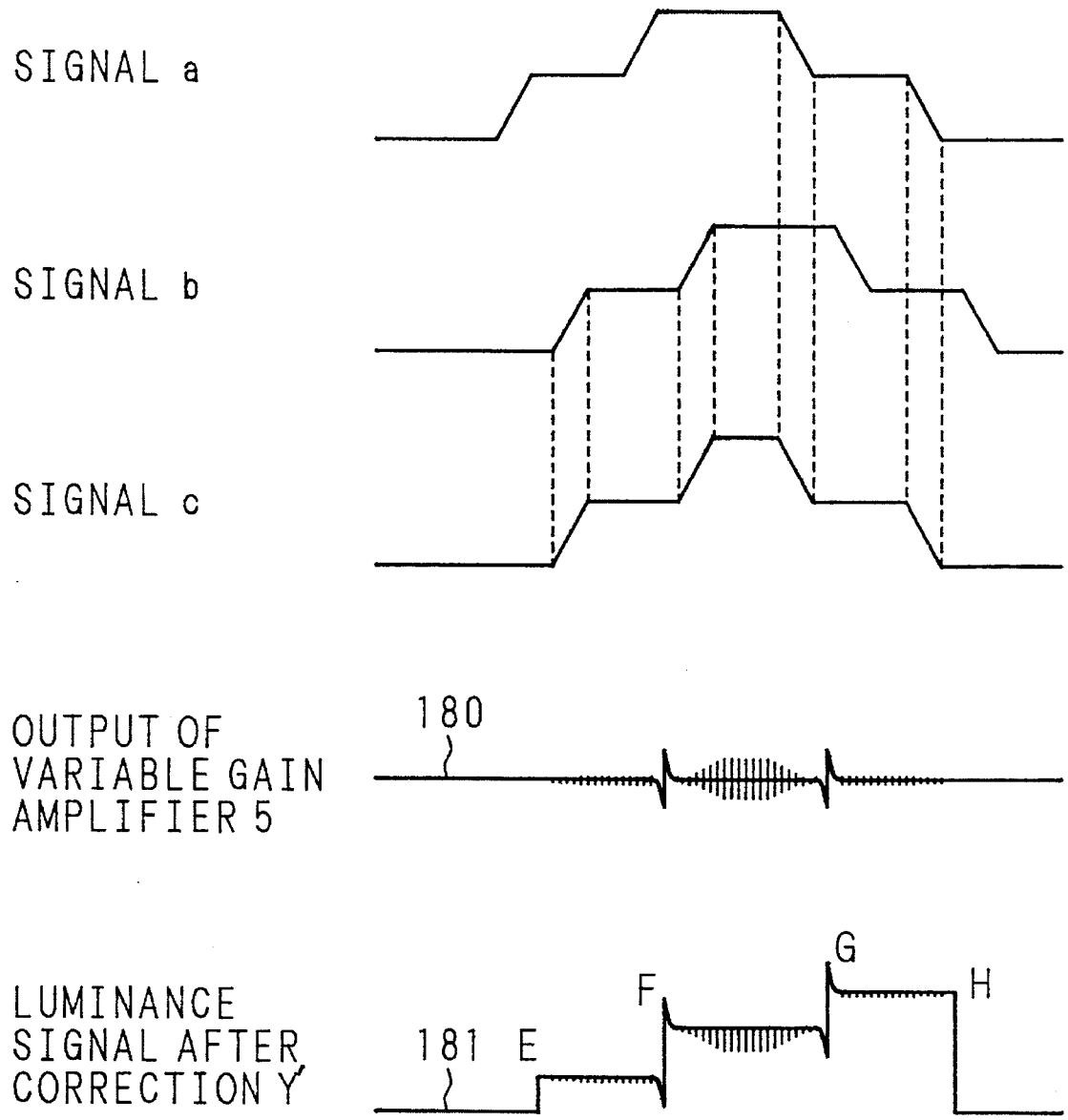
FIG. 38 is a waveform diagram showing signal waveforms at various portions of the circuit shown in FIG. 37.

FIG. 38 shows the waveforms taken at points a, b, and c in FIG. 37, along with a color density-controlled high-frequency signal 180 that the variable gain amplifier 5 would output when the circuit of FIG. 37 is connected to the image quality correction circuit of FIG. 13, and a corrected luminance signal 181 (Y') in that case. In FIG. 38, it is shown that the signal c obtained by taking the minimum values between the signals a and b has its amplitude reduced at the edges of the color density detection signal a. It can also be seen that in the corrected luminance signal 181 the amount of high-frequency correction is reduced in areas near the boundaries of colors. However, the edges indicated at E and H in the corrected luminance signal 181 correspond to the boundaries between non-color and color areas, and no correction is made in these portions, while on the other hand, the effect of reduction is reduced at the boundaries between different colors or between different tonal densities, as indicated by F and G. Notwithstanding this shortcoming, the 14th embodiment provides an effective method because of its extremely simple construction.

The 14th embodiment is also effective in application to an image quality correction circuit that does not use a slice circuit; the embodiment is effective not only in the configuration where image quality correction is applied to the luminance signal, but also in the configuration of FIG. 31 where image quality correction is applied to the chrominance signal, the configuration of FIG. 31 in the case where the slice circuit is not provided, and the configuration where image quality correction is applied to the primary color signal.

(Embodiment 15)

Figure 39:
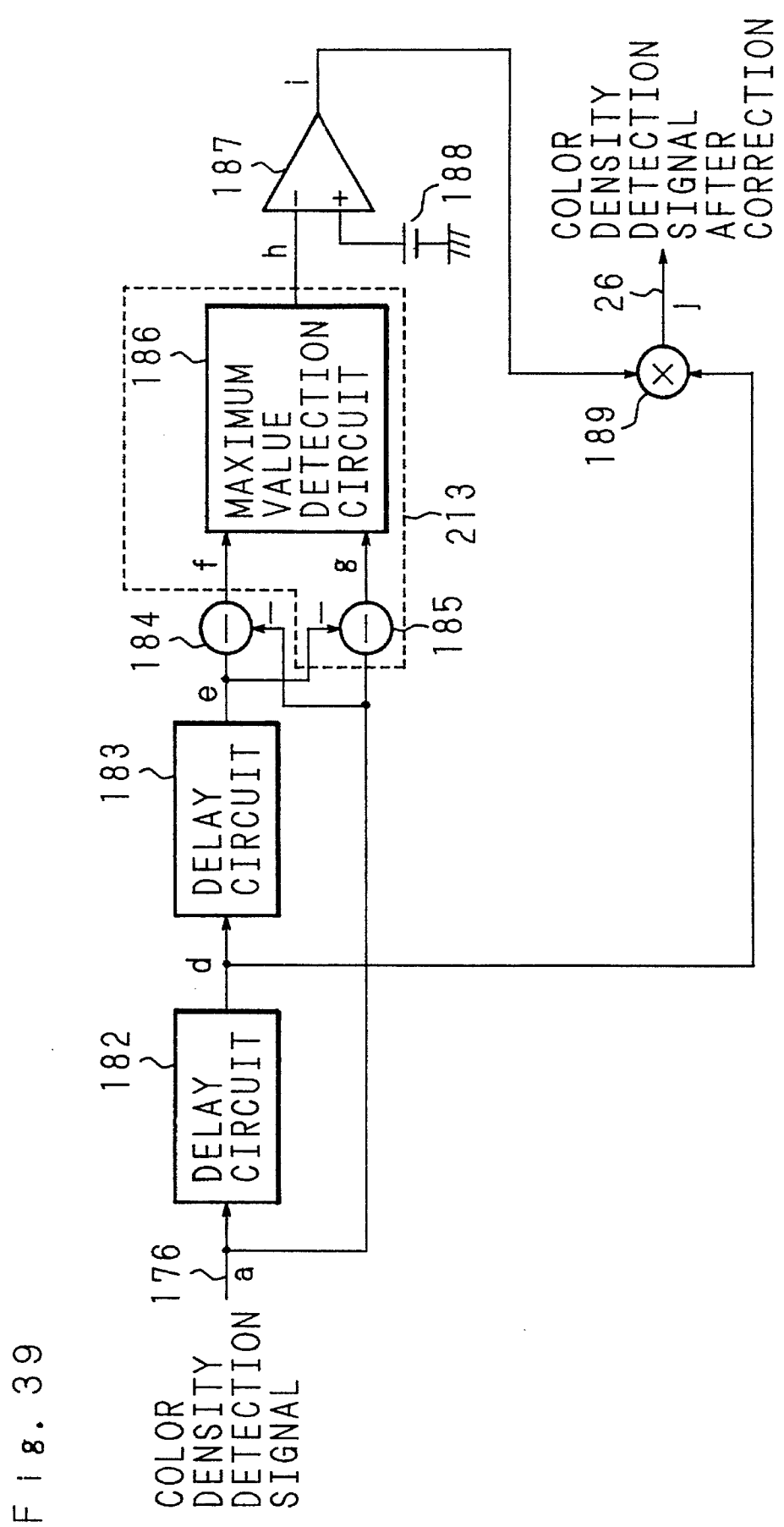
FIG. 39 is a block diagram showing the configuration of an image quality correction circuit (a 15th embodiment) according to the present, invention.

FIG. 39 is a block diagram showing the configuration of an image quality correction circuit according to another embodiment (a 15th embodiment) of the present invention. In FIG. 39, a delay circuit 182 delays the input color density detection signal 176 by a predetermined time, and supplies the output to a delay circuit 183 and a multiplier 189. The delay circuit 183 delays the input signal by a predetermined time, and supplies the output to subtractors 184 and 185. The color density detection signal 176 is also inputted directly to the subtractors 184 and 185. The subtractor 184 subtracts the density detection signal 176 from the output signal of the delay circuit 183, and outputs the result as a first edge signal which is supplied to a maximum value detection circuit 186. The subtractor 185 subtracts the output signal of the delay circuit 183 from the color density detection signal 176, and outputs the result as a second edge signal which is supplied to the maximum value detection circuit 186. The maximum value detection circuit 186 detects the maximum values at the same instant of time between the first and second edge signals, and thereby detects the absolute value signal of the first edge signal or second edge signal, the absolute value signal then being supplied to a comparator 187. The comparator 187 compares the absolute value signal with a predetermined voltage 188, and supplies a binary signal to the multiplier 189 in accordance with the result of the comparison. The output signal of the delay circuit 182 is also supplied to the multiplier 189. The multiplier 189 multiplies the two input signals together, and outputs a corrected color density detection signal 26. The section 213 enclosed by a dotted line can be considered as a circuit for obtaining the absolute value of the first edge signal.

The first edge signal, which is produced by subtracting the color density detection signal 176 directly fed to the subtractor 184 from the color density detection signal 176 delayed through the delay circuits 182 and 183 in series, and the second edge signal, an inverted version of the first edge signal, outputted from the subtractor 185, are supplied to the maximum value detection circuit 186 where the maximum values between the first and second edge signals are obtained. That is, the output of the maximum value detection circuit 186 is the absolute value signal of the first edge signal. When the amplitude of the absolute value signal exceeds a certain level, the comparator 187 outputs the result of the comparison between the absolute value signal and the predetermined threshold value voltage 188, as a binary signal, i.e., an edge correction signal for edge correction. The edge correction signal goes high for edge portions and goes low for other portions. This edge correction signal is multiplied in the multiplier 189 by the output signal of the delay circuit 182, thus producing the corrected color density detection signal 26. The color density detection signal 26 drops to the same voltage level as the no-color level for portions where the edge absolute value signal exceeds the threshold value voltage 188 in amplitude.

Figure 40:
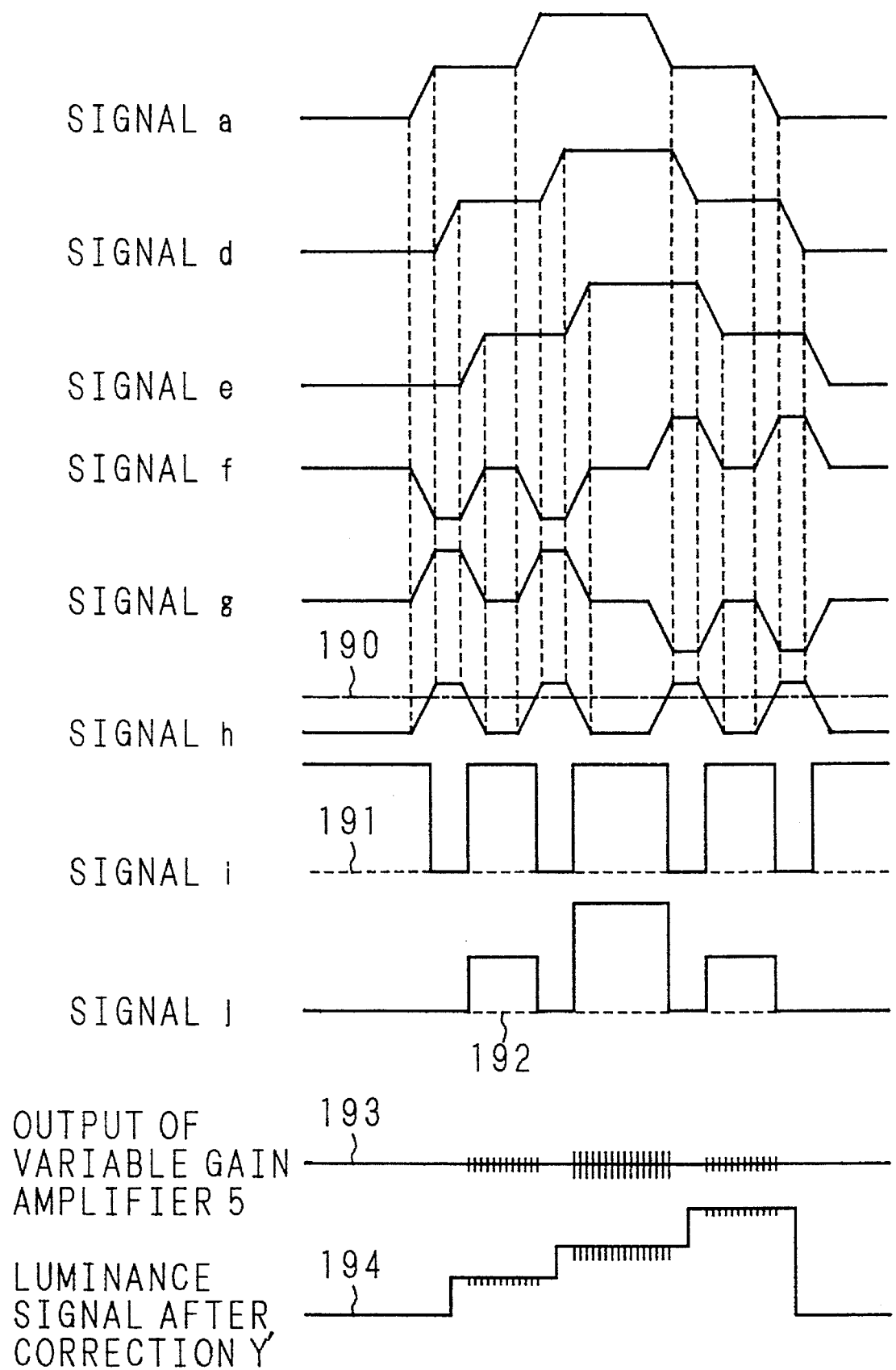
FIG. 40 is a waveform diagram showing signal waveforms at various portions of the circuit shown in FIG. 39.

FIG. 40 shows the waveforms taken at points a, d, e, f, g, h, i, and j in FIG. 39, along with a color density-controlled high-frequency signal 193 that the variable gain amplifier 5 would output when the circuit of FIG. 39 is connected to the image quality correction circuit of FIG. 13, and a corrected luminance signal 194 (Y') in that case. The numeral 190 indicates the level of the threshold value voltage 188. The numeral 191 indicates the reference signal for the edge correction signal i, the reference signal being calculated as 0 in the multiplication operation performed by the multiplier 189. It can be seen that the edge correction signal i drops down to the reference voltage 191 in areas near the boundaries of colors. The numeral 192 indicates the reference voltage for the corrected color density detection signal j, the reference voltage being the voltage for no-color portions. The corrected color density detection signal j drops down to the reference voltage 192 in areas near the boundaries of colors. It can be seen that the high-frequency signal 193 controlled by the variable gain amplifier 5 in accordance with the color density detection signal j is suppressed for portions corresponding to the color boundaries. In the luminance signal 194 after image quality correction, no image correction is applied in areas near the color boundaries. This eliminates the possibility of overcorrection or contour reversion at the boundaries of colors as was the case with the prior art previously described.

The difference between the configurations of FIGS. 37 and 39 is that the configuration of FIG. 39 achieves a much greater improvement not only at the boundaries between non-color and color areas but also at the boundaries between different colors.

The 15th embodiment is also effective in application to an image quality correction circuit that does not use a slice circuit; the embodiment is effective not only in the configuration where image quality correction is applied to the luminance signal, but also in the configuration of FIG. 31 where image quality correction is applied to the chrominance signal, the configuration of FIG. 31 in the case where the slice circuit is not provided, and the configuration where image quality correction is applied to the primary color signal.

(Embodiment 16)

Figure 41:
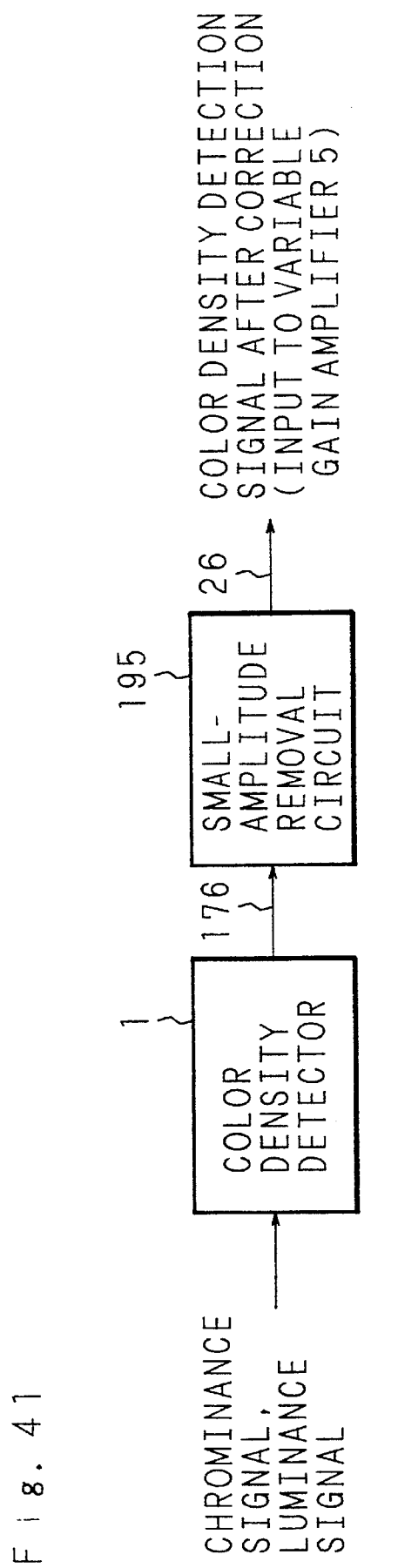
FIG. 41 is a block diagram showing the configuration of an image quality correction circuit (a 16th embodiment) according to the present invention.

FIG. 41 is a block diagram showing the configuration of an image quality correction circuit according to another embodiment (a 16th embodiment) of the present invention. In FIG. 41, the color density detector 1 corresponds to the color density detector in Embodiments 1–13. The chrominance and luminance signals are inputted to the color density detector 1 which then outputs a color density detection signal 176 to a small-amplitude removal circuit 195. The small-amplitude removal circuit 195 outputs a corrected color density detection signal 26 which is applied to the control terminal of the variable gain amplifier 5. More specifically, the color density detection signal 176 synthesized from the chrominance and luminance signals is supplied to the small-amplitude removal circuit 195 where small-amplitude portions of the color density detection signal are removed in order to reduce the effect of image quality correction for light color areas, and the resulting output, i.e., the corrected color density detection signal 26, is applied to the control terminal of the variable gain amplifier 5 in Embodiments 1–15. When applying the configuration of FIG. 41 to Embodiments 14 and 15, the small-amplitude removal circuit 195 is connected after the boundary reduction circuit 177 in FIG. 36.

Figure 42:
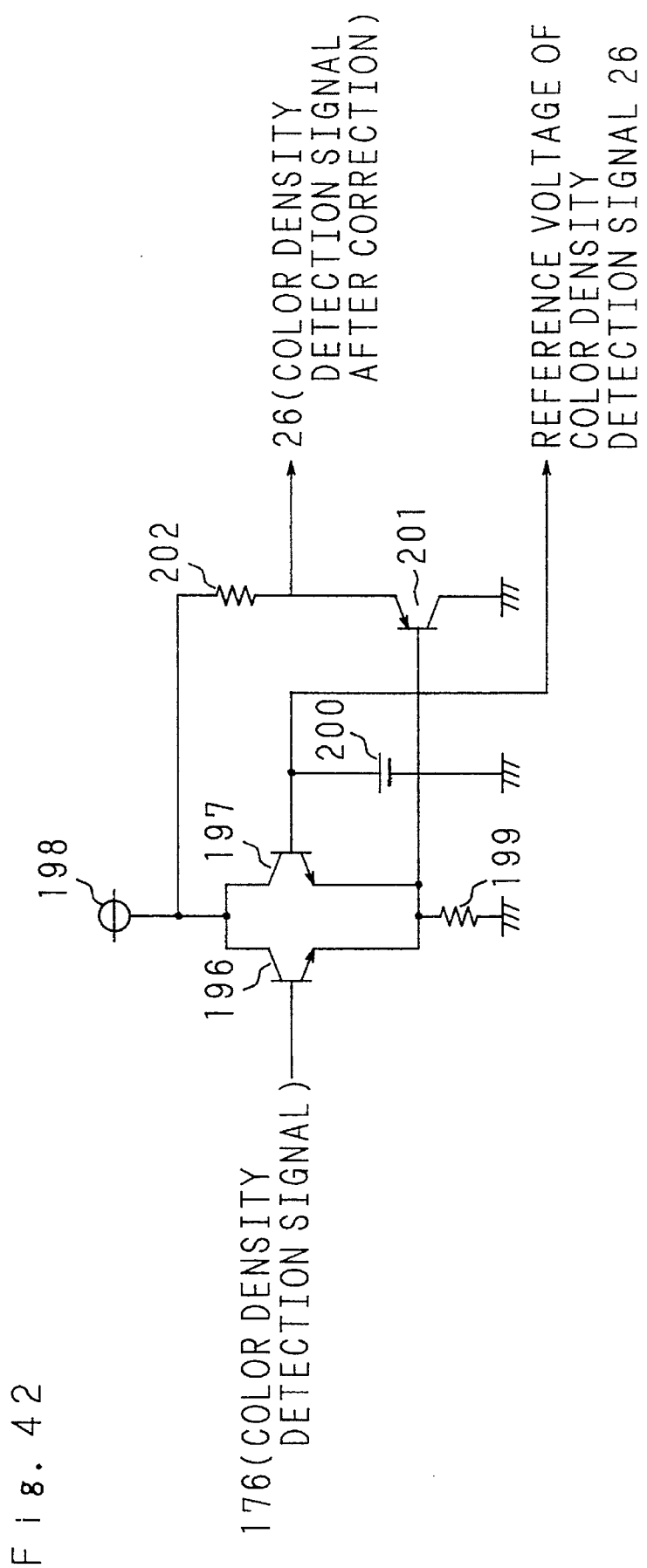
FIG. 42 is a circuit diagram showing the configuration of a small-amplitude removal circuit.

FIG. 42 shows the configuration of the small-amplitude removal circuit 195 in more detail. The numeral 196 and 197 designate transistors having similar characteristics; the color density detection signal 176 is applied to the base of the transistor 196, while a reference voltage 200 is applied to the base of the transistor 197, the reference voltage 200 also serving as the reference voltage for the corrected color density detection signal 26. The collectors of the transistors 196 and 197 are connected together and coupled to a power source 198. The emitters of the transistors 196 and 197 are connected together and grounded via a resistor 199. The emitter of each of the transistors 196, 197 is connected to the base of a transistor 201 whose collector is grounded and whose emitter is connected to the power source 198 via a resistor 202. The voltage outputted from the emitter of the transistor 201 is the corrected color density detection signal 26. The transistor 201 forms an emitter follower buffer so that the voltage drop by the base-emitter voltage of the transistors 196, 197 is cancelled as it is raised by the base-emitter voltage of the transistor 201.

The circuit operation of FIG. 42 will be described. It is assumed that the reference voltage 200 for the corrected color density detection signal 26 is chosen to be higher than the input color density detection signal 176. When the color density detection signal 176 applied to the base of the transistor 196 is higher than the reference voltage 200 applied to the base of the transistor 197, current flows from the transistor 196 to ground via the resistor 199, so that the transistor 197 is off. Therefore, in this case, the color density detection signal 176 is outputted as the corrected color density detection signal 26 through the transistors 196 and 201. Conversely, when the color density detection signal 176 applied to the base of the transistor 196 is lower than the reference voltage 200 applied to the base of the transistor 197, the transistor 196 is off, and current flows from the emitter of the transistor 197 to ground via the resistor 199. Therefore, in this case, the reference voltage is outputted from the emitter of the transistor 201.

Figure 43:
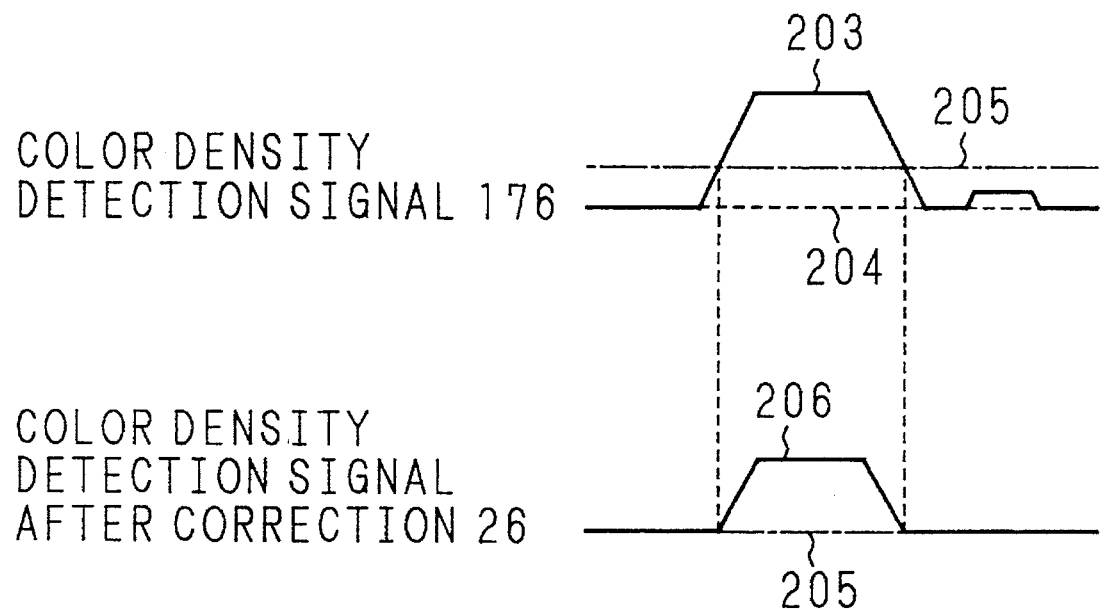
FIG. 43 is a signal waveform diagram for explaining the operation of the small-amplitude removal circuit shown in FIG. 42.

FIG. 43 explains the circuit operation of FIG. 42 by using specific examples of signal waveforms. The numeral 203 designates an example of the color density detection signal 176 applied to the base of the transistor 196, and a dotted line 204 indicates the reference voltage for the color density detection signal 176, the reference voltage being equal to the no-color voltage level. The numeral 205 shows an example of the voltage value of the reference voltage 200, after correction, applied to the base of the transistor 197. The numeral 206 indicates the color density detection signal 26 after correction, and 205 designates the reference voltage applied to the base of the transistor 197.

In FIG. 43, it can be seen that when the color density detection signal 203 is higher than the corrected reference voltage 205, the color density detection signal 203 is outputted as the corrected color density detection signal 206; conversely, when the reference voltage 205 is higher than the color density detection signal 203, a voltage equal to the corrected reference voltage 205 is outputted as the corrected color density detection signal 206. As a result, the amount of image quality correction in light color areas is held down.

The 16th embodiment is also effective in application to an image quality correction circuit that does not use a slice circuit; the embodiment is effective not only in the configuration where image quality correction is applied to the luminance signal, but also in the configuration of FIG. 31 where image quality correction is applied to the chrominance signal, the configuration of FIG. 31 in the case where the slice circuit is not provided, and the configuration where image quality correction is applied to the primary color signal. The boundary reduction circuit of Embodiments 14, 15 may be incorporated into the above configuration.

(Embodiment 17)

Figure 44:
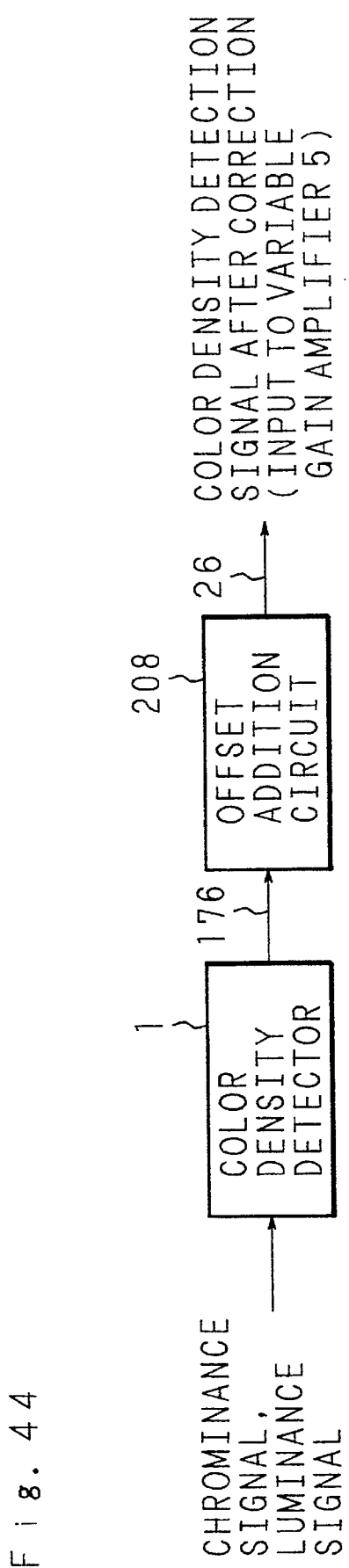
FIG. 44 is a block diagram showing the configuration of an image quality correction circuit (a 17th embodiment) according to the present invention.

FIG. 44 is a block diagram showing the configuration of an image quality correction circuit according to another embodiment (a 17th embodiment) of the present invention. In FIG. 44, the color density detector 1 corresponds to the color density detector in Embodiments 1–13. The chrominance and luminance signals are inputted to the color density detector 1 which then outputs a color density detection signal 176 to an offset addition circuit 208. The offset addition circuit 208 outputs a corrected color density detection signal 26. More specifically, the color density detection signal 176 synthesized in the color density detector 1 from the chrominance and luminance signals is inputted to the offset addition circuit 208 where a DC component is added to the color density detection signal 176 so that a difference voltage will remain with respect to the reference voltage even in no-color portions, thus allowing a certain degree of image quality correction in no-color portions.

Figure 45:
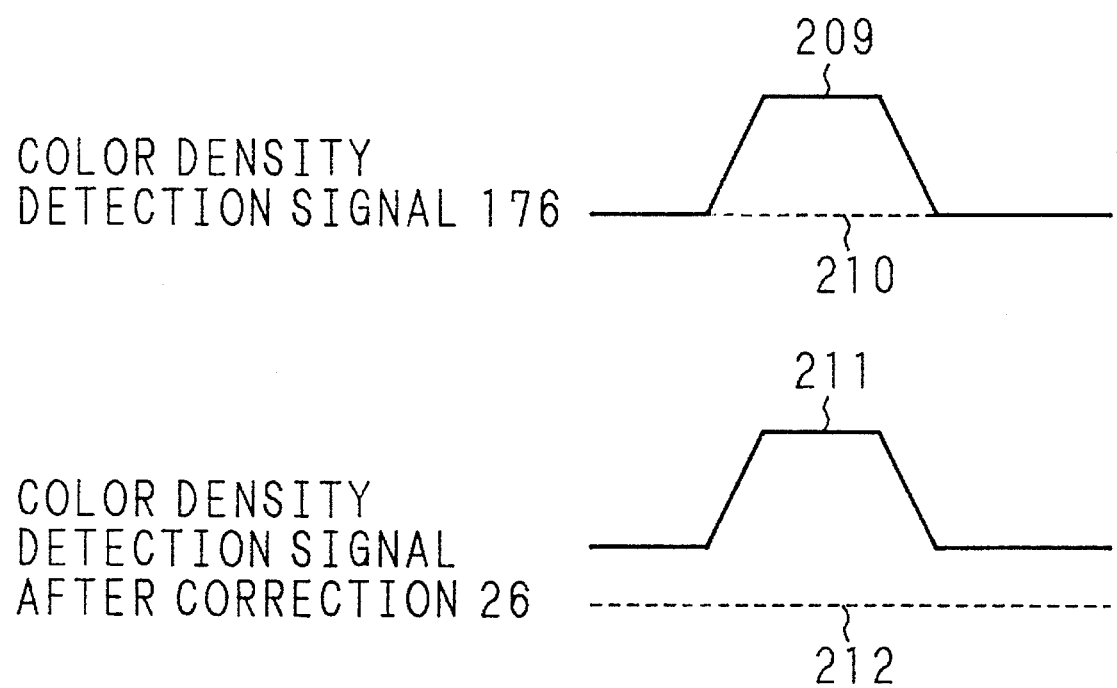
FIG. 45 is a signal waveform diagram for explaining the operation of an offset addition circuit shown in FIG. 44.

As a specific example, the offset addition circuit 208 can be implemented using the same configuration as the small-amplitude removal circuit shown in FIG. 42. However, in the small-amplitude removal circuit, the reference voltage 200 after correction is made higher than the no-color level of the color density detection signal 176, while on the other hand, in the case of the offset addition circuit 208, the reference voltage 200 after correction must be made lower than the no-color level of the color density detection signal 176. Further, instead of using the circuit such as shown in FIG. 42, the reference voltage may simply be made lower than the no-color level of the color density detection signal 176. FIG. 45 shows specific examples of waveforms. The numeral 209 designates the voltage waveform of the color density detection signal 176; 210 is the voltage level when no color is present; 211 is the color density detection signal after correction; and 212 is the reference voltage after correction. It can be seen that the signal 211 has a DC voltage to enable a certain degree of correction even in no-color portions. This also provides the effect of aperture correction. Furthermore, if provisions are made so that the corrected reference voltage can be varied using a microcomputer or the like, an operation equivalent to image quality control by aperture correction can be accomplished.

The 17th embodiment is also effective in application to an image quality correction circuit that does not use a slice circuit; the embodiment is effective not only in the configuration where image quality correction is applied to the luminance signal, but also in the configuration of FIG. 31 where image quality correction is applied to the chrominance signal, the configuration of FIG. 31 in the case where the slice circuit is not provided, and the configuration where image quality correction is applied to the primary color signal. The boundary reduction circuit of Embodiments 14, 15 may be incorporated into the above configuration. Furthermore, the small-amplitude removal circuit of Embodiment 16 may be incorporated as well.

Any of Embodiments 1 to 17 can be applied not only to analog systems but also to digital systems.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bound thereof are therefore intended to be embraced by the claims.

What is claimed is:

1. An image quality correction circuit comprising:

color density detecting means for detecting color density from a luminance signal and a chrominance signal;

high-frequency component filtering means for filtering out a high-frequency component of the luminance signal;

a variable gain amplifier for amplifying the filtered luminance signal by performing control in such a manner that the gain of the variable gain amplifier is increased when the detected color density is high and is reduced when the detected color density is low;

a slice circuit for slicing a positive portion of the outputted amplitude of said variable gain amplifier at a prescribed value to output a negative portion thereof as an image quality correction signal; and means for combining the image quality correction signal outputted from said slice circuit with the luminance signal and thereby outputting a corrected luminance signal.

2. An image quality correction circuit according to claim 1, wherein said color density detecting means comprises a multiplier for multiplying different color-difference signals, a weighting circuit for assigning a weight to an output signal of said multiplier, and a maximum value detection circuit for detecting a maximum value among an output signal of said weighting circuit, one color-difference signal or a weighted version of the one color-difference signal, and the other color-difference signal or a weighted version of the other color-difference signal, and the color density is detected from the output of said maximum value detection circuit.

3. An image quality correction circuit according to claim 1, wherein said color density detecting means comprises a subtractor for subtracting a second chrominance signal from a first chrominance signal, and a maximum value detection circuit for detecting a maximum value among an output signal of said subtractor or a weighted version of the output signal, an inverted signal of the first chrominance signal or a weighted version of the inverted signal, and the second chrominance signal or a weighted version of the second chrominance signal, and the color density is detected from the output of said maximum value detection circuit.

4. An image quality correction circuit comprising:

color density detecting means for detecting color density from a luminance signal and a signal relating to color;

high-frequency component extracting means for extracting a high-frequency component of the luminance signal;

variable gain amplifiers, corresponding to respective color-difference signals, for amplifying the extracted high-frequency component of the luminance signal by performing control in such a manner that the gain thereof is increased when the detected color density is high, and is reduced when the detected color density is low;

slice circuits, corresponding to the respective color-difference signals, for slicing the outputted amplitude of said variable gain amplifiers at a prescribed value; and means for combining an image quality correction signal outputted from said associated slice circuit with the associated chrominance signal to be corrected and thereby outputting a corrected chrominance signal.

5. An image quality correction circuit comprising:

color density detecting means for detecting color density from a luminance signal and a signal relating to color;

high-frequency component filtering means for filtering out a high-frequency component of the luminance signal;

a variable gain amplifier for amplifying the filtered luminance signal by performing control in such a manner that the gain thereof is increased when the detected color density is high, and is reduced when the detected color density is low; and means for combining an image quality correction signal outputted from said variable gain amplifier with the luminance signal to be corrected and thereby outputting a corrected luminance signal, wherein said color density detecting means includes a multiplier for multiplying different color-difference signals, a weighing circuit for assigning a weight to an output signal of said multiplier, and a maximum value detection circuit for detecting a maximum value among an output signal of said weighing circuit, one color-difference signal or a weighted version of the one color-difference signal, and the other color-difference signal, and the color density is detected from the output of said maximum value detection circuit.

6. An image quality correction circuit comprising:

color density detecting means for detecting color density from a luminance signal and a signal relating to color;

high-frequency component filtering means for filtering out a high-frequency component of the luminance signal;

a variable gain amplifier for amplifying the filtered luminance signal by performing control in such a manner that the gain thereof is increased when the detected color density is high, and is reduced when the detected color density is high, and is reduced when the detected color density is low; and means for combining an image quality correction signal outputted from said variable gain amplifier with the luminance signal to be corrected and thereby outputting a corrected luminance signal, wherein said color density detecting means comprises a subtractor for subtracting a second chrominance signal from a first chrominance signal, and a maximum value detection circuit for detecting a maximum value among an output signal of said subtractor or a weighted version of the output signal, an inverted signal of the first chrominance signal or a weighted of the inverted signal, and the second chrominance signal or a weighted version of the second chrominance signal, and the color density is detected from the output of said maximum value detection circuit.

7. A method for correcting image quality comprising the steps of:

detecting color density from a luminance signal and a chrominance signal;

filtering out a high-frequency component of the luminance signal;

variable gain amplifying the filtered luminance signal by performing control in such a manner that the variable gain is increased when the detected color density is high and is reduced when the detected color density is low;

slicing the amplified luminance signal at a prescribed value; and combining the sliced luminance signal with the luminance signal and thereby outputting a corrected luminance signal.

8. A method for correcting image quality comprising the steps of:

detecting color density from a luminance signal and a signal relating to color;

filtering out a high-frequency component of the luminance signal;

variable gain amplifying the filtered luminance signal by performing control in such a manner that the variable gain is increased when the detected color density is high, and is reduced when the detected color density is low; and combining an image quality correction signal from said amplifying step with the luminance signal to be corrected and thereby outputting a corrected luminance signal, wherein said detecting color density step includes the substeps of multiplying different color-difference signals, weighing an output signal of said multiplying substep and detecting a maximum value among an output signal of said weighing substep, one color-difference signal or a weighted version of the one color-difference signal, and the other color-difference signal or a weighted version of the other color-difference signal, wherein the color density is detected from the output of said maximum value detecting substep.

9. A method for correcting image quality comprising the steps of:

detecting color density from a luminance signal and signal relating to color;

filtering out a high-frequency component of the luminance signal;

variable gain amplifying the filtered luminance signal by performing control in such a manner that the variable gain is increased when the detected color density is high and is reduced when the detected color density is low; and combining an image quality correction signal outputted from said variable gain amplifying step with the luminance signal to be corrected and thereby outputting a corrected luminance signal, wherein said detecting color density step includes the substeps of subtracting a second chrominance signal from a first chrominance signal, detecting a maximum value among an output signal of said subtracting substep or a weighted version of the output signal, an inverted signal of the first chrominance signal or a weighted version of the inverted signal, and the second chrominance signal or a weighted version of the second chrominance signal;

wherein the color density is detected from the output of said maximum value detecting substep.

\* \* \* \* \*